June 15, 1965  A. H. FOTSCH ETAL  3,189,154
MACHINE TOOL
Original Filed June 1, 1959  22 Sheets-Sheet 1
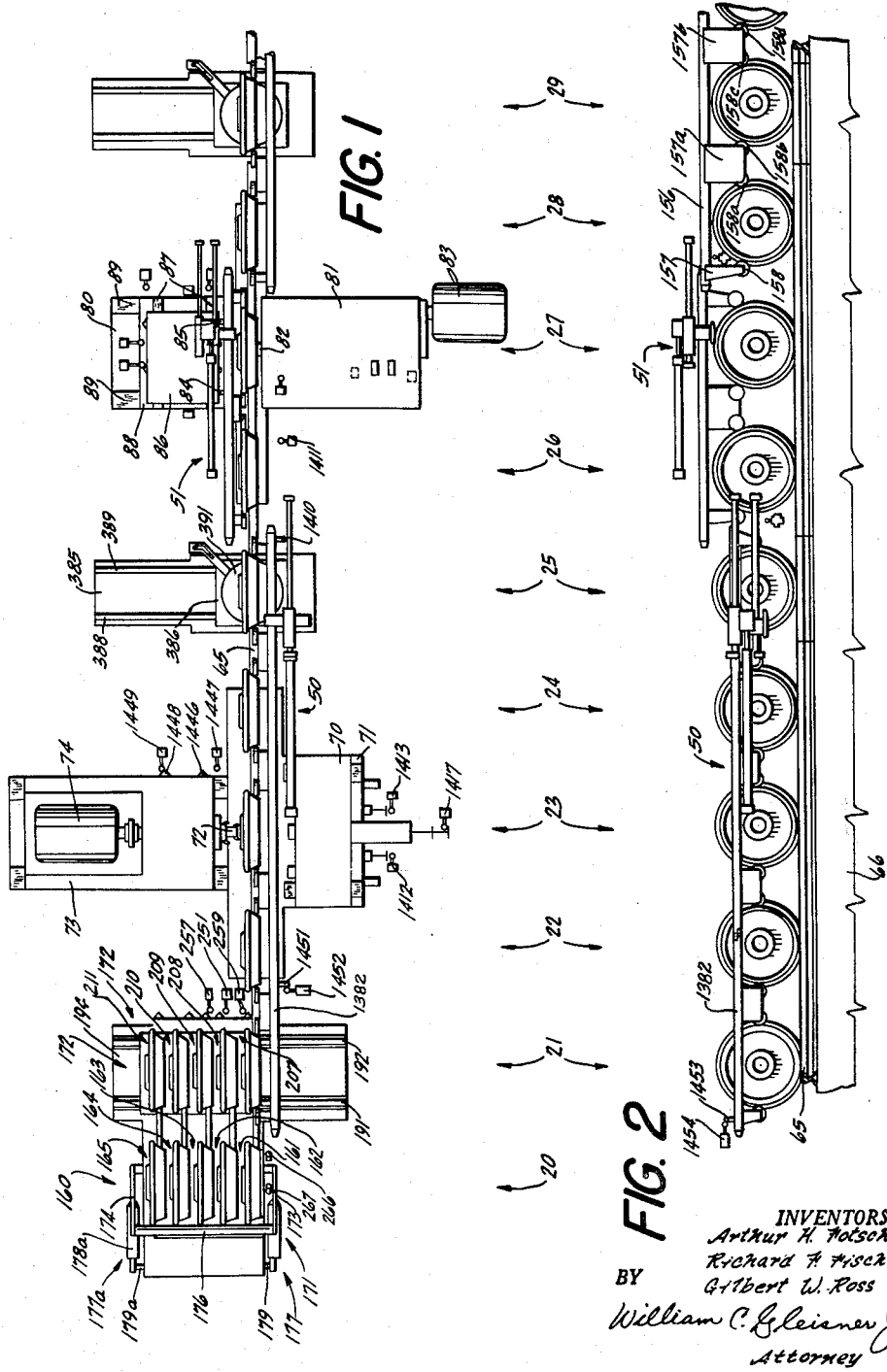
INVENTORS
Arthur H. Fotsch
Richard F. Fischer
BY Gilbert W. Ross
William C. Gleisner Jr.
Attorney

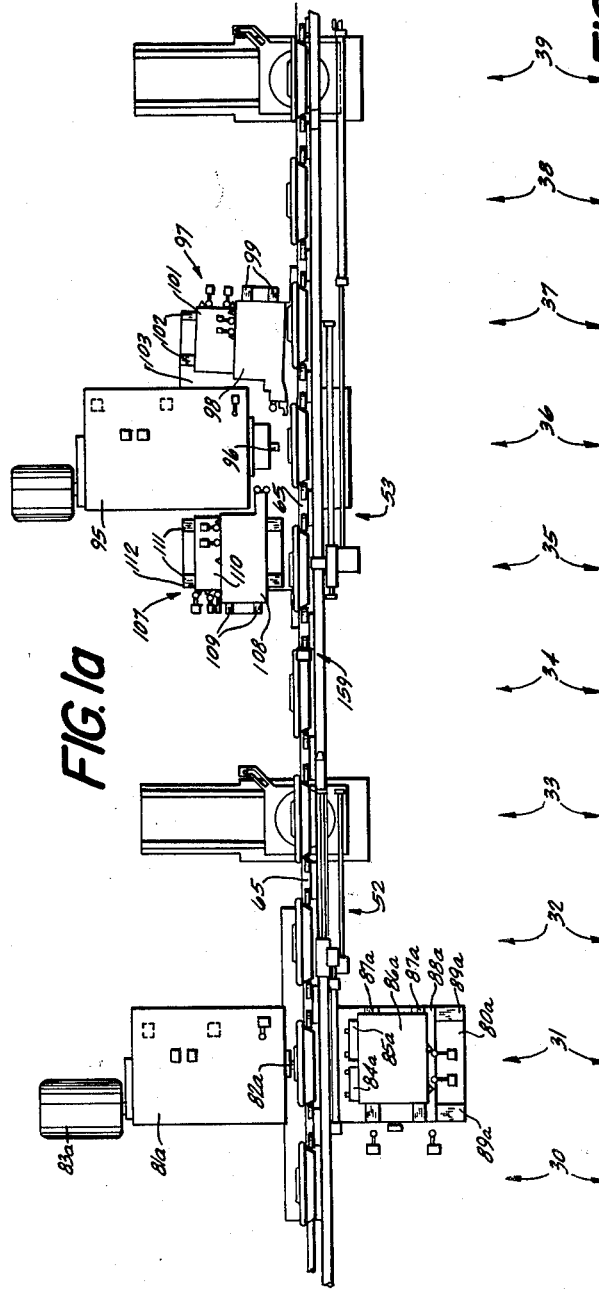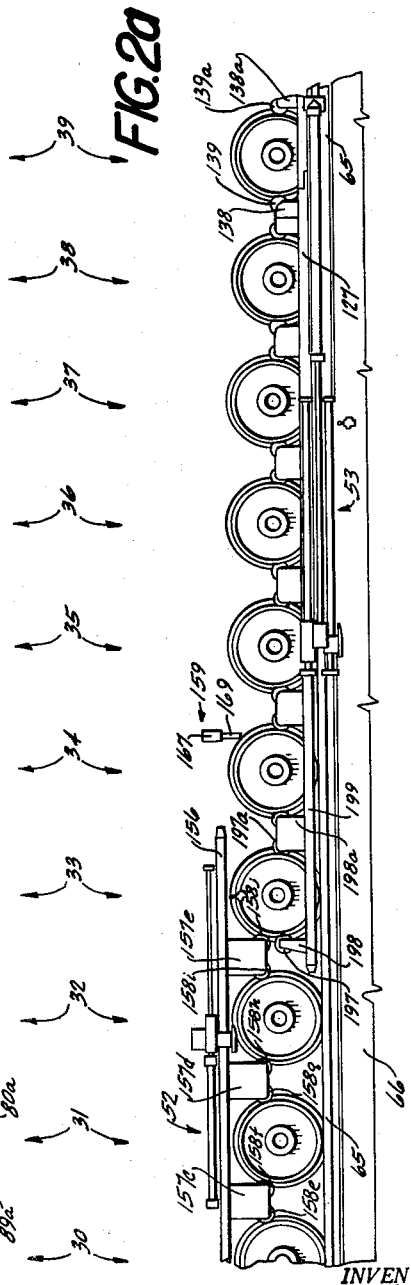

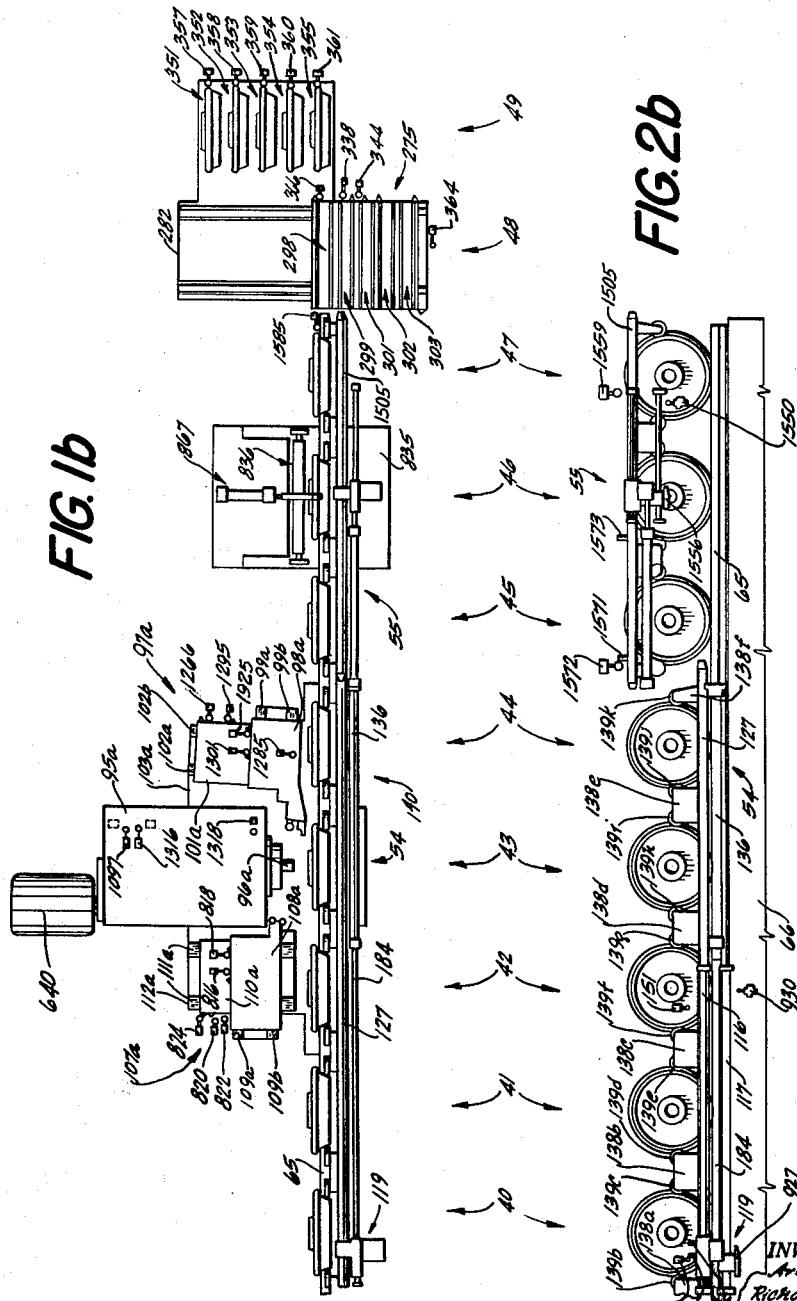

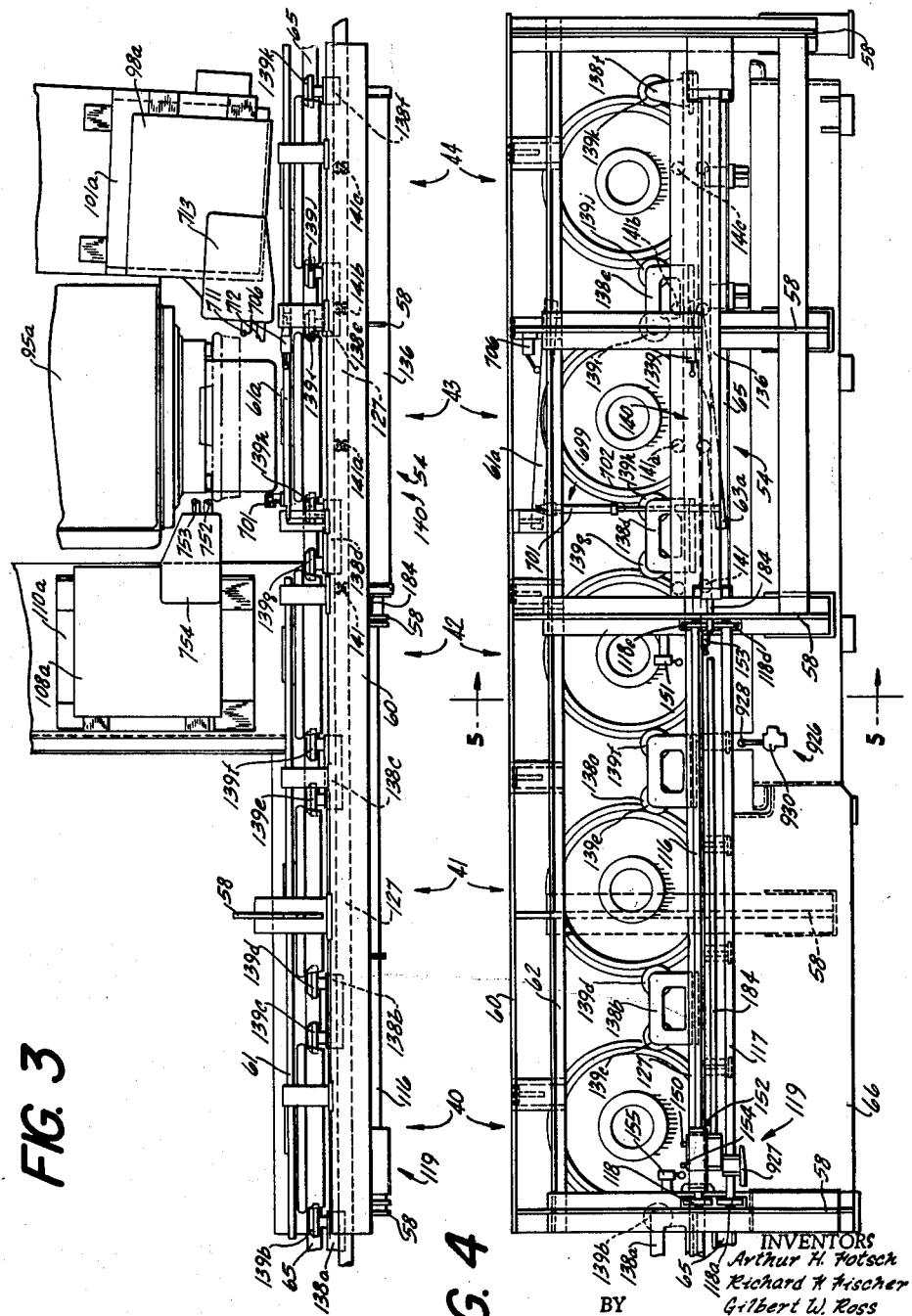

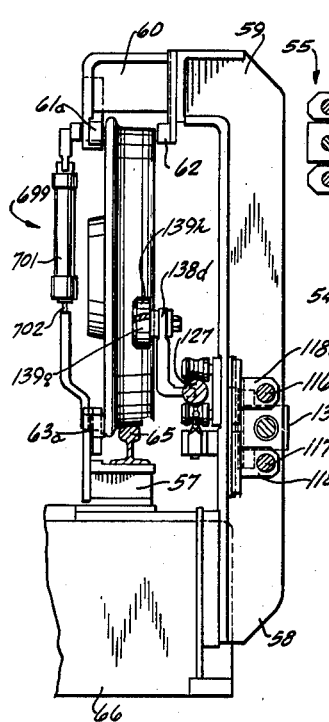

June 15, 1965  A. H. FOTSCH ETAL  3,189,154
MACHINE TOOL
Original Filed June 1, 1959  22 Sheets-Sheet 6

INVENTORS
Arthur H. Fotsch
Richard F. Fischer
BY  Gilbert W. Ross
William C. Gleisner Jr.
Attorney

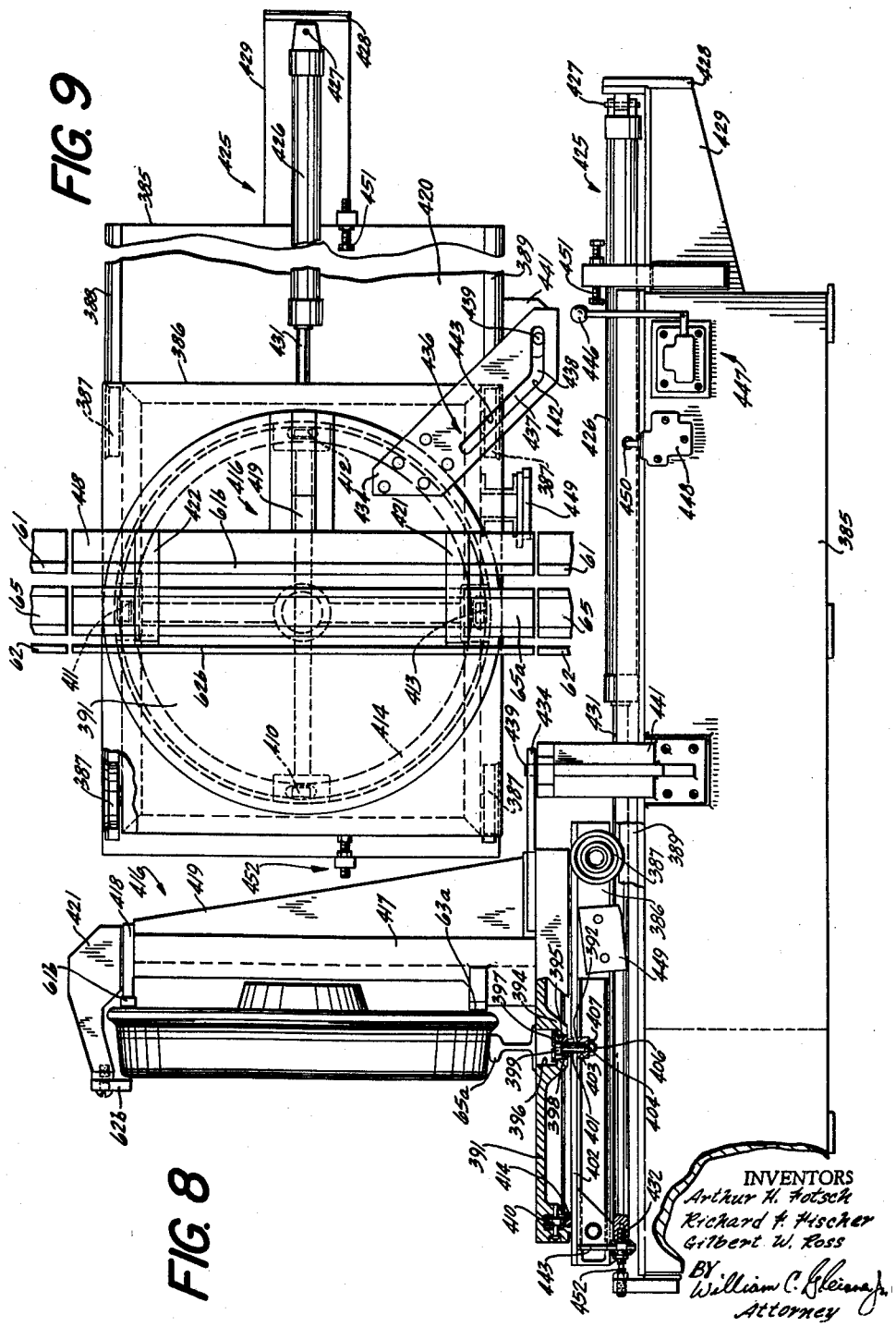

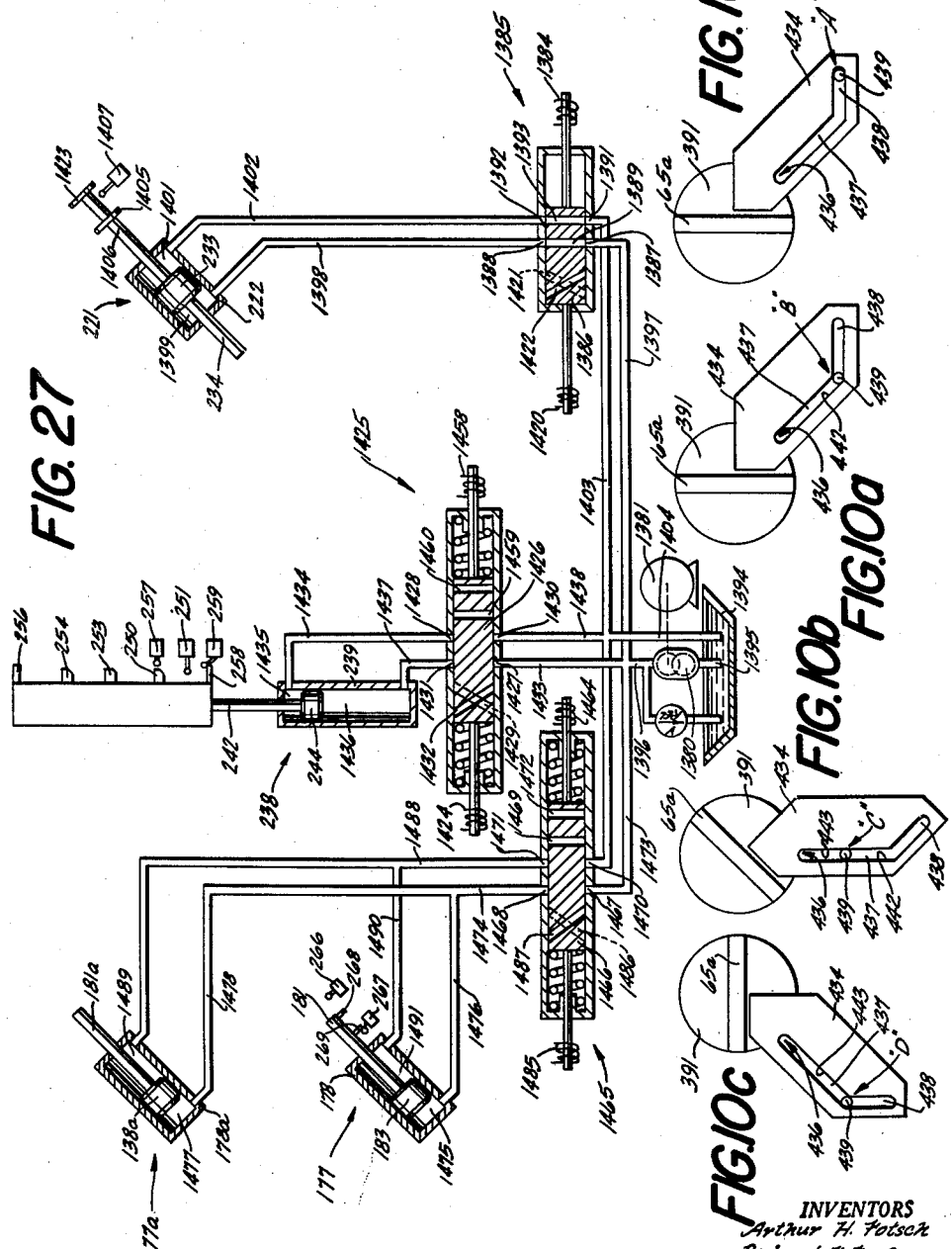

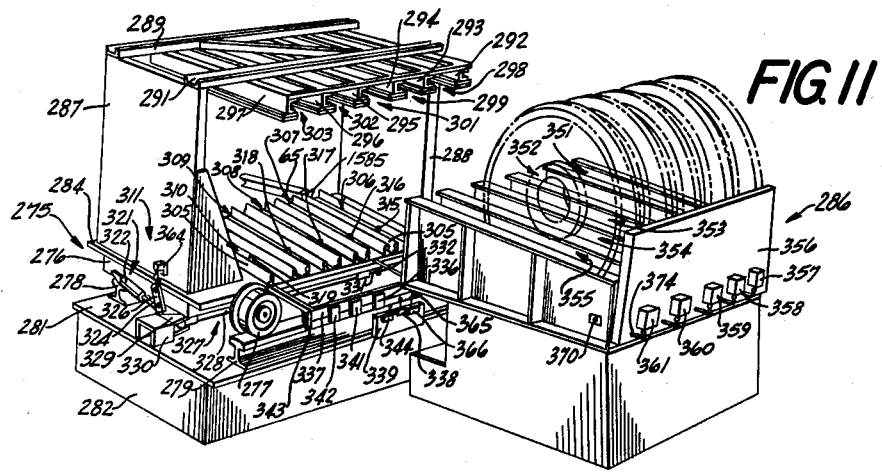
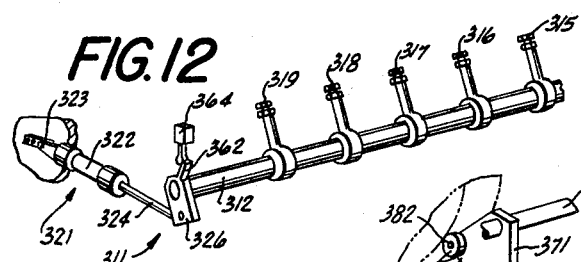
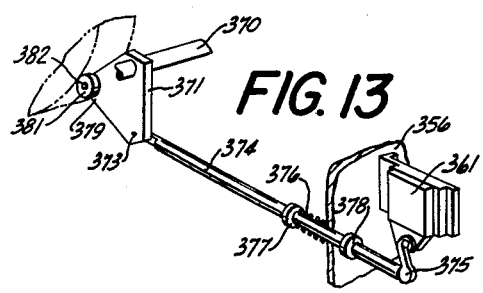
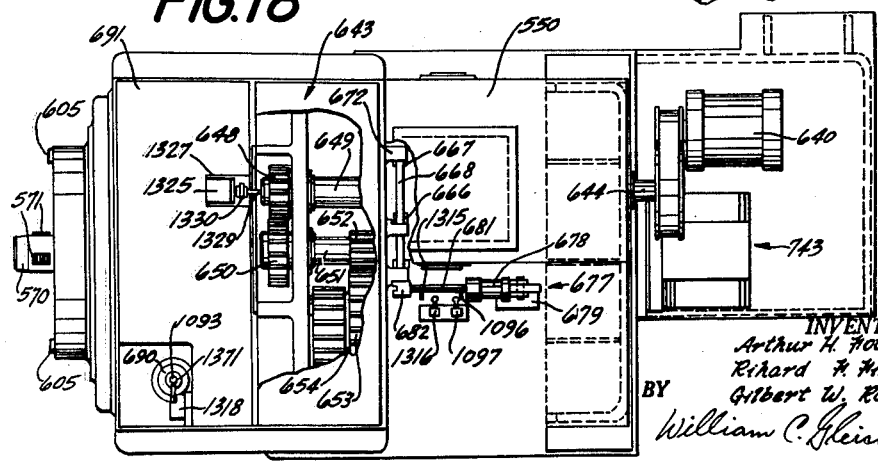

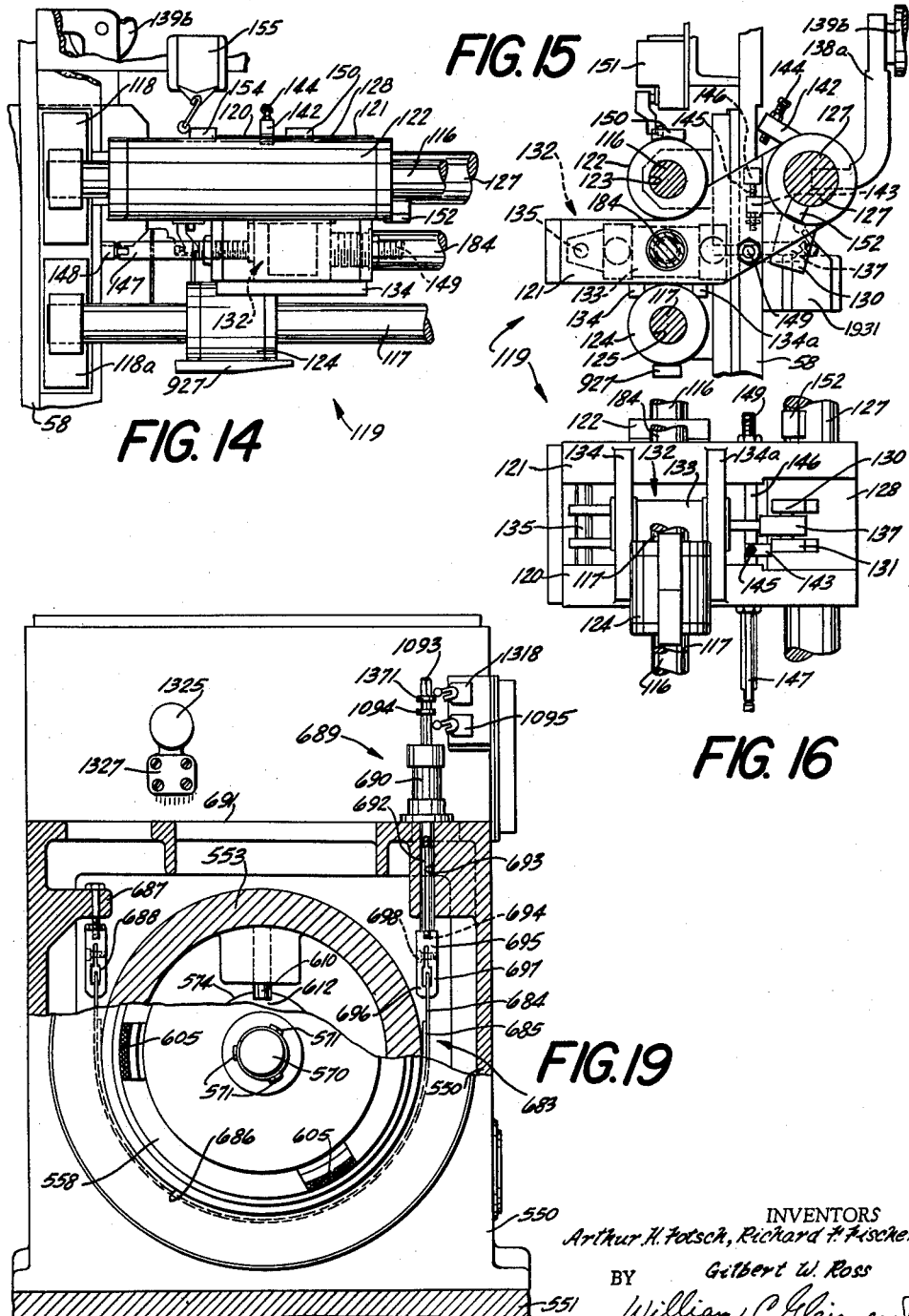

INVENTORS
Arthur H. Fotsch
Richard F. Fischer
Gilbert W. Ross
BY William C. Gleisner Jr.
Attorney

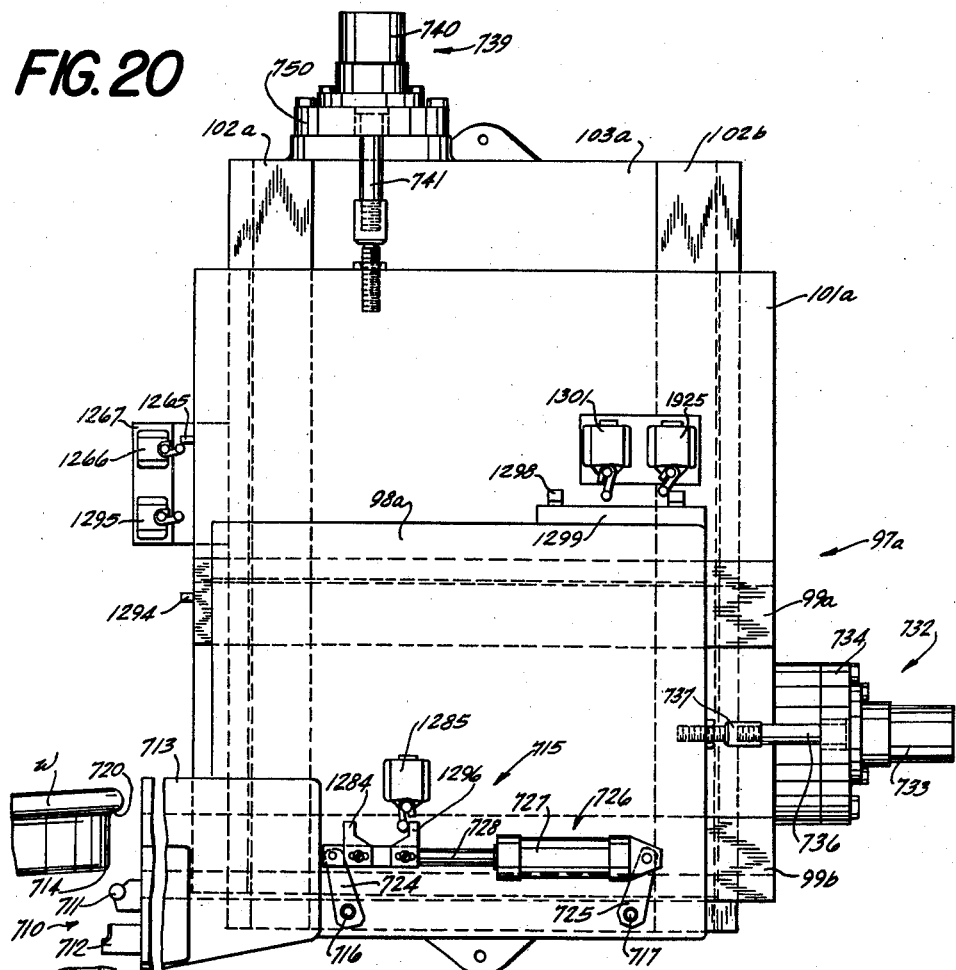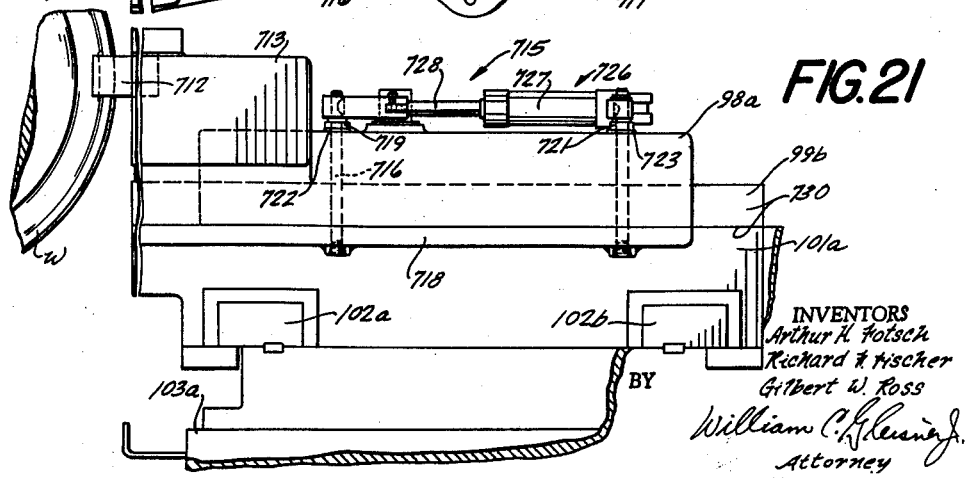

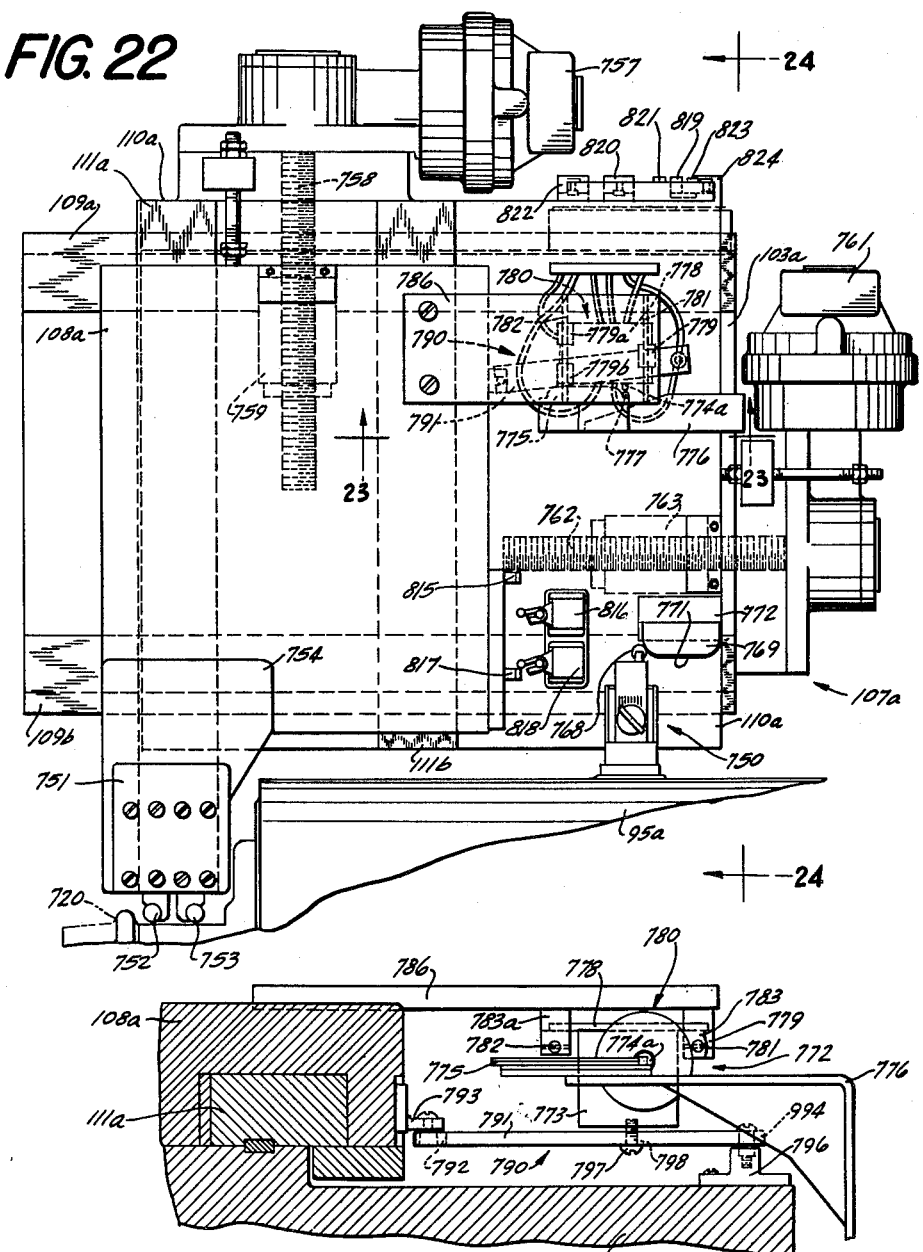

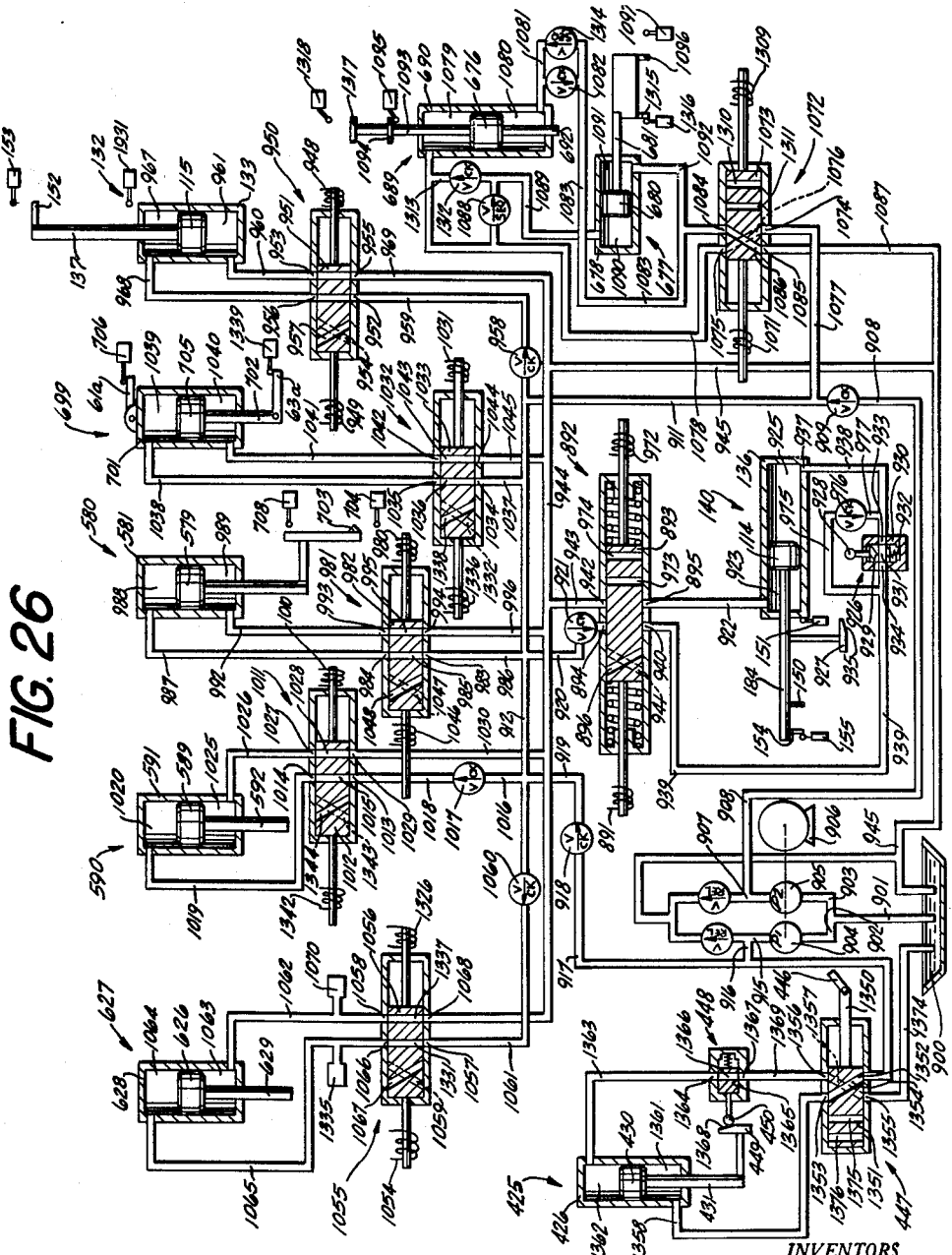

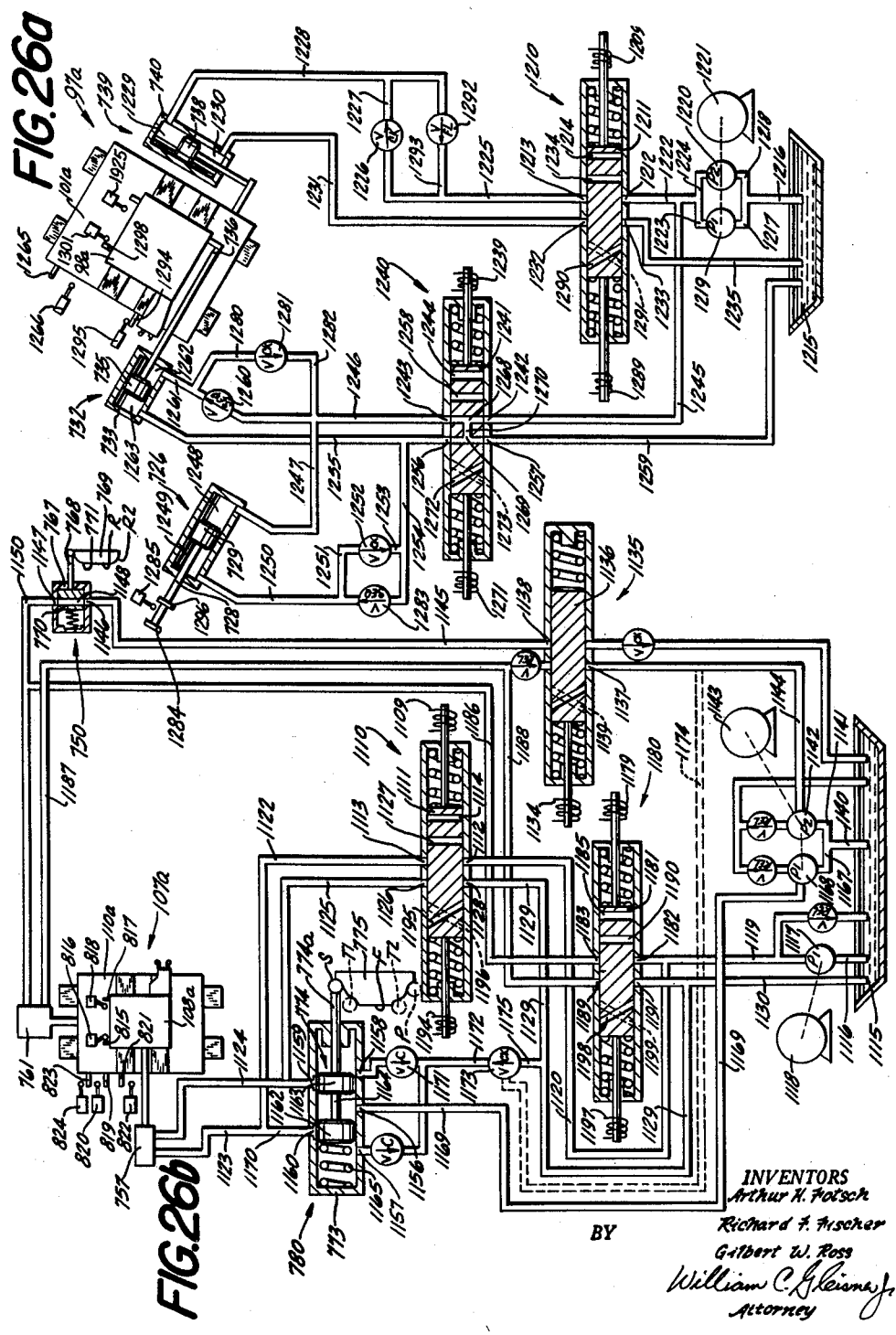

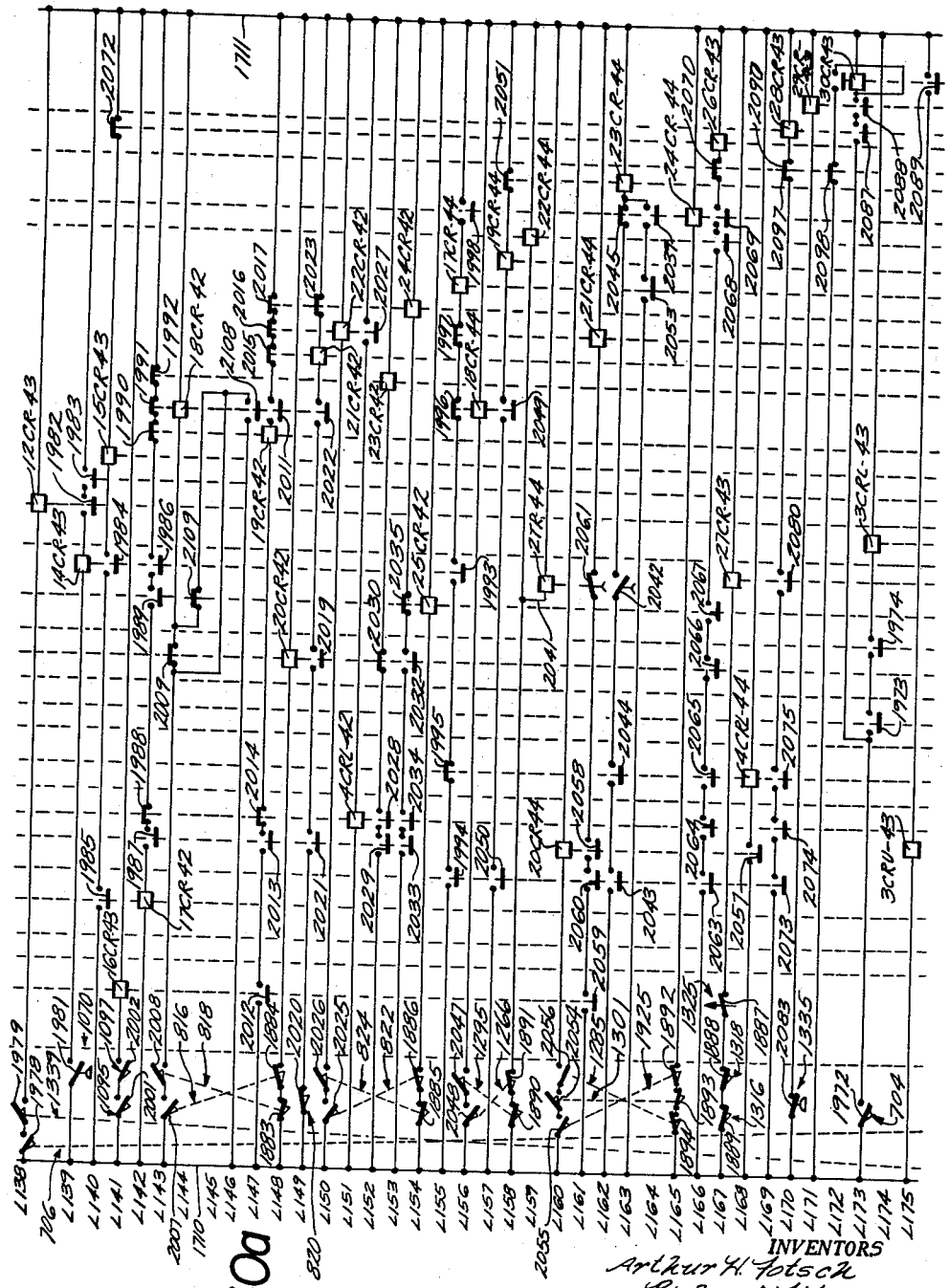

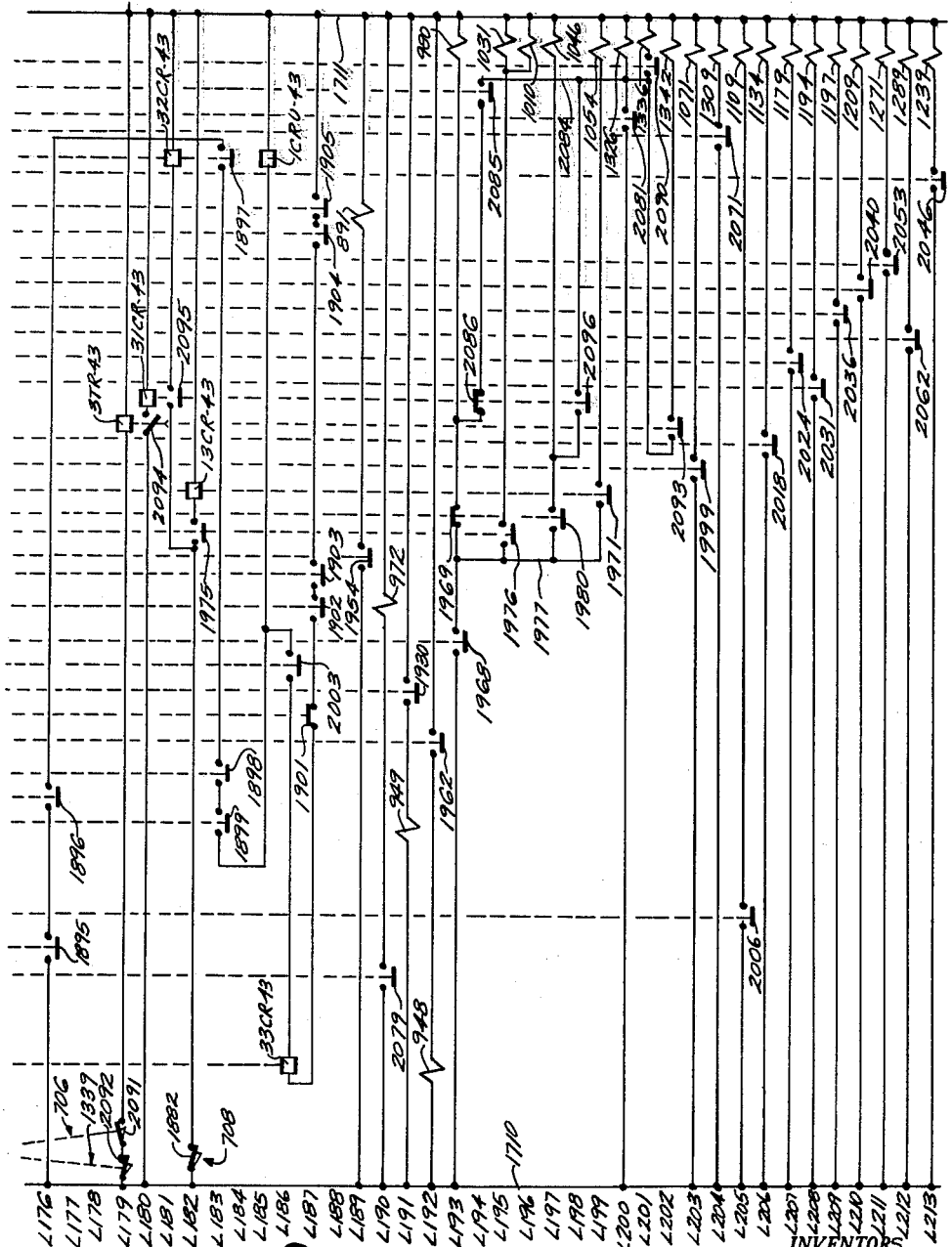

3,189,154
MACHINE TOOL
Arthur H. Fotsch, Wauwatosa, and Gilbert W. Ross, Brookfield, Wis., and Richard F. Fischer, Santa Rosa, Calif., assignors to Kearney & Trecker Corporation, West Allis, Wis., a corporation of Wisconsin
Original application June 1, 1959, Ser. No. 817,108, now Patent No. 3,118,332, dated Jan 21, 1964. Divided and this application Nov. 29, 1961, Ser. No. 155,630
16 Claims. (Cl. 198—22)

This is a division of application Serial No. 817,108, filed June 1, 1959, entitled "Machine Tool" which has matured into Patent 3,118,332 issued on January 21, 1964.

This invention relates generally to machine tools and more specifically to a machine tool especially adapted to perform a series of machining operations on a circular workpiece, such as a railroad car wheel, with the workpieces being automatically transferred to various stations of the machine along a transfer line.

A general object of the present invention is to provide an improved machine tool organization which includes a series of independent machine units arranged in sequence and operated simultaneously for performing different metal removing operations on relatively large circular workpieces with the workpieces being automatically transferred from one machining unit to another by a transfer mechanism along a transfer line.

Another object of the present invention is to provide a novel method and apparatus for automatically performing a series of metal removing operations on upright railroad car wheels.

Still another object of the present invention is to provide a production type machine tool adapted to handle and perform different metal removing operations on railroad car wheels while the wheels are in an upright position.

Still another object of the present invention is to provide a production type machine tool adapted to receive a plurality of unfinished railroad car wheels in a storage station and which is operable to transfer the car wheels from the storage station into a loading station from whence they are advanced in a controlled rolling movement, through a series of machining stations, with each finished car wheel being moved into an unloading station and thence into a storage station, to render the machine capable of continuous operation.

Another object of the present invention is to provide a novel storage and loading mechanism for supplying railroad car wheels in an upright position to a production type machine tool.

Still another object of the present invention is to provide a machine tool for turning the tread of a railroad car wheel and forming the flange of the car wheel while the car wheel is rotated in a vertical plane.

Another object of the present invention is to provide a machine tool having means for receiving and holding a railroad car wheel in an upright position and which is also operable to rotate the car wheel in the upright position so that a plurality of tools may be moved into operating position relative to the rotating car wheel to perform a desired work operation on it.

Another object of the present invention is to provide a machining unit for performing a turning and profiling operation on a railroad car wheel and having a fixture head provided with an axially movable chucking spindle operable to be engaged with a railroad car wheel for holding and rotating the car wheel in an upright position for the performance of the turning and profiling operations thereupon.

According to this invention there is provided an improved production type machine tool especially adapted to perform a series of different work operations on railroad car wheels. In the operation of the machine tool a plurality of railroad car wheels are supplied to a storage station in an upright position and thereafter are automatically transferred into an indexable loading mechanism which is operable to successively position the individual car wheels contained therein in alignment with the transfer line of the machine tool. While in an upright position the car wheels are transferred in a controlled rolling movement to advance them successively from one station of the machine to the next and finally into an indexable unloading mechanism which operates to collect a plurality of finished car wheels and to deliver them as a group to a storage rack for subsequent disposition. The transfer line of the machine tool extends through a series of work stations or machining units each of which is associated with a transfer mechanism which transfers the workpieces along the transfer line. In the particular exemplary machine tool organization shown, five separate machining units are provided, two of which are identical and perform the same machining operation on two car wheels simultaneously by reason of the fact that the operation which they perform requires approximately twice as much time as the other operations on the car wheel. The machining units in the illustrated machine tool organization are a boring unit, a rear facing unit, a front facing unit and two turning and profiling units, the latter being the two identical machining units previously referred to. The boring unit functions to bore the axial opening in the hub of the car wheel. The rear facing unit machines the annular faces on the hub and along the periphery of the rear of the wheel. The front facing unit is identical to the rear facing unit except that it is located on the opposite side of the transfer line for the purpose of machining the annular faces on the front of the wheel instead of its rear. The two turning and profiling units turn the tread of the car wheel and form the profile of its flange. Suitable fixture heads are provided for each machine unit for holding the car wheel while a machining operation is being performed on it.

An inspection station is also provided after the last machining unit along the line for supporting a car wheel in position to facilitate its inspection. Each machining unit as well as the inspection station are preceded and followed by an idle station in which a car wheel is located while the machining operations are being performed on other car wheels in the machining units. However, two idle stations are provided before the first turning and profiling unit while three idle stations are provided before the last turning and profiling unit to accommodate a double station transfer of the car wheels required for these machining units since one of the turning and profiling units operates on half of the wheels processed through the machine tool while the other turning and profiling unit operates on the other half of the wheels. A move out station is located between the machining units with each move out station being flanked on one side by an idle station that follows the previous machining unit and on the opposite side by an idle station that precedes the succeeding machining unit.

The car wheels roll on a guide rail along the transfer line to the several machining units with the transfer movement of the car wheels from one station to another being effected by suitable transfer mechanisms. Each machining unit is provided with a separate transfer mechanism that operates to transfer the car wheels to its associated machining unit and moves the completed car wheels away from the machining unit along the transfer line. The several transfer mechanisms cooperate and function in synchronism to automatically move each car wheel through the entire machine tool in increments so that the desired machining operations may be performed.

The foregoing and other objects of this invention will become more fully apparent from the following detailed description, and may be achieved by the exemplifying apparatus depicted in and further described in detail in connection with the accompanying drawings, in which:

FIGURES 1, 1a and 1b are fragmentary plan views of a machine tool incorporating the features of the present invention and taken collectively, in the order stated, show a complete plan view, of the machine tool organization for carrying out a number of work operations on a series of railroad car wheels, the progress of the car wheels being from left to right;

FIGS. 2, 2a and 2b, taken collectively, in the order stated, show a front elevational view of the transfer mechanisms employed, and correspond to the showing made in FIGS. 1, 1a and 1b respectively, the various machine units and other structure being omitted to more clearly show the arrangement of the transfer mechanisms;

FIG. 3 is a fragmentary plan view of the machine tool organization showing the relationship of the last profiling and turning machine unit therein with respect to the transfer line and including the three idle stations preceding the unit and one idle station following the unit;

FIG. 4 is a fragmentary front elevational view of the machine tool organization corresponding to the showing made in FIG. 3 and illustrating the transfer mechanism employed with the profiling and turning unit depicted in FIG. 3;

FIG. 5 is a view in transverse vertical section taken along the plane represented by the line 5—5 in FIG. 4;

FIG. 8 is a side elevational view of a move out station as observed from a position transverse of the transfer line on the discharge side of the unit, with parts being broken away to more clearly show the various mechanisms associated therewith;

FIG. 9 is a plan view of the move out station shown in FIG. 8;

FIGS. 10, 10a, 10b and 10c are schematic views illustrating the various positions of the rotary table of the move out station, shown in FIGS. 8 and 9, as effected by the cam and cam follower;

FIG. 11 is a perspective view of the unloading station and its associated storage station;

FIG. 12 is a perspective schematic showing of the stop gate mechanism employed with the unloading station;

FIG. 13 is a detail view of the mechanism employed to actuate the limit switches associated with the storage station that is associated with the unloading station;

FIG. 14 is an enlarged detail view in front elevation depicting the carrier mechanism associated with the transfer mechanism employed at the last profiling and turning station;

FIG. 15 is an enlarged detail view in right side elevation illustrating the carrier shown in FIG. 14;

FIG. 16 is an enlarged bottom view of the carrier shown in FIG. 15;

FIG. 18 is a plan view of the fixture head illustrated in FIG. 17, with parts broken away to more clearly show the drum drive transmission and the clutch actuator mechanism;

FIG. 19 is a view partly in vertical section and partly in elevation showing the face plate, the drum brake mechanism and brake actuator for the fixture head depicted in FIG. 17;

FIG. 20 is an enlarged plan view of the tool unit that forms a part of the last profiling and turning unit that is employed to effect the turning operation performed on the tread of the railroad car wheel;

FIG. 21 is an end elevational view of the tool unit illustrated in FIG. 20, showing the relationship of the cross slide and compound slide and the clamp mechanism for clamping the cross slide to the compound side;

FIG. 22 is a plan view of the tool unit depicted in FIG. 20 and which is employed for profiling the flange of a car wheel, the fixture head, face plate and a car wheel being partially shown;

FIG. 23 is an enlarged fragmentary detail view in vertical section of the tool unit of FIG. 22, taken substantially along the plane represented by the line 23—23 in FIG. 22;

FIG. 24 is a detail view in vertical section taken along the plane represented by the line 24—24 in FIG. 22;

FIG. 25 is a right side elevational view illustrating the inspection station as seen from the discharge side of the station;

Figure 28:
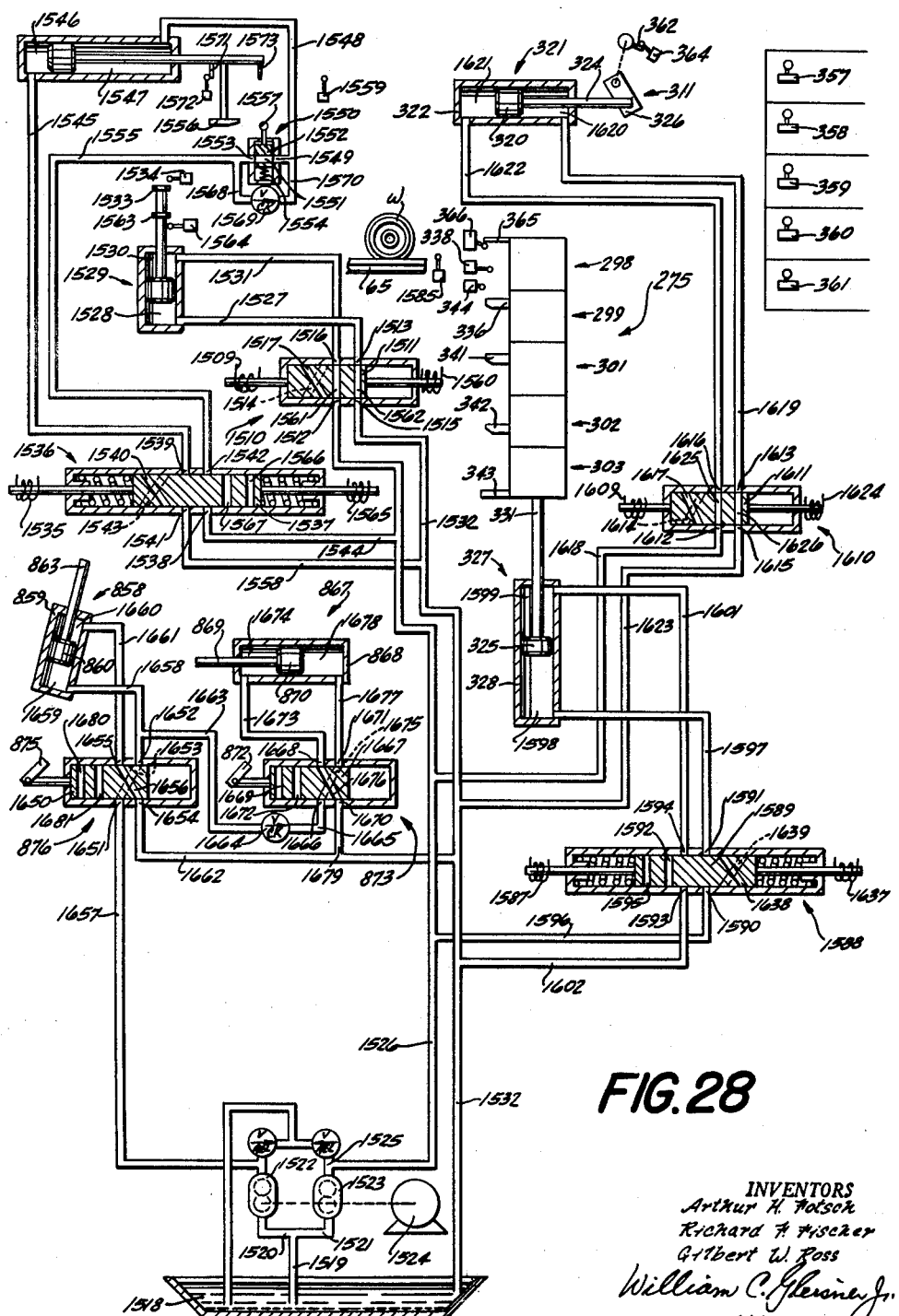
Figure 29:
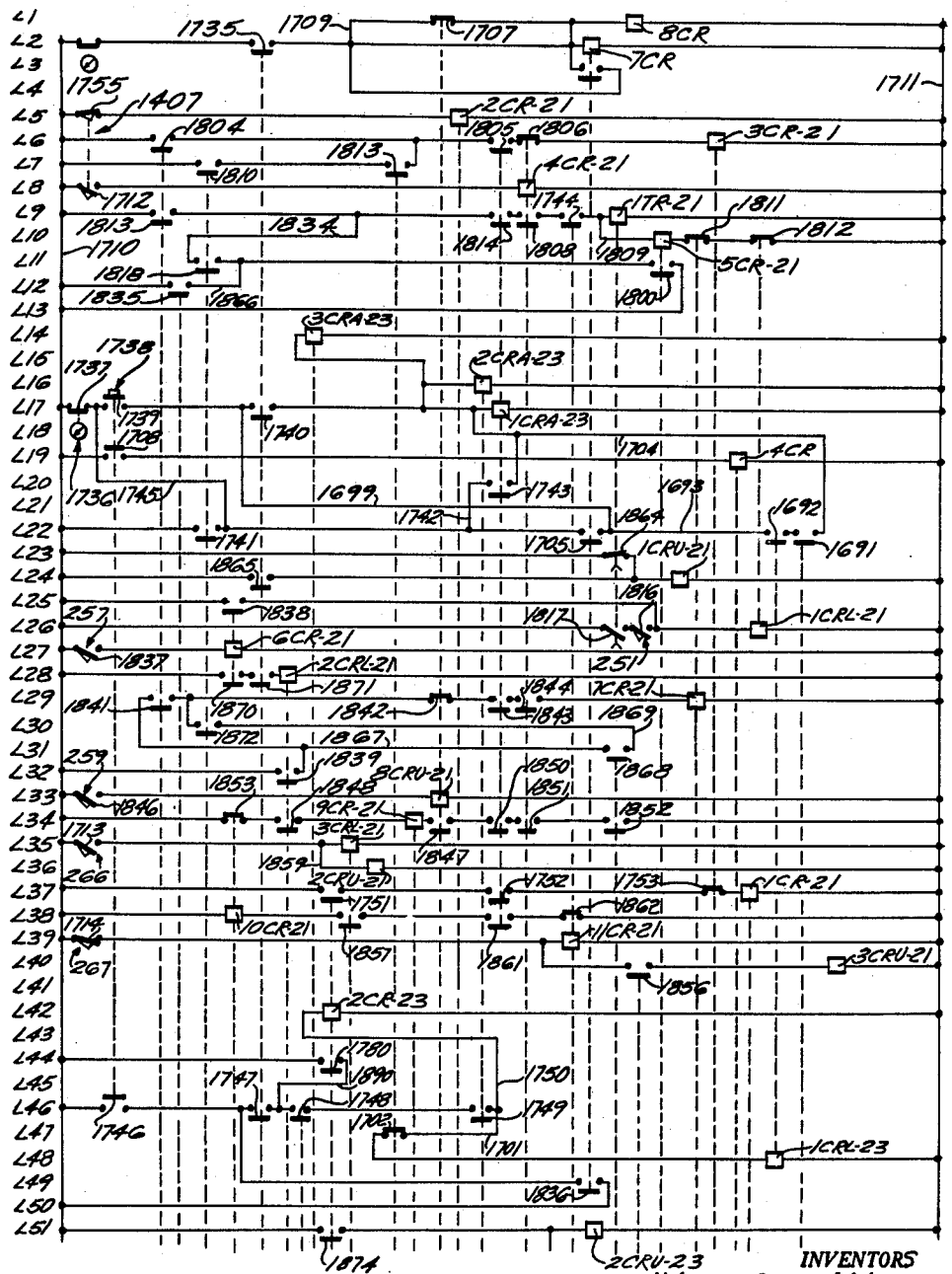
Figure 29A:
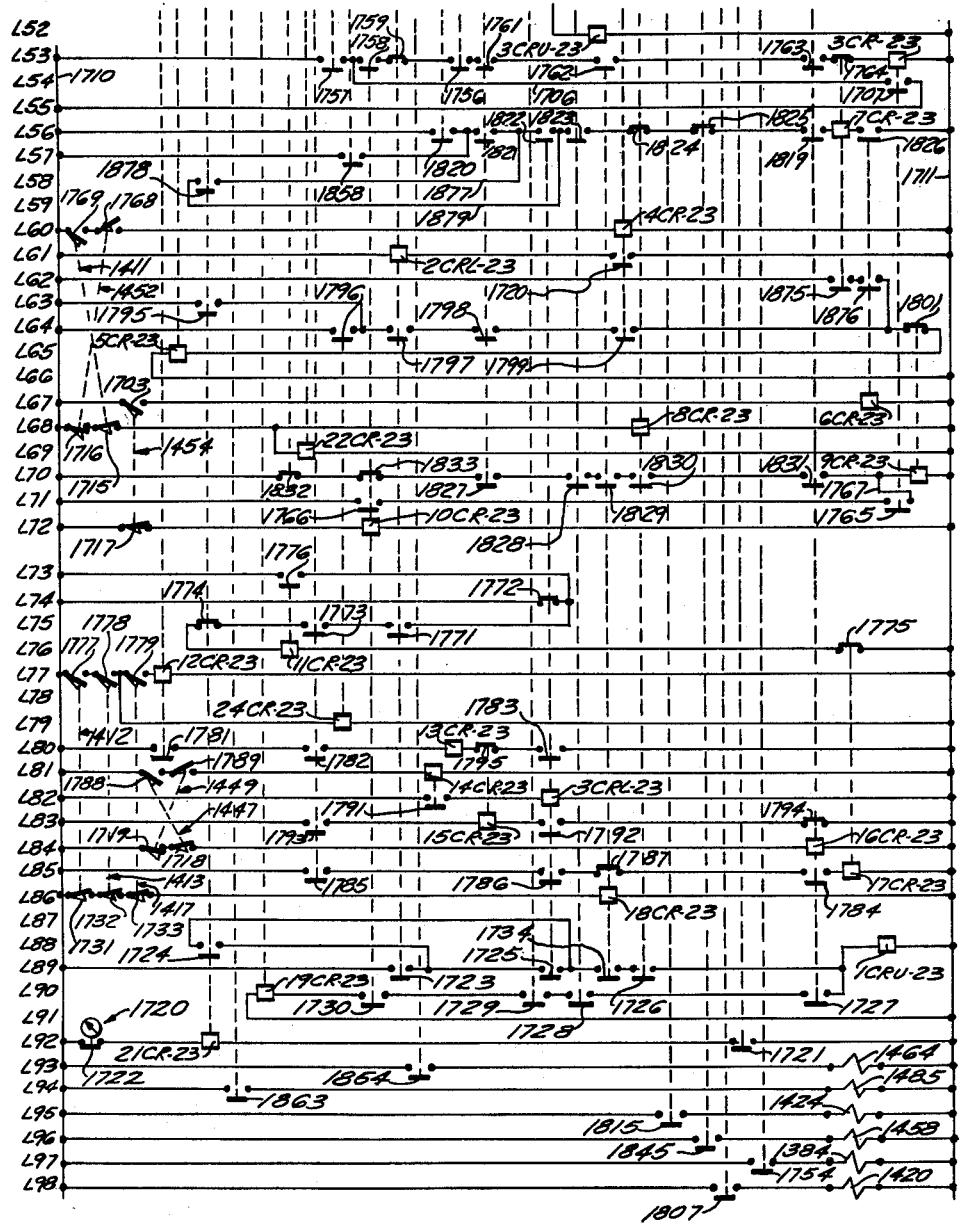
Figure 30:
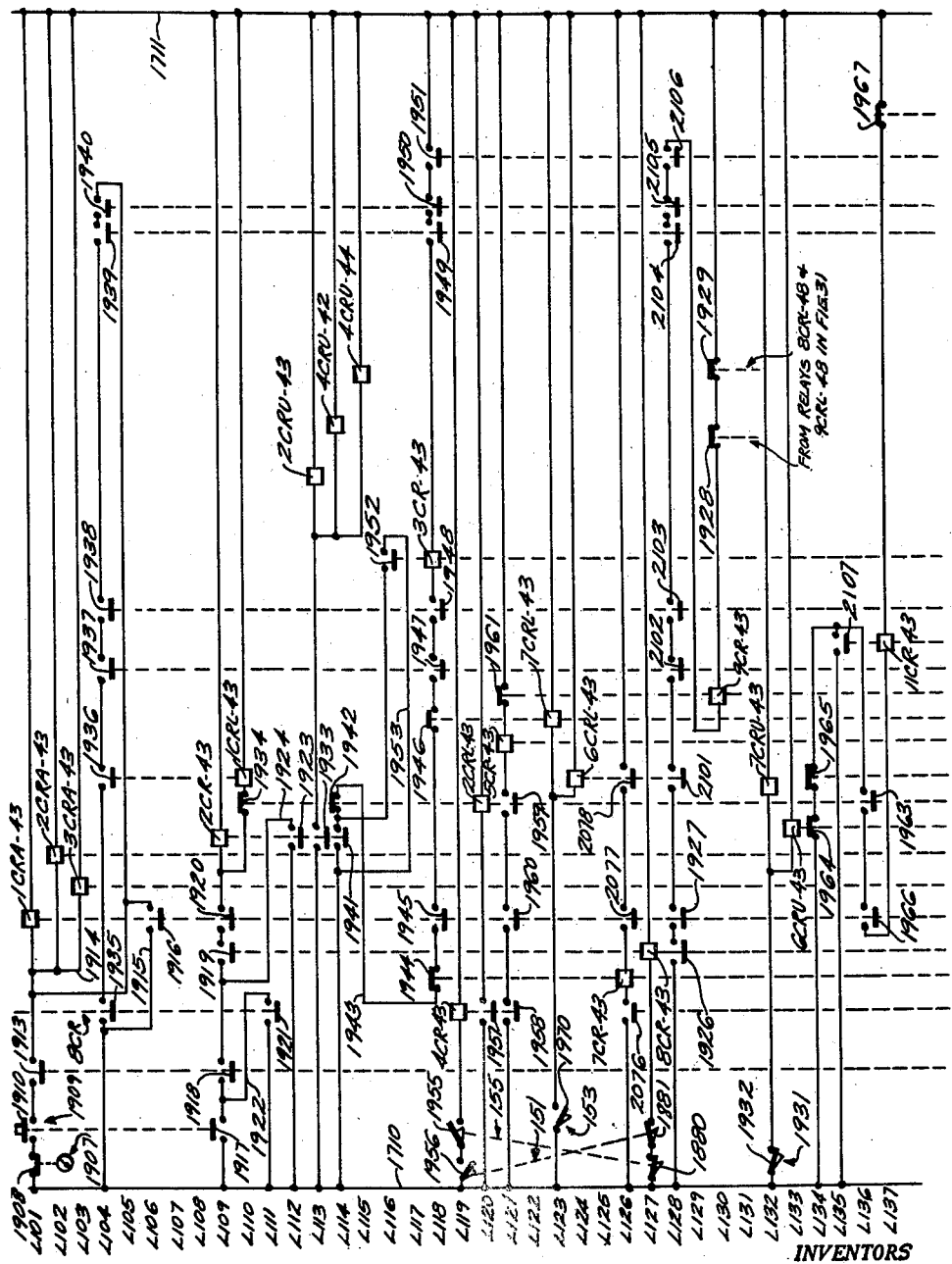
Figure 31:
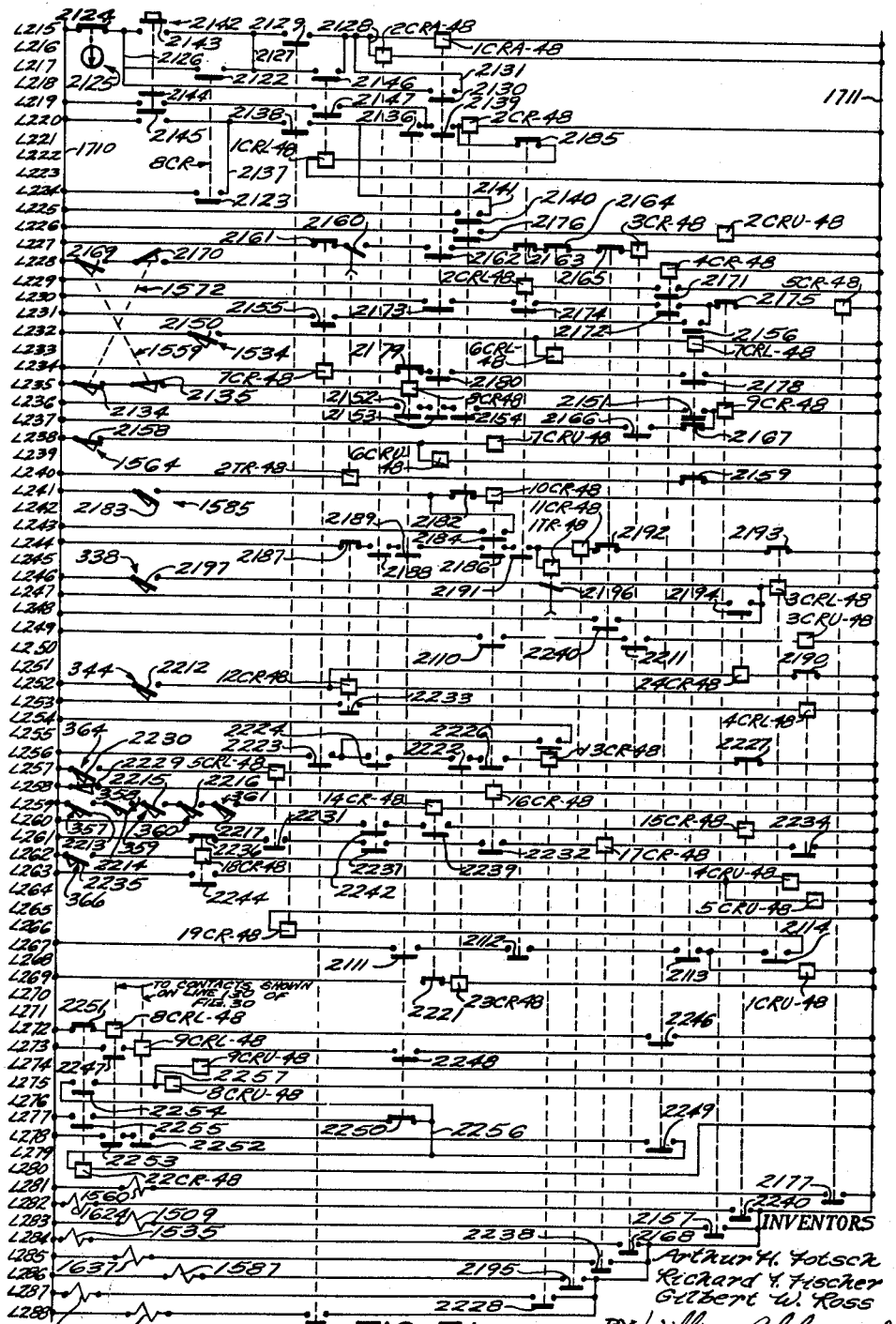

FIG. 26 is a diagrammatic view illustrating a hydraulic circuit which may be employed with the machine tool for automatically controlling the operation of the fixture head, the brake mechanism, and the clutch mechanism of the profiling and turning units as well as the transfer mechanism associated with the last profiling and turning unit and the move out station that is disposed between the two profiling and turning units;

FIG. 26a is a diagrammatic view illustrating a hydraulic circuit which may be employed for automatically controlling the cross slide and the compound slide of the turning tool unit associated with the last profiling and turning station;

FIG. 26b is a diagrammatic view illustrating a hydraulic circuit which may be employed for automatically controlling the cross slide and compound slide of the profiling tool unit associated with the last profiling and turning station;

FIG. 27 is a diagrammatic view illustrating a hydraulic circuit which may be employed for automatically controlling the operation of the loading station and its associated storage station;

FIG. 28 is a diagrammatic view illustrating a hydraulic circuit which may be employed for automatically controlling the operation of the unloading station and the storage station associated therewith, with a showing being also made of a hydraulic circuit for controlling the inspection station;

FIGS. 29 and 29a are schematic electrical diagrams, which when arranged one below the other, constitute a wiring diagram showing the interconnection of the electrical elements of the mechanisms associated with the stations 20 to 24, inclusive;

FIGS. 30, 30a and 30b are schematic electrical diagrams, which when arranged one below the other constitute a wiring diagram showing the interconnections of the electrical elements of the mechanisms associated with the stations 40 to 44, inclusive; and, FIG. 31 is a schematic wiring diagram showing the interconnections of the electrical elements of the mechanisms associated with the stations 45 to 49, inclusive.

While the invention herein described is a preferred embodiment, it is not intended to limit the invention to the specific form and arrangement shown, it being contemplated that various changes may be made without departing from the spirit and scope of the appended claims.

Reference is now made to the drawings and particularly to FIGS. 1, 1a, 1b, 2, 2a, and 2b thereof, which illustrate a production type machine tool capable of performing a series of work operations on a circular workpiece such as a railroad car wheel W while they are disposed in separate machining units or work stations of the machine tool. It is to be understood that FIGS. 1, 1a and 1b are plan views of three contiguous sections of the machine and taken together in order, constitute a plan view of the entire machine. In like manner, FIGS. 2, 2a and 2b are front elevational views of three contiguous sections of the transfer mechanism organization and taken together in the order stated constitute a front elevational view showing the transfer mechanisms of the machine. The work machining stations are indicated generally in FIGS. 1, 1a, 1b, 2, 2a and 2b by the reference numerals 23, 27, 31, 36 and 43 and are spaced along a guideway on which the workpieces are advanced step-by-step by transfer mechanisms 50, 51 52, 53, 54 and 55. The arrangement is such that each work station is associated with an independently operating transfer mechanism. Each work station is separated from the adjacent work station by one or more idle stations 22, 24, 26, 28, 30, 32, 34, 35, 37, 38, 40, 41, 42, 44, 45 and 47 and move out stations 25, 29, 33 and 39. Inserted into the line between the idle stations 45 and 47 is an inspection station 46. Preceding and following the line of work and idle stations is a loading station 21 and a receiving station 48 respectively from which workpieces are supplied to the machining units and in which the finished workpieces are unloaded. Preceding the loading station 21 and following the receiving station 48 are storage stations 20 and 49 respectively. A plurality of workpieces may be stored in the storage station 20 prior to being moved into the loading station while the finished workpieces may be moved from the receiving station 48 into the storage station 49 for storage and subsequent disposition.

The move out stations 25, 29, 33 and 39 serve as access stations for removing from or inserting workpieces into the line to thereby render the machine tool extremely flexible in operation. By providing the move out stations one or more of the machines or work stations may be inoperative, for servicing or other reasons, without stopping the operation of the entire machine tool. For example, if the work station 27 is down for any reason this station may be by-passed by removing workpieces from the line through operation of the move out station 25 and the workpieces may be reinserted back into the line through the move out station 29.

The inspection station 46 provides for inspection of the workpiece after a complete work operation has been performed on it so that an imperfect workpiece may be removed from the line prior to its being transferred to the receiving and storage stations 48 and 49. Thus, only completely acceptable finished workpieces will be transferred to the receiving and storage stations.

The workpieces or car wheels in the various stations are rotatably advanced into the succeeding stations along a horizontal guide rail 65 on a bed structure defining a rectilinear path of advance of the car wheels through the series of stations. The guide rail 65 is secured and positioned on a base structure 57, as shown in FIG. 5, and is welded or otherwise secured to the top surface of a bed structure 66. Spaced along the bed structure 66 and upstanding therefrom are a plurality of columns 58 having laterally extending overarms 59 which serve to carry a horizontally disposed reinforcing plate member 60 to which an upper car wheel guideway is secured. The upper guideway comprises a pair of horizontally extending spaced apart fence rails 61 and 62 which serve to confine the top portion of the car wheel therebetween to maintain the car wheels in an upright position as they are rolled along on the lower guide rail 65. A lower or bottom fence rail 63 carried by the base 57 is disposed to engage the flanged side of the car wheel to prevent it from slipping off of the lower guide rail 65. The columns 58 are disposed on either side of the bed structure 66 as may be desired so as not to interfere with operation of the various work stations.

The machines or work stations shown in the exemplary embodiment involve the performance of four different metal removing operations. At station 23 a boring operation is performed to rough bore the axial opening in the hub of the car wheel. At station 27 a facing operation is performed to face the back surface of the flange of the car wheel. At station 31 another facing operation is performed to machine the front face surface of the hub and also the outer surface of the car wheel rim.

Stations 36 and 43 are identical and at these stations a turning operation is performed on the flange to generate a desired contour thereto and also to turn the periphery of the running surface of a car wheel. Thus, the work operations performed on the car wheels at stations 23, 27 and 31 are relatively fast operations, while the work operation performed at stations 36 and 43 is a relatively slower operation taking approximately twice as long as the operations performed at stations 23, 27 and 31. Therefore, the exemplary machine tool shown, includes the two stations 36 and 43 for turning the flange and periphery of two different car wheels simultaneously so that the entire machine tool may operate at a speed time to the faster operations.

The boring machine at station 23 comprises a chuck head 70 which is supported on a base 71 and is operable to receive and hold a car wheel located at the station in axial alignment with a boring tool 72 carried by a tool head 73. The tool head 73 is supported for reciprocal movement in a direction transverse to the transfer line to feed the boring tool to the car wheel. The boring tool 72 is rotatably driven by a motor 74 supported on the base 71. The boring tool and chuck head structure of station 23 are described in the copending application of Arthur H. Fotsch, John R. Finley, Gilbert W. Ross and Richard F. Fischer, Serial No. 713,573, filed February 6, 1958, and therefore will not be described here in detail.

The facing machine at station 27 generally comprises a base 80 which extends transversely of the production line on either side thereof and has a fixture head 81 supported thereon. The fixture head 81 is provided with a rotatable and axially movable chucking spindle 82 which is movable into the axial opening of a hub of a car wheel at the station and operable to securely clamp the car wheel thereto. In order to clamp the car wheel in machining position the chucking spindle 82 with the car wheel secured thereto is retracted to force the car wheel against a rotatable drum which is similar to a drum 553 associated with a fixture head 95a and shown in FIG. 17, supported within the fixture head, and the drum and the car wheel secured to it, rotated. A pair of tool holders 84 and 85 are mounted on a slide 86 that is supported for movement parallel to the transfer line on a pair of ways 87 provided on a cross slide 88. The cross slide 88 is supported for transverse movement toward and away from the transfer line on a pair of ways 89 provided on the base 80. Thus, the tools carried by the tool holders 84 and 85 may be advanced into work engagement with the rotating car wheel by advancing the cross slide 88 and then be moved parallel to the car wheel to perform the desired facing operation on the car wheel through the feeding movement of the slide 86.

The facing machine at station 31 is identical to the facing machine at station 27 with the exception that it is reversed so that a facing operation may be performed on the opposite side of a car wheel at the station. Thus, the fixture head 81a is disposed on the base 80a at the rear of the transfer line. The fixture head 81a is provided with a rotatable and axially movable chucking spindle 82a which is rotatably driven by a motor 83a. Likewise, a pair of tool holders 84a and 85a are mounted in car wheel facing position on a slide 86a which is supported for movement parallel to the transfer line on a pair of ways 87a provided on a cross slide 88a. The cross slide 88a is supported for movement transversely of the transfer line toward and away from the chuck head 81a, on a pair of ways 89a provided on the base 80a.

The machine units at stations 36 and 43 are identical, and generally comprise fixture heads 95 and 95a in which rotatable and axially movable chucking spindles 96 and 96a, respectively, are supported. The fixture head structures 95 and 95a are identical to the fixture heads 81 and 81a at stations 27 and 31. The fixture heads 95 and 95a have axial movable chucking spindles 96 and 96a which are operable to engage the walls of the axial openings of the car wheels and are operable to retract the car wheels from the guide rail 65 to clamp them in machining position.

The machine units at stations 36 and 43 include tool units 97 and 97a which are located on the right hand side of the fixture heads 95 and 95a, respectively, as viewed in FIGS. 1a and 1b. The tool units 97 and 97a comprise tool carrying cross slides 98 and 98a which are supported for movement towards or away from their respective fixture heads, on ways 99 and 99a provided on compound slides 101 and 101a, respectively. The compound slides 101 and 101a are supported for movement toward or away from the production line on ways 102 and 102a provided on bases 103 and 103a, respectively. The tools carried on the cross slides 98 and 98a are employed to turn the periphery of the tread of the car wheel and to form the radius of the edge of the car wheel which is adjacent the tread and front face of the wheel.

The machines at stations 36 and 43 also include tool units 107 and 107a which are disposed to the left side of their respective fixture heads 95 and 95a, as viewed in FIGS. 1a and 1b. The tool units 107 and 107a comprise tool carrying cross slides 108 and 108a which are supported for movement parallel to the transfer line towards or away from their respective fixture heads 95 and 95a, on ways 109 and 109a provided on compound slides 110 and 110a, respectively. The compound slides 110 and 110a are supported for movement toward or away from the transfer line on ways 111 and 111a provided on bases 112 and 112a. The tools carried by the cross slides 108 and 108a are disposed so as to engage with the flange of the car wheels located in the respective stations to perform a profiling operation on the flange of the car wheel.

The stations 21 through 48 are equally spaced along the path of travel of the workpieces. Preferably, the two turning stations are disposed as the last two work stations, as shown in FIGS. 1a and 1b, so that all of the relatively faster work operations may be performed first with the relatively slower turning operations being formed as the last work operations.

The car wheels are advanced through the various stations by means of the transfer mechanisms 50, 51, 52, 53, 54 and 55, as previously mentioned, each of which is independently operable between certain prescribed stations. Thus, the transfer mechanism 50 associated with the work station 23 is operable to transfer car wheels from stations 21 through 26; the transfer mechanism 51, associated with the work station 27 operates to transfer car wheels from station 26 through station 28; the transfer mechanism 52, associated with the work station 31 operates between station 28 through station 34; the transfer mechanisms 53 and 54, associated with the work stations 36 and 43, respectively, have their transfer bars connected together and operate as a unit from station 33 through station 46; and the transfer mechanism 55, associated with the inspection station 46 operates from station 45 through station 48.

With the exemplary machine tool shown it is contemplated transferring car wheels through the series of stations in a manner that each car wheel dwells in and is machined at each of the stations 23, 27 and 31 at which the relatively faster machining operations are performed, while car wheels are moved into and machined in the slow operating stations 36 and 43 where the car wheels remain while two cycles are being completed at the faster stations. To accomplish this, the car wheels in stations 33 through 44 are advanced in double length steps so that a car wheel in station 34 will be moved into work station 36 while a car wheel in station 33 is moved past station 34 and into station 35. The car wheel in station 41 will be moved into the slow work station 43 while the car wheel in station 42 will be advanced through the slow station 43 into station 44. Thus, a car wheel that is in the even numbered station 34 will have the slower turning operation performed on it at the even numbered station 36 while the car wheel in the odd numbered station 33 will have the slower turning operations performed on it at the odd numbered station 43.

In order to accomplish this double step transfer, the transfer mechanism 54, acting as a unit with the transfer mechanism 53, must also operate to transfer car wheels from stations 43 and 44 into stations 45 and 46, respectively, to clear these stations for the car wheels from stations 41 and 42. Since the transfer mechanisms 53 and 54 need only operate every other cycle, the transfer mechanism 55 operating between stations 45 through 48 will necessarily operate every cycle. In operating every cycle the transfer mechanism 55 will serve to advance car wheels in stations 45, 46 and 47 one station in every cycle. Thus, in a first cycle of operation the car wheels in stations 45, 46 and 47 will be advanced to stations 46, 47 and 48, respectively. In the second cycle of operation and operating in conjunction with the cycle of operation of the transfer mechanisms 53 and 54, the car wheels in stations 46 and 47 will be advanced into stations 47 and 48, respectively, making the stations 45 and 46 available to car wheels from stations 43 and 44 advance in a double step by the transfer mechanisms 53 and 54.

The correlated differential advancing movements of the car wheels through the machine may be effected through the use of the independent transfer mechanisms 50 through 55 of the reciprocable type. These transfer mechanisms are arranged to be actuated in proper timed sequence and to act selectively on the proper car wheels in the different stations. Herein, the transfer mechanism 54 associated with the turning station 43 for accomplishing the double station transfer between stations 40 through 46 is set forth in detail and comprises a pair of horizontally disposed guide bars 116 and 117 which are secured in spaced relationship to the columns 58 in mounting brackets 118, 118a, 118b and 118c, the guide bars 116 and 117 being of a length to extend between stations 40 and 42, as shown in FIGS. 3 and 4.

A transfer bar carrier, generally indicated by the reference numeral 119, is slidably mounted on the guide bars 116 and 117 for movement between a retracted position, as shown in FIGS. 3 and 4, to an advanced position at the opposite end of the bars 116 and 117, at station 42. The transfer bar carrier 119 as shown in FIGS. 14, 15 and 16 comprises a pair of spaced arm members 120 and 121 that are disposed so as to extend transversely of the guide bars 116 and 117. A tubular elongated bearing member 122 having an axial bore 123 is secured to the top surfaces of the arm members 120 and 121 as by welding. A second tubular bearing member 124 having an axial bore 125 is secured to the bottom surface of the two arm members as by welding. The two bearing members 122 and 124 are adapted to be slidably mounted on the guide bars 116 and 117 in a manner so that the carrier 119 is slidably supported on the bars for movement between the stations 40 and 42, as previously mentioned. The inner extending ends of the arm members 120 and 121 are provided with aligned openings through which a relatively long transfer bar member 127 extends.

Mounted about the transfer bar 127 and disposed between the two arm members is an actuating sleeve member 128 which is pin connected to the transfer bar 127 so as to be operable to move the transfer bar axially and also to effect its rotation. The actuating member 128 which is disposed between the two arm members 120 and 121 is provided with a pair of downwardly or radially extending spaced apart lugs 130 and 131 to which is pivotally secured the free end of a piston rod 137 of a fluid actuator, generally indicated by the reference numeral 132. The fluid actuator 132 comprises a cylinder 133 which is disposed between the two arm members 120 and 121. The cylinder 133 has one end pivotably secured to a rod 135 which is mounted in the outwardly extending ends of the arms 120 and 121 that are rigidly reinforced by straps 134 and 134a. The cylinder 133 reciprocably supports a piston 115, shown diagrammatically in FIG. 26, which is provided with the piston rod 137, the free end of which is pivotably connected to the lugs 130 and 131 of the actuating sleeve member 128, as previously mentioned, and, as clearly shown in FIGS. 15 and 16. To effect movement of the transfer bar carrier 119 between stations 40 and 42 to produce an axial movement of the transfer bar 127 from a retracted position to an advanced position and return there is provided a fluid actuator 140 comprising a relatively long cylinder 136 that is mounted on the sides of the columns 58. A piston 114 is reciprocably supported within the cylinder and is provided with an elongated piston rod 184 the free end of which is threadedly connected into the side of the arm 121. The transfer bar 127 may therefore be moved axially by actuation of the piston 114 in the cylinder 136 and it may be pivoted about its axis by the operation of the actuator 132.

To effect movement of car wheels at stations 40, 41, 42, 43 and 44 in a controlled rolling movement of advancement on the guide rail 65, the transfer bar 127 is provided with a plurality of arm members 138, 138a, 138b, 138c, 138d, 138e and 138f. The arm members 138 to 138f, inclusive, serve to actuate and control the advancement of the car wheels and are provided with rollers 139, 139a, 139b, 139c, 139d, 139e, 139f, 139g, 139h, 139i, 139j and 139k. Since the arms 138 and 138f are the end arms of the transfer bar they are provided with the single rollers 139 and 139k, respectively, as shown in FIGS. 2a, 2b, 3 and 4. The intermediate arms 138a, 138b, 138c, 138d and 138e, each are provided with a pair of rollers, the arm 138a having the rollers 139a and 139b, the arm 138b having the rollers 139c and 139d, the arm 138c having the rollers 139e and 139f, the arm 138d being provided with the rollers 139g and 139h, and the arm 138e having the rollers 139i and 139j. The rollers of the respective arms are so arranged that when the actuator 132 is operated to rotate the transfer bar 127 and pivot the arms 138 to 138e inclusive, into an operating or transfer position the rollers 139 and 139a serve to engage the periphery of a car wheel in the station 39, as shown in FIG. 2a, while the other rollers similarly engage the peripheries of the other car wheels in the line in the manner illustrated in FIG. 2b. Thus, upon axial movement of the transfer bar 127 in a direction to advance the car wheels, the rollers 139, 139b, 139d, 139h, and 139j, will operate to produce a rolling movement of the car wheels associated therewith while, the rollers 139a, 139c, 139e, 139g, 139i and 139k will serve to control the rolling advancement of the wheels. When the transfer bar 127 is moving in a direction of transfer it will move between a plurality of sets of guide rollers 141, 141a, 141b and 141c which serve to support and guide the unsupported extending end of the transfer bar as it moves axially in an advancing direction.

As shown in FIG. 15, the transfer bar actuating sleeve member 128 is provided with a pair of lugs 142 and 143 which threadedly receive threaded studs 144 and 145, respectively, and which serve as adjustable stops for controlling the amount of angular movement which will be imparted to the transfer bar actuating member 128 and thereby serve to control the pivotal positioning of the transfer arms. The threaded studs 144 and 145 are disposed to engage a stop bar 146 to limit the amount of rotation that may be imparted to the actuating member 128. Thus, when the transfer bar actuating member 128 is rotated to a position wherein the arms of the transfer bar 127 are in operating position the stud 145 of the lug 143 engages the stop bar 146 to effect a positive positioning of the arms in their operating position.

In operation with the transfer arms 138, 138a, 138b, 138c, 138d, 138e and 138f in their operating pivotal position to advance the car wheels in a controlled rolling movement of advancement, the fluid actuator 140 will be energized to operate in a rightward direction, as viewed in FIGS. 1b, 2b, 3 and 4, to effect advancement of the transfer bar carrier 119 rightwardly along the guide bars 116 and 117 and thereby effect the axial movement of the transfer bar 127 for moving its associated transfer arms for advancing the car wheels along the guide rail 65. Since, as previously mentioned, the machining unit at station 36 is identical to the machining unit at station 43 and performs the same profiling and turning operation, only every other car wheel will be moved into station 43 to have a profiling and turning operation performed on it therein, and the fluid actuator 140 will operate to move the car wheels a distance corresponding to the space between two stations in a double step transfer. For example, as viewed in FIGS. 1b, 2b, 3 and 4, the car wheel in station 42 will have had a profiling and turning operation performed on it at the preceding machining station 36, and therefore, it will be necessary to pass this car wheel through station 43 into station 44 while the car wheel in station 41 must be moved into station 43 to have a profiling and turning operation performed on it. Since the transfer mechanism 54 associated with the work station 43 is an independently operable unit, the transfer bar 127, when retracted, will extend rearwardly through station 39 sufficiently far so that the end transfer arm 138 will be engageable with the periphery of a car wheel in station 39 at the left side of the car wheel, as shown in FIG. 2a. Thus, when the transfer mechanism operates rightwardly in a transfer movement, the car wheels that are in stations 39, 40, 41, 42, 43 and 44 will be advanced into stations 41 to 46, respectively. It is apparent that the car wheels in the odd numbered stations will have a profiling and turning operation performed on them at the odd numbered turning station 43, while the car wheels in the even numbered stations will have the same profiling and turning operation performed on them at the even numbered station 36. When the transfer is completed, a dog 150 secured to the top of the bearing member 122, as shown in FIGS. 14 and 15, will actuate a limit switch 151, shown in FIGS. 4 and 26, to de-energize the fluid actuator 140 for stopping its operation. The limit switch 151, when actuated, is also operable to effect energization of the fluid actuator 132 carried by the carrier 119 to effect its operation in a direction to rotate the transfer bar 127 in a direction to retract the arms 138 to 138f, inclusive, so as to move the rollers of the arms out of car wheel engagement. When the transfer bar 127 has been rotated sufficiently in a direction to fully retract the arms out of car wheel engagement, a dog 152 on the bottom of the transfer bar, as shown in FIGS. 14, 15 and 16, actuates a limit switch 153, shown in FIG. 4 and diagrammatically in FIG. 26, to effect energization of the fluid actuator 140 for its operation in a direction to move the carrier 119 leftwardly for moving or retracting the transfer bar 127 to its original position. When retraction has been fully completed a dog 154 provided on the member 122, as shown in FIGS. 4 and 14, actuates a limit switch 155 to effect de-energization of the fluid actuator 140 stopping its operation. The limit switch 151, when actuated, will also operate to initiate the fixturing cycle, to be subsequently described, so that fixturing of the car wheel to the fixture head 95a takes place at the same time that the transfer bar 127 is being retracted.

Since the transfer mechanisms 53 and 54 both operate in double step transfers and operate only every other cycle, their associated transfer bars are mechanically connected together and the fluid actuators thereof are operated simultaneously so that the transfer mechanisms 53 and 54 operate as a single unit. That is, the transfer mechanisms 53 and 54 operating as a unit and in every other cycle function to transfer car wheels in stations 33 through 44 into stations 35 through 46, respectively.

Since the transfer mechanism 52 operates from station 28 through station 33, a transfer bar 156 thereof is provided with an arm 157 having a roller 158, an arm 157a having rollers 158a and 158b, an arm 157b having rollers 158c and 158d, an arm 157c having rollers 158e and 158f, an arm 157d having rollers 158g and 158h, and an arm 157e having rollers 158i and 158j. Thus, the periphery of the car wheels in the stations 28 to 32 will be engaged on opposite sides of the wheel by a pair of rollers which serve to advance the car wheels along the guide rail 65 in a controlled rolling movement of advancement. It will be noted that a car wheel in the station 33 is engaged only by the roller 158j and as the transfer mechanism 52 is operated in an advancing movement the car wheel in the station 33 will be advanced by the roller 158j but no control roller has been provided. To prevent the car wheel being advanced from station 33 into station 34 from rolling past the latter station, a solenoid actuated stop mechanism 159 is provided. The stop mechanism 159 comprises a solenoid 167 having a plunger 169, as diagrammatically shown in FIG. 2a. The solenoid 167 is normally de-energized to permit the plunger 169 thereof to extend into the path of travel of the car wheels so that a car wheel advanced along the production line from station 33 into station 34 by the roller 158j of the arm 157e will be stopped at the station 34 by the extended plunger 169 of the stop mechanism 159. The necessity of omitting a companion control roller for the advancing roller 158j is apparent if it is recalled that during each alternate cycle of operation the transfer mechanisms 52 and 53 operate simultaneously. Therefore, if a companion control roller was supplied for the advancing roller 158j a car wheel advanced from station 33 into station 34 would be engaged by the advance roller 158j and the omitted control roller. It would also be engaged by the rollers 197 and 197a of the arms 198 and 198a of the transfer bar 199 of the transfer mechanism 53. Therefore, during the cycle of operation wherein the transfer mechanisms 52 and 53 operate simultaneously to effect advancement of car wheels the transfer mechanism 52 is operating to advance car wheels one station, so that it would function to advance the car wheel in the station 33 into station 34. However, at the same time, the transfer mechanism 53 is engaging the same wheel in station 33 but is operating to advance car wheels two stations and would function to advance the car wheel in station 33 into station 35 but would be prevented from doing so by the control roller of the transfer mechanism 52 if such control roller were not omitted. Thus, by omitting the companion control roller for the advancing roller 158j and providing the stop mechanism 159, such interference is avoided and the transfer mechanism 53 is able to move the car wheel in station 33 two stations and beyond the range of the transfer mechanism 52.

With the arrangement shown, when the transfer mechanism 53 is operated so that the transfer bar 199 thereof is rotated to retract the arms 198 prior to a resetting movement of the transfer mechanism into the position it occupies, as shown in FIG. 2a, a limit switch (not shown) is actuated and operates to energize the solenoid 167 of the stop mechanism 159 to effect withdrawal of the plunger 169 thereof out of the path of the travel of the car wheels. Therefore, when the transfer mechanism 53 has been positioned, as shown in FIG. 2a, and the arms thereof are engaged with car wheels in the various stations, the transfer mechanism 53 may operate to advance the car wheels through two stations and will continue to move the car wheel out of engagement with the roller 158j of the arm 157e of the transfer mechanism 52, so as to advance it into the station 35. As the transfer mechanism 53 fully advances, another limit switch (not shown) will be released to effect de-energization of the solenoid 167 of the stop mechanism 159 to permit the plunger 169 thereof to be spring returned into the path of car wheel travel. In this condition the arrangement is set for the next cycle of operation wherein the transfer mechanisms 53 and 54 are idle and the transfer mechanism 52 operates to advance car wheels one station.

Each of the transfer mechanisms 50, 51, 52, 53, 54 and 55 are identical in construction and arrangement except for the length of the individual transfer bars, the description of the transfer mechanism 54 will apply to all of the other transfer mechanisms. It should be kept in mind, however, that the transfer mechanisms 50, 51, 52 and 55 operate every cycle while the transfer mechanisms 53 and 54 operating as a unit, operate only every other cycle. Therefore, the transfer mechanism 55 will operate to move workpieces in stations 45, 46 and 47 into stations 46, 47 and 48, respectively. Since at the time the transfer mechanism 55 operates in its first cycle the transfer mechanisms 53 and 54 are idle, station 45 will be vacant during one cycle. On the second cycle of operation the transfer mechanism 55 will operate to move car wheels that are in stations 46 and 47 into stations 47 and 48. The now vacated station 46 and the previously vacated station 45 are therefore free to receive car wheels from stations 43 and 44 by operation of the transfer mechanism 54.

Figure 6:
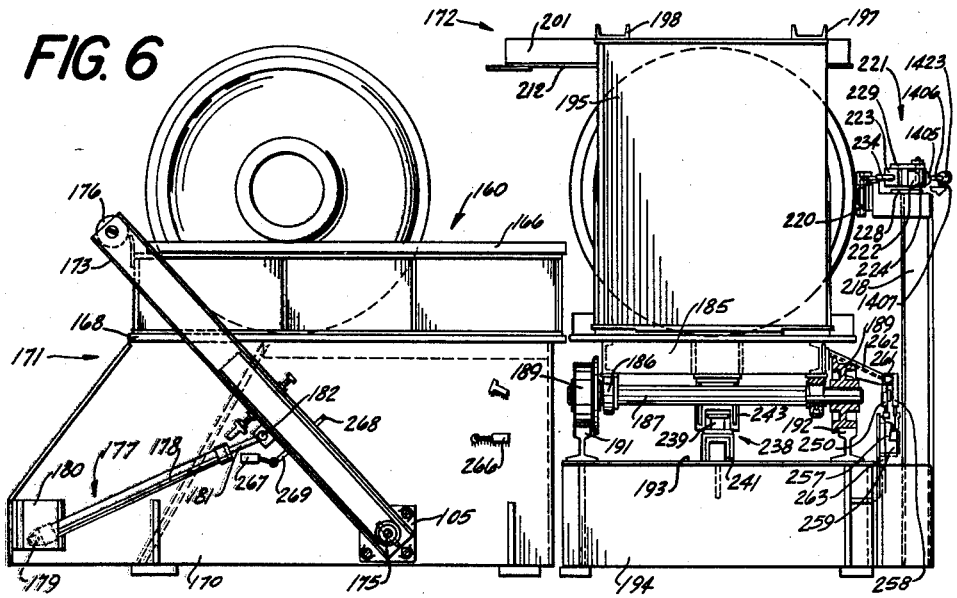
FIG. 6 is an enlarged fragmentary view in front elevation illustrating the loading station and its associated storage station.
Figure 7:
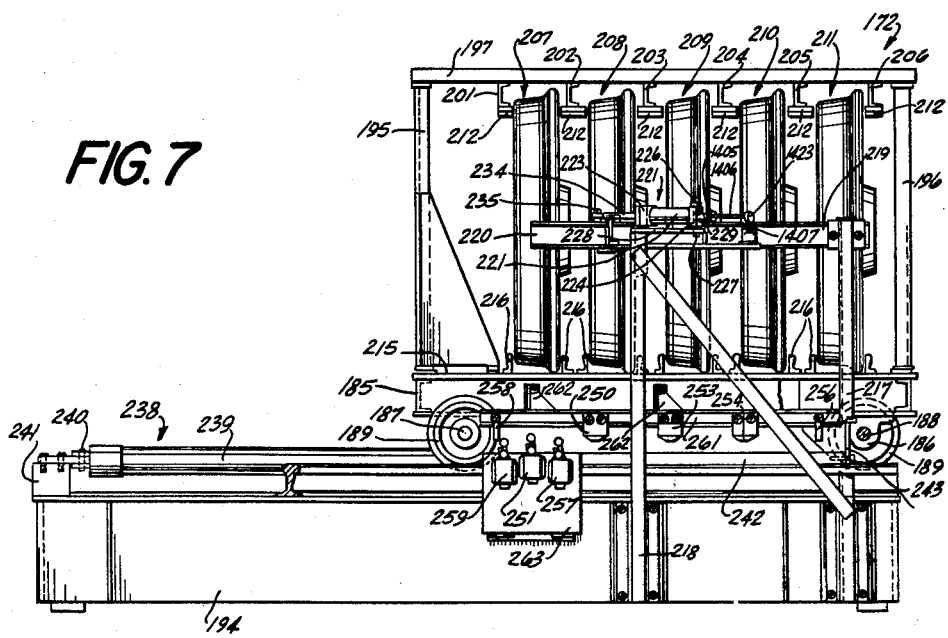
FIG. 7 is an enlarged view in side elevation illustrating the loading station with the showing being made as seen from the right side of FIG. 6.

As previously stated, the exemplary machine tool illustrated includes the storage station 20 and loading station 21 which cooperate to provide a novel means for providing a continuous supply of car wheels to the transfer line. As shown in FIGS. 1, 6 and 7, a plurality of car wheels are supplied to a storage rack 160 of the storage station 20 by suitable means such as a mobile truck or power lift (not shown). The rack 160 has a plurality of separate chutes or stalls 161, 162, 163, 164 and 165 formed by horizontally spaced apart fence rails 166, one of which is shown in FIG. 6, that are upstanding from a platform 168 carried by a fabricated base 170. Thus, a plurality of car wheels are available in the individual chutes in an upright condition for movement into the loading station 21.

To move the car wheels simultaneously from the rack 160, a starter mechanism, generally indicated by the reference numeral 171, is provided which operates to roll the car wheels from the storage rack 160 into an indexable carriage 172 at the loading station 21. As shown in FIGS. 1 and 6, the starting mechanism 171 comprises a pair of arms 173 and 174 which are pivotally mounted on extending ends of a rotatable shaft 175 on either side of the base 170 the shaft 175 being journalled in suitable bearing supports one of which is indicated at 105. The arms 173 and 174 extend angularly upwardly from the shaft 175 with the free ends thereof rotatably supporting a car wheel engaging roller bar 176. The arrangement is such that when the arms 173 and 174 are in the retracted position, as shown in FIG. 6, the roller bar 176 will be located behind the car wheels disposed in the storage rack 160, and at a position somewhat below the horizontal axial plane of the car wheels. Therefore, when the arms 173 and 174 are pivoted towards the indexable carriage 172, the roller bar 176 will engage the peripheries of the car wheels simultaneously and at a point below the horizontal plane of the axes of the car wheels to thereby move them into the indexable carriage 172. To effect the pivotal movement of the arms 173 and 174, a pair of fluid actuators 177 and 177a are provided. The fluid actuators are identical and comprise cylinders 178 and 178a pivotally secured to pins 179 and 179a carried in brackets 180 and 180a mounted on the sides of the base 170. Pistons 183 and 183a, as shown diagrammatically in FIG. 27, are reciprocally supported within the cylinders 178 and 178a and are provided with piston rods 181 and 181a, respectively, the extending ends thereof being pivotally connected to the arms 173 and 174, respectively, the connection of the piston rod 181 to the arm 173 being indicated at 182, as shown in FIG. 6. Thus, when the fluid actuators 177 and 177a associated with the arms 173 and 174, respectively, are energized to effect movement of their respective arms, the arms 173 and 174 will pivot about the shaft 175 thereby effecting an arcuate path of travel of the roller bar 176 into engagement with the peripheries of the car wheels. Continued movement of the arms 173 and 174 will cause the car wheels to roll out of their respective chutes and into aligned chutes provided in the indexable carriage 172.

The indexable carriage 172 of the loading station 21, as shown in FIGS. 6 and 7, comprises a fabricated frame 185 having depending axle brackets 186 arranged to rotatably support a pair of axles 187 and 188. Flanged wheels 189 secured to the extending ends of the axles are disposed to travel on a pair of guide rails 191 and 192. The guide rails 191 and 192 are secured in parallel spaced relationship on the top surface 193 of an elongated base 194 that is disposed transversely of the production line of the machine tool, as clearly shown in FIG. 1, and extends rearwardly of the transfer line a distance sufficient to accommodate the carriage 172 when in a retracted position to align it with the storage rack 160 for receiving the car wheels therefrom. The carriage is adapted to be indexed in a step-by-step movement so that successive car wheels in the carriage will be aligned with the guide rail 65 of the transfer line of the machine tool organization. In order that the carriage may be advanced in a step-by-step movement, the base 194 also extends outwardly from the front of the transfer line a distance sufficient to permit the carriage to be advanced incrementally into successive positions and finally into a fully advanced position wherein a car wheel at the rear of the carriage or extreme right, as viewed in FIG. 7, will be aligned with the guiding and supporting rail 65 of the line of the machine tool.

Upstanding from the carriage frame 185 are a pair of supporting end frame members 195 and 196 on which a pair of channel members 197 and 198 are secured. Secured to the under surface of the channel members 197 and 198 and extending crosswise of the carriage 166 are a plurality of parallel horizontally spaced channels 201, 202, 203, 204, 205 and 206 which extend outwardly from the carriage 166 toward the storage rack 160. The channels 201 to 206, inclusive, serve to define chutes 207, 208, 209, 210 and 211 which are complementary to the chutes 161, 162, 163, 164 and 165 in the storage rack 160. Each of the channels has secured to its bottom surface hardened steel guide plates 212 which serve to maintain the car wheels in an upright vertical position as they are rolled into the respective chutes. The leftwardly extending ends of the guide plates 212 are tapered to facilitate the entry of the car wheels from the respective chutes in the storage rack 160 as they are rolled therefrom into the complementary chutes of the carriage 166. Secured to the top surface or floor 215 of the carriage are a plurality of crosswise extended angle bars 216 which are arranged in spaced apart pairs so as to define guideways to confine the bottom of the car wheels within the respective chutes and thereby, in conjunction with the plates 212, serve to maintain the car wheels in a vertical position in the carriage 172 within the respective chutes.

To prevent the car wheels from rolling through the carriage 172 and out of the opposite side thereof a pair of post members 217 and 218 are secured to the side of the base 194 and extend upwardly therefrom. A horizontal fence or stop rail 219 of a length to extend from the chute 211 to approximately the mid-point of the chute 208 when the carriage 166 is in the retracted position is secured to the post members 217 and 218, as shown in FIG. 7. To the left end of the fence rail 219, as viewed in FIG. 7, is pivotally secured a gate member 220 which extends substantially to the mid-point of the chute 207. The fence rail 219 and gate member 220 are effective to prevent the car wheels from rolling out of the carriage 172. The carriage 172 when in the retracted position, as shown in FIGS. 1 and 7, is positioned so that chute 207 is aligned with the guide rail 65 of the transfer line. To actuate the gate member 220 to an open or closed position a fluid actuator 221 is employed which comprises a cylinder 222 having squared end closures 223 and 224. The end closure 224 is provided with a pair of diametrically disposed outwardly extending pins 226 and 227 which are employed to effect a pivotal mounting of the cylinder 222 in a horizontal position. The pin 227 is received within a suitable opening provided in a horizontal bracket plate 228. A securing plate 229 having a suitable opening in which the pin 226 is engaged is bolted or otherwise made secure to the bracket plate 228 and serves to hold the cylinder 222 in position. The arrangement is such that the cylinder 222 is freely pivotable in a horizontal plane about the pins 226 and 227.

A reciprocal piston 233, shown diagrammatically in FIG. 27, is contained within the cylinder 222 and is provided with a gate actuating rod 234 the free end of which is pivotally connected to the gate member 220 as at 235. Thus, when the piston 233 of the cylinder 222 is positioned within the cylinder at the leftward end thereof, as viewed in FIGS. 7 and 27, the gate actuating rod 234 will have been extended to pivot the gate member 220 to a closed position, blocking the exit from the carriage to the transfer line. On the other hand, movement of the piston 233 in the opposite direction to the right end of the cylinder 222 will pivot the gate 220 to an open position to permit the wheel in the chute that is in alignment with the gate to be discharged therefrom.

Incremental movement of the carriage 166 is effected by means of a fluid actuator 238 disposed in the bed 194 between the carriage guide rails 191 and 192. The fluid actuator 238 comprises a cylinder 239 the left end thereof being pivotally secured as at 240 to a bracket 241 that is welded to the top surface 193 of the bed 194. A piston 244 reciprocally supported within the cylinder 239, as diagrammatically shown in FIG. 27, is provided with a piston rod 242 the free end thereof being connected to a bracket 243 depending from the carriage frame 185. Leftward movement of the carriage 172, as viewed in FIG. 7, is performed in increments to index the carriage 172 for successively aligning the chutes 208, 209, 210 and 211 with the guide rail 65 of the transfer line. Thus, when a car wheel in the chute 207 of the carriage 172 has been removed therefrom and the gate 220 is returned to the closed position, as shown in FIGS. 6 and 7, the fluid actuator 238 will be energized to effect leftward movement of the carriage 172. The carriage will move leftwardly under the influence of the actuator 238 until the succeeding chute 208 is aligned with guide rail 65 of the transfer line. At this time, a dog 250 will actuate a limit switch 251 to effect de-energization of the fluid actuator 238 stopping the carriage in position wherein the chute 208 is aligned with the guide rail 65. After the car wheel in the chute 208 has been removed therefrom and the gate 220 has been closed the fluid actuator 238 will again be energized to effect leftward movement of the carriage to effect alignment of the chute 209 with the guide rail 65. At this time, a dog 253 will actuate the limit switch 251 to deactivate the fluid actuator 238 for stopping the carriage. Thereupon, the gate 220 will be caused to open by the operation of the fluid actuator 221 and the car wheel will then be discharged from the chute 209. After the gate 220 is again closed the fluid actuator 238 will again be energized to effect further incremental leftward movement of the carriage to a position wherein the chute 210 will be aligned with the guide rail 65. At this time, the limit switch 251 will again be actuated by another dog 254 to once again de-energize the actuator 238 for stopping the carriage with the chute 210 in alignment with the guide rail 65 of the transfer line. The gate 220 will be opened and the car wheel advanced out of the chute 210 onto the guide rail 65 and into the idle station 22. The gate 220 will again be closed and the fluid actuator 238 will once again be energized to move the carriage 172 leftwardly to its fully advanced position where the chute 211 will be aligned with the guide rail 65 of the transfer line. At this time, a dog 256 will actuate a limit switch 257 which operates to effect de-energization of the actuator 238. After the car wheel has been removed from the chute 211 and with the gate 220 closed and the limit switch 257 actuated the fluid actuator 238 will be energized for operation in the opposite direction to retract the carriage 172. When the carriage 166 reaches a fully retracted position a dog 258 will actuate a limit switch 259 to deactivate the fluid actuator 238.

The dogs 250, 253, 254, 256 and 258 are adjustably secured to a horizontal dog bar carrier 261 that is secured to the outwardly extending ends of a plurality of extending brackets 262. The brackets 262 are bolted to the side of the carriage frame 183, as clearly shown in FIGS. 6 and 7. The limit switches 251, 257 and 259 are mounted on a plate 263 secured to the side of the base 194. The dogs 256 and 258 which actuate the limit switches 257 and 259, respectively, are arranged so as to be disposed in a plane which is displaced from the plane containing the dogs 250, 253 and 254, as shown in FIG. 6. Likewise, the limit switch 251 which is actuated by the dogs 250, 253 and 254 is arranged so as to extend outwardly beyond the limit switches 257 and 259 into the plane containing the dogs 250, 253 and 254. In this manner the dogs 250, 253 and 254 will pass in front of the limit switches 257 and 259 and clear the limit switches as the carriage 172 is indexed.

The limit switch 259, when actuated, is also operable to effect energization of the fluid actuators 177 and 177a for operation in a direction to pivot the arms 173 and 174 of the car wheel starter mechanism 171 of the storage rack 160 in a clockwise direction, as viewed in FIG. 5, to engage the roller bar 176 against the car wheels in the storage rack 160. In moving with the arms 173 and 174 the roller bar 176 will roll the car wheels out of the storage rack 160 and into the associated chutes of the carriage 172. When the arms 173 and 174 have moved their limit of clockwise travel, a limit switch 266, mounted on the side of the base 170, will be actuated by a dog 268, shown in FIG. 6 and diagrammatically in FIG. 27. When the limit switch 266 is actuated it operates to de-energize the actuators 177 and 177a for stopping clockwise movement of the arms 173 and 174. The limit switch 266 is also operable when actuated to effect energization of the fluid actuators 177 and 177a for operation in the opposite direction to thereby pivot the arms 173 and 174 in a counterclockwise direction to return them to their normal retracted position, as shown in FIG. 6. When the arms 173 and 174 are fully retracted a limit switch 267 will be actuated by a dog 269 to deactivate the fluid actuators 177 and 177a.

The unloading station 48 and storage or bank station 49 are very similar to the loading station 21 and storage station 20. The finished car wheels are transferred from the transfer line guide rail 65 by being rolled into an indexable carriage, generally identified by the reference numeral 275 in FIGS. 1b and 11 and diagrammatically in FIG. 28. As shown in FIG. 11, the carriage 275 comprises a frame 276 having a plurality of flanged wheels 277, one of which is shown. The flanged wheels are disposed to roll upon a pair of spaced guide rails 278 and 279 that are secured to the outwardly inclined top surface 281 of a bed or base structure 282. The base 282 is disposed transversely of the transfer line of the machine tool, as clearly shown in FIG. 1b, and extends outwardly from the front of the transfer line a distance sufficient to accommodate the carriage 275, when in a retracted or initial wheel receiving position, to align a chute 298 thereof with the guide rail 65, as shown in FIG. 11. The base 282 also extends rearwardly of the transfer line a distance sufficient to permit the carriage 275 to be moved to an advance position wherein the side thereof will be directly opposite the storage rack 286 of the storage station 49.

Upstanding from the top surface 284 of the carriage frame 276 are a pair of end frame members 287 and 288 on which a pair of channel members 289 and 291 are secured. Secured to the under surfaces of the channel members 289 and 291 and extending crosswise of the carriage 275 are a plurality of spaced channel members 292, 293, 294, 295, 296 and 297 which extend outwardly from the carriage 275 toward the storage rack 286 of station 49. The channels 292 to 297, inclusive, serve to define top chutes or upper car wheel guideways 298, 299, 301, 302 and 303. Each of the channel members have secured to their bottom surface hardened steel plates which serve to maintain the car wheels in an upright condition as they are rolled into the respective chutes. Secured to the inclined top surface or floor 284 of the carriage 275 are a plurality of crosswise extending angle bars 305 which are arranged in spaced apart pairs so as to define guideways 306, 307, 308, 309 and 310 which are complementary to the upper chutes 298 to 303, inclusive, and serve to confine the bottom of the car wheels therein to prevent them from slipping out of an upright position.

To prevent the car wheels from rolling out of the carriage 275 a retractible stop mechanism, generally indicated by the reference number 311, has been provided. As shown in FIGS. 11 and 12, the stop mechanism 311 comprises a shaft 312 that is rotatably supported in the end cross members of the frame 276 of the carriage 275. The shaft 312 is disposed below the top surface plate 284 of the carriage 275 and has secured to it, for rotation with it, a plurality of spaced fingers 315, 316, 317, 318 and 319 which extend angularly upwardly from the shaft 312 through suitable openings (not shown) provided in the top plate or floor 284 of the carriage 275 into the chutes 285, 307, 308, 309 and 310, respectively. In the upwardly extended position, the fingers are in the path of travel of the car wheels in the respective chutes to serve as gates to prevent the car wheels from rolling through and out of the individual chutes when they have been transferred therein from the transfer line of the machine tool. To effect simultaneous retraction of the fingers 315 to 319, inclusive, a fluid actuator 321 is employed to rotate the shaft 312. The fluid actuator 321 comprises a cylinder 322 one end of which is pivotally secured, as at 323, to the rear cross member of the frame 276. A reciprocal piston 320, diagrammatically shown in FIG. 28, carried within the cylinder 322 is provided with a piston rod 324 which extends from the opposite end of the cylinder 322. The free end of the piston rod 324 is pivotally connected to a crank 326 secured to the outwardly extending end of the shaft 312, the crank being pin connected thereto so that angular movement of the crank 326 will operate to rotate the shaft 312. Thus, clockwise rotation of the shaft 312, as viewed in FIG. 12, will operate to simultaneously pivot the fingers 315 to 319, inclusive, to a position below the top plate or floor 284 to allow car wheels within the respective chutes 298, 299, 301, 302 and 303, to roll out of the chutes.

Movement of the carriage 275 is effected by means of a fluid actuator 327 which is similar in arrangement and operation to the fluid actuator 238 associated with the carriage 166 of the loading station 21. As shown in FIG. 11, the fluid actuator comprises a cylinder 328 in which is supported a reciprocating piston 325, shown in FIG. 28. One end of the cylinder 328 is pivotally secured, as at 329, to a bracket 330 that is fixed to the upper plate 281 of the base 282. The piston 325 associated with the cylinder 328 is provided with a piston rod 331, the extending end of which is operably secured to a depending carriage bracket 332. The carriage 275 is indexed rightwardly in increments to successively locate the chutes 299, 301, 302 and 303 into alignment with the guide rail 65 of the transfer line. Thus, when a car wheel has been moved into the first chute 298, the fluid actuator 327 will be energized to effect incremental rightward movement, as viewed in FIG. 11, of the carriage 275. The carriage 275 will move rightwardly under the influence of the fluid actuator 327 until the succeeding chute 299 is aligned with the guide rail 65 of the transfer line. At this time a dog 336, mounted on an outwardly and downwardly extending support bracket 337, will actuate a limit switch 338 mounted on a panel 339 that is secured to the side of the base 282. Actuation of the limit switch 338 operates to effect de-energization of the fluid actuator 327 to stop the carriage when the chute 299 is in alignment with the guide rail 65. When another car wheel has been moved from the transfer line into the chute 299 the fluid actuator 327 will again be energized to index the carriage 275. When the carriage 275 has been moved rightly a distance sufficient to align the chute 301 thereof with the guide rail 65 of the transfer line, another dog 341 will actuate the limit switch 338 to stop the carriage. Similarly, when a car wheel has been moved from the guide rail 65 into the chute 301 the fluid actuator 327 will once again be energized to advance the carriage 275 rightwardly to position the chute 302 in alignment with the guide rail 65. At this time another dog 342 will actuate the limit switch 338 to once against stop the movement of the carriage 275. Again, when a car wheel has been moved from the guide rail 65 into the chute 302 the fluid motor 327 will be energized to move the carriage 275 to a fully advanced position wherein the last chute 303 will be aligned with the guide rail 65. At this time a dog 343 will actuate a limit switch 344 to stop the carriage movement. When the carriage 275 is fully advanced it will be in position wherein the chutes 298, 299, 301, 302 and 303 are in respective alignment with corresponding chutes 351, 352, 353, 354 and 355 in the storage rack 286 of the storage station 49.

Actuation of the limit switch 344 also functions to effect operation of the fluid actuator 321 in a direction to effect clockwise rotation of the finger shaft 312 to thereby retract the fingers 315 to 319, inclusive, below the floor 284 of the carriage 275 to permit the car wheels to roll into the associated chutes 351 to 355, inclusive, of the storage rack 286. As the car wheels roll down into the storage rack 286 and against the upstanding back stop 356, each car wheel in the individual chutes will actuate one of a series of limit switches 357, 358, 359, 360 and 361 each of which is located toward the bottom and end of the chutes 351, 352, 353, 354 and 355, respectively. When all of the limit switches 357 to 361, inclusive, have been actuated, the fluid actuator 321 will be energized for operation in the opposite direction to raise the fingers 315 to 319, inclusive, into a blocking position. As the shaft 312 is rotated in a counterclockwise direction to raise the fingers, a dog 362 on the crank 326 actuates a limit switch 364 which will effect operation of the carriage fluid actuator in a leftward direction to retract the carriage 275 to its original position. Upon return of the carriage 275 to its original load position, a dog 365 actuates a limit switch 366 to effect de-energization of the fluid actuator 327.

The limit switches 357 to 361, inclusive, are actuated by a mechanism shown in detail in FIG. 13. Since each of the mechanisms associated with each switch is identical, a description of the mechanism associated with the limit switch 361 will be applicable to all. As shown in FIG. 13, a horizontal shaft 370 is disposed to extend through the various vertical walls which form the chutes of the storage rack, and is fixedly secured therein so as to be nonrotatable. A triangular plate 371 is mounted on the shaft 370 at one corner thereof so as to be pivotally movable about the shaft 370. Another corner of the plate 371 is pivotally connected to a horizontally disposed switch actuating rod 374 as at 373. Thus, movement of the plate 371 in a counterclockwise direction, as viewed in FIG. 13, on the shaft 370 will effect rightward movement of the rod 374. The actuating rod 374 extends through the back stop 356 of the storage rack 286 and in position to engage the actuating arm 375 of the limit switch 361. A spring 376 is mounted about the actuating rod 374 with one end thereof abutting the inner surface of the back stop 356 of the storage rack 280 and acts against an annular stop 377 secured on the rod 374 to bias the rod 374 leftwardly, as viewed in FIG. 13. Leftward movement of the rod 374 is limited by another annular stop 378 which is disposed on the extending end of the rod in position to engage the front surface of the back stop 356. When the rod 374 is in its extended leftward position it will act to pivot the plate 371 on the shaft 370 to a position wherein a third corner 379 of the plate will be located in substantially the same horizontal plane as the shaft 370. A wheel engaging roller 381 is journalled on a stub shaft 382 secured to the plate 371 at the corner 379 thereof. Therefore, as a car wheel rolls into the chute 355 of the storage rack 286 against the back stop 356 thereof, the periphery of the car wheel will contact the roller 381 pivoting the plate 371 in a counterclockwise direction. As the plate 371 moves in a counterclockwise direction about the shaft 370 the rod 374 will be moved rightwardly compressing the spring 376 and engaging the outer end of the rod with the actuating lever 375 of the switch 361 operating the switch. When the car wheel is removed from the chute 355 the compressed spring 376 acting on the stop 377 will move the rod 374 leftwardly thereby releasing the actuating lever 375 of the switch 361. The rod 374, in moving leftwardly, pivots the plate 371 in a clockwise direction, as viewed in FIG. 13, to position the roller 381 in substantially the horizontal plane of the shaft 370.

The move out stations 25, 29, 33 and 39 are identical in construction and operation and therefore the following description of the move out station 25 will apply to all of the move out stations. As shown in FIGS. 1, 8 and 9, the move out station 25 comprises a base or bed 385 that is arranged transversely of the transfer line. A carriage 386 having a plurality of flanged supporting wheels 387 is movably supported on a pair of longitudinally extending parallel rails 388 and 389 that extend the full length of the bed 385. A table 391 is supported on the carriage 386 for rotation about a shaft 392 that is secured in the carriage 386. The shaft 392 about which the table 391 rotates also serves to maintain and secure the table in position on the carriage 386. To this end, the table 391 is provided with a downwardly extending boss 394, having an axial opening 395 the upper portion 396 of which is enlarged so as to accommodate an enlarged head portion 397 of the shaft 392. An antifriction bearing 398 is mounted within the opening 395 of the table with the inner race thereof engaged upon the shaft 392. Thus, the table 391 is free to rotate on the shaft 392. An enlarged portion 399 of the shaft 392 engages against the top surface of the inner race of the bearing 398 while a spacer 401 mounted about the shaft 392 abuts the top surface of a carriage deck 402 and is disposed so that its opposite end engages against the opposite face of the inner race of the bearing 398. Thus, the bearing 398 is confined in position within the axial opening 395 of the table 391 between the spacer 401 and the enlarged portion 399 of the shaft 392. The lower end of the shaft 392 extends through an opening provided in the deck 402 of the carriage 386 and extends into a hub 403 provided on the under surface of the carriage deck 402 into engagement with an inwardly extending radial flange 404 that forms a shoulder for supporting and locking the shaft to the carriage. A reduced threaded portion 406 extends through an opening in the flange 404 and threadedly receives a nut 407 which is engaged thereon so as to snuggly engage against the lower surface of the flange 404 of the hub 403 to thereby lock the shaft in vertical position to the carriage 386. The table 391 is provided with four supporting rollers 410, 411, 412 and 413 which are rotatably mounted in the table 391 and are spaced 90° apart, with the rollers being arranged so as to ride upon a circular way surface 414 provided on the top surface of the deck 402 of the carriage 386 to thereby stabilize and support the table 391 on the carriage 386 as it rotates about the shaft 392.

The table 391 is provided with a car wheel supporting and guiding rail 65a which in effect is a portion of the guide rail 65 previously mentioned but which is sectionalized at the move out stations so that it may move with the table 391.

Upstanding from the table 391 is a supporting structure, generally indicated at 416, comprising a pair of upright spaced columns 417, one of which is shown in FIG. 8. A horizontal bridge plate 418 is secured to the top of the columns, the entire structure being rigidly reinforced by means of an intermediate vertical column 419. Secured to and extending outwardly over the guide rail 65*a* are a pair of spaced arm members 421 and 422 to which is secured an outer upper fence rail 62*b* which is a sectionalized extension of the upper fence rail 62, previously described in connection with the transfer mechanism 54 and clearly shown in FIG. 5. An upper inner fence rail 61*b* likewise constitutes a portion of the upper inner fence rail 61 of the transfer line and is secured to the edge of the bridge plate 418 adjacent to the location of the car wheels. The sectionalized fence rails 61*b* and 62*b* serve to maintain the car wheel in a vertical position on the sectionalized guide and supporting rail 65*a*.

The carriage 386 is movable along the guide rails 388 and 389 and is actuated in its path of travel by means of a fluid actuator, generally indicated by the reference numeral 425, as shown in FIGS. 8 and 9. The fluid actuator 425 comprises a cylinder 426 that is disposed on the deck 420 of the bed 385 between the guide rails 388 and 389. The outer end of the cylinder 426 is pivotally secured as at 427 to a bracket 428 that is mounted on a vertical plate 429 which is fastened to the end of the bed 385. A piston 430, shown diagrammatically in FIG. 26, is reciprocally supported within the cylinder 426 and is provided with a piston rod 431 the free end 432 of which is secured to a depending bracket 433 that is carried by the frame of the carriage 386. When the piston 430 is in its leftward limit of movement, as viewed in FIG. 8, the free end 432 of the piston rod 431 extends approximately to the left end of the bed 385.

As previously mentioned, the table 391 is rotatably supported on the carriage 386 and is adapted to be rotated 90° as the carriage is moved rightwardly on the bed 385 in a retracting movement away from the transfer line. In this manner the car wheel, as it is withdrawn from the transfer line, will also be positioned so that it will be free to be rolled out of the retracted move out station mechanism off of the sectionalized guide rail 65*a* away from the machine tool. In order to effect the 90° rotation of the table 391 as the carriage is retracted, an angular extending cam plate 434 is secured to the top surface of the table. As shown in FIGS. 8, 9 and 10, the cam plate 434 is disposed on the table 391 to extend angularly therefrom at an angle of 45°. The cam plate 434 is provided with a cam track, generally identified by the reference numeral 436. The cam track 436 comprises a table rotating portion 437 the axis of which is disposed at 45° to the path of travel of the carriage 386 and also passes through the axis of the shaft 392 about which the table 391 is rotatable. The cam track 436 also includes an idle portion 438, the axis of which is disposed so as to be parallel to the path of travel of the carriage 391 and also to intersect the axis of the rotating portion 437 at an angle of 45°. A vertical cam follower 439 is disposed to extend within the cam track 436 and is fixedly mounted on a vertical bracket 441 that is secured to the side of the bed 385, as shown in FIG. 8.

As the fluid actuator 425 is energized to retract the carriage 386 to effect withdrawal of the car wheel from the transfer line, the carriage 386 and the table 391 will be moved rearwardly a distance sufficient to withdraw the car wheel from the transfer line. During this initial rearward movement the cam follower 439 is located within the idle portion 438 of the cam track. Thus, when the car wheel is in the transfer line, the cam follower 439 will be in the position "A" within the idle portion 438 of the cam track, as shown in FIGS. 9 and 10. Upon initial retraction of the carriage rearwardly to clear the car wheel from the transfer line, the cam follower 439 will be in a position "B" within the cam track 436, as shown in FIG. 10*a*. As the carriage is further retracted the side 442 of the rotating portion 437 of the cam track 436 will engage the cam follower 439 to effect an arcuate shifting of the cam plate 434 and thereby force the table 391 to rotate on the carriage 386 in a clockwise direction, as viewed in FIG. 10*a*. As retraction of the carriage 386 continues, the carriage 386 will be moved to a position wherein the rotating portion 437 of the cam track 436 is transverse to the path of travel of the carriage thereby effecting rotation of the table 391 to a position which is 45° from its original aligned position, as shown in FIG. 10*b*. At this time the cam follower 439 will be in the position indicated at "C", in FIG. 10*b*. As carriage retraction continues, the side 442 of the table rotating portion 437 of the cam track 436 forcefully engages the cam follower 439 to effect further clockwise rotation of the table 391. When the carriage 386 is fully retracted, the table will have been rotated substantially 90° from its aligned position and the cam follower 439 will be at the position "D", as indicated in FIG. 10*c*.

Energization of the fluid actuator 425 is effected by manually actuating a lever 446 rightwardly, as viewed in FIGS. 8 and 26, the lever 446 operating to position a plunger within the valve body 447 to direct fluid pressure through a normally open deceleration valve 448 from whence it is directed to the fluid actuator 425 to activate it in a direction to retract the carriage 386. As the carriage approaches a fully retracted position, a dog 449 mounted on the side of the carriage 386 engages a plunger 450 of the deceleration valve 448 for moving it inwardly to gradually restrict the flow of fluid pressure through the valve and slow the action of the fluid actuator 425. The deceleration valve 448 is not, however, completely closed, and the fluid actuator 425 will operate to retract the carriage 386 at a slow rate until the carriage engages a positive stop 451, shown in FIG. 9, positioned at the end of the bed 385.

To return the carriage to its advanced location in the transfer line, the lever 446 is manually actuated to its vertical position, as viewed in FIG. 8, which operates to position the plunger of the valve 447 so as to direct fluid pressure to the head side of the piston 430 in the cylinder 426. Since the deceleration valve 448 is maintained partially closed by reason of the dog 449 being in engagement with the plunger 450 of the valve 448, the advancing movement of the carriage will be at a slow rate until the dog 449 is moved out of engagement with the plunger 450 permitting the valve 448 to be conditioned to its normal open condition. As the carriage 386 returns, the table 391 will be rotated in a counterclockwise direction, 90° to its original position, by operation of the cam follower 439 and cam track 436. The full advance position of the carriage 386 is established by means of an adjustable positive stop 452 mounted on the front end of the bed 385, shown in FIGS. 8 and 9.

The fixture heads 81, 81*a*, 95 and 95*a* of the work stations 27, 31, 36 and 43, respectively, all operate in a manner to engage a car wheel in the transfer line at their respective stations, and are operable to withdraw the car wheel from the transfer line into clamped engagement with the fixture head so that it may be rotated in a work operation. The fixture heads each have braking means whereby rotation of the fixture heads is stopped prior to the return of the car wheel into the transfer line. Since the fixture heads 81, 81*a*, 95 and 95*a* are similar in construction and operation, a description of the fixture head 95*a* of station 43 will apply to all.

Figure 17:
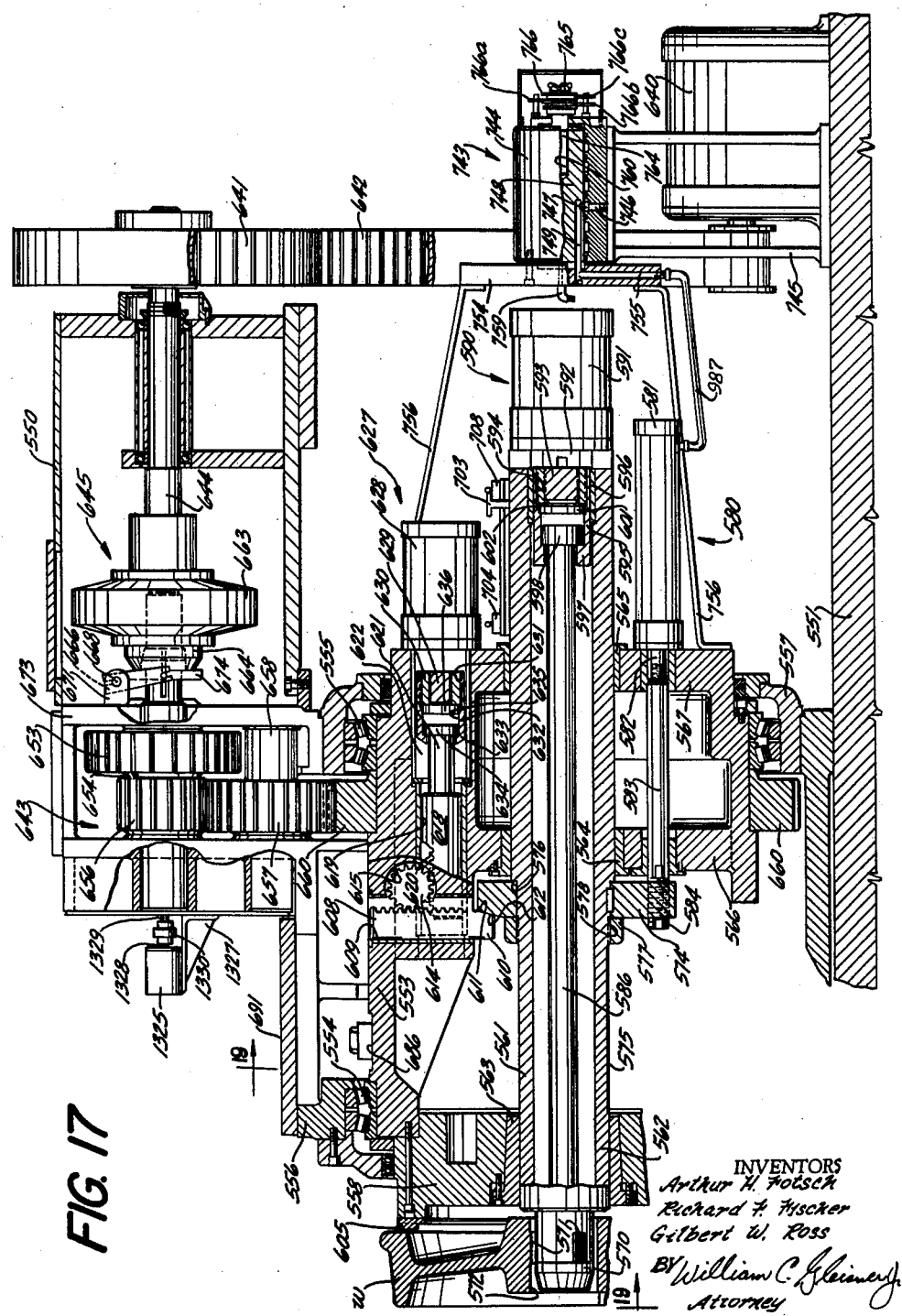
FIG. 17 is a view in transverse vertical section depicting the fixture head that forms a part of the last profiling and turning unit.

Referring now to FIGS. 17, 18 and 19 the fixture head 95*a* of the machine tool unit at the work station 43 comprises essentially an external frame member 550 which is adapted to be mounted on the rearwardly extending portion 551 of the base 103*a*. A spindle drum 553 is rotatably supported in a pair of bearings 554 and 555 which are mounted in retainer rings 556 and 557 respectively, that are secured to the frame 550 in position to rotatably support the drum 553. The drum 553 has a face plate 558 which is secured to the end thereof, as shown in FIG. 17. A chucking spindle 561 is disposed in coaxial relationship within the drum 553 with the forward end 562 thereof being slidably and rotatably supported in a bearing sleeve 563 that is disposed within an axial opening provided in the face plate 558. The rearwardly extending portion of the chucking spindle 561 is supported in a pair of sleeve bearings 564 and 565 carried in aligned openings provided in vertical webs 566 and 567, respectively, of the drum 553. The forwardly extending end 562 of the chucking spindle 561 is provided with a nose portion 570 having a plurality of angularly spaced radially extending and radially movable jaw members 571 which are disposed to be engageable with the wall of a bore 572 provided in the hub of the car wheel W, as shown in FIG. 17. The chucking spindle 561 is adapted to be axially movable outwardly of the drum 553 so as to locate the nose portion 570 thereof within the bore 572 of the hub of the car wheel W when the car wheel is positioned on the guide rail 65 at station 43, as shown in FIG. 3.

To effect axial movement of the chucking spindle 561 a ring member 574 is mounted on a reduced diameter portion 575 of the chucking spindle 561 in engagement with a shoulder 576 formed by the reduced portion 575. The ring 574 is key connected to the chucking spindle 561 so that it will rotate with it. A locking nut 577 is threadedly engaged on a threaded portion of the chucking spindle 561 into abutting engagement with the face of the ring 574 to lock the ring against the shoulder 576. A fluid actuator 580 which includes a cylinder 581 is mounted on the outer face of the web 567 and is provided with a piston 579 that is reciprocally supported within the cylinder 581, as diagrammatically shown in FIG. 26. The piston 579 is provided with a piston rod 582 to which is secured a piston rod extension 583 the free end 584 of which is threadedly engaged in a threaded opening provided in the ring 574. The fluid actuator 580, when energized for operation in a direction to move the piston rod 582 leftwardly, as viewed in FIG. 17, will effect a like movement of the chucking spindle 561 in a leftward direction by operation of the ring 574 and lock nut 577 to insert the nose portion of the chucking spindle 561 within the bore 572 of a car wheel positioned at station 43 on the guide rail 65.

To actuate the jaws 571 of the nose portion 570 into clamping engagement with the wall of the bore 572 of the car wheel, a jaw actuating rod 586 is disposed within the chucking spindle 561. The rod 586 is operatively connected to the jaws 571 to effect their outward, radial movement, in a well known manner, such as by means of wedge members (not shown), into clamp engagement with the wall of the bore 572 of the car wheel. A fluid actuator 590 is provided for actuating the rod 586 axially in either direction. The fluid actuator 590 comprises a cylinder 591 which is secured to the end of the chucking spindle 561 in coaxial relationship therewith. The cylinder 591 reciprocally supports a piston 589, shown diagrammatically in FIG. 26, which is provided with a piston rod 592 that extends outwardly of the cylinder 591 and into the axial bore of the chucking spindle 561, as shown in FIG. 17. An adapter 593 is secured to the end of the piston rod 592 and is threadedly engaged within an enlarged threaded bore provided at the end of a connecting sleeve 595. The connecting sleeve 595 is slidably supported in a bearing sleeve 596 disposed in an enlarged opening at the end of the chucking spindle 561. The opposite end of the bearing sleeve 595 has a radial inwardly extending flange portion 597 which engages behind an enlarged head 598 provided on the end of the actuating rod 586. An anvil or impact plate 601 is disposed within an enlarged bore 594 of the sleeve 595 and abuts the shoulder 602 formed therein, the impact plate 601 being locked in position by the adaptor 593.

As shown in FIG. 17, the sleeve 595 is of sufficient length to provide a space between the surface of the head 598 and the impact plate 601 so that there will be a certain amount of travel or lost motion between engagement of the impact plate with the head 598 of the actuating rod 586. Thus, with the actuating rod 586 in a rightward position, as viewed in FIG. 17, the jaws 571 are in clamping engagement with the wall of the bore 572 of the car wheel to chuck the car wheel in the spindle nose. When the fluid actuator 590 is energized to move the piston rod 592 leftwardly it will also effect leftward movement of the sleeve 595 without initially imparting leftward movement to the actuating rod 586. As a result, an impact blow is delivered to the head 598 through the plate 601 to break the engagement of the chuck jaws with the interior wall of the bore 572 to facilitate retraction of the jaws therefrom. Continued leftward movement of the piston rod 592 will effect leftward movement of the actuating rod 586 to release and retract the jaws 571.

In order to secure a car wheel to the fixture head for performing a machining operation, the spindle 561 is extended outwardly of the drum 553 to locate the nose 570 within the bore 572 of the car wheel, and the chuck jaws 571 are actuated into engagement with the wall of the bore to lock the wheel to the spindle nose. The fluid actuator 580 is then energized to operate it in a direction to move the piston rod 582 thereof rightwardly, to effect a like movement of the chucking spindle 561 rightwardly while carrying the car wheel W with it. The chucking spindle 561 is moved rightwardly a distance sufficient to engage the car wheel against a plurality of angularly spaced serrated locating pads 605, one of which is shown in FIG. 17, the locating pads 605 being mounted on the face plate 558. The work operation to be performed on the car wheel W necessitates that the car wheel be rotated and for this purpose it must be securely engaged against the serrated locating pads 605 so that it will rotate with the face plate 558. To this end, an additional locking means is provided to insure positive engagement of the wheel with the locating pads 605.

The positive locking means employed comprises a rack 608 slidably disposed within a bore 609 provided in the drum 553. The inwardly extending end 610 of the rack 608 is provided with a sloping surface 611 which is complementary to a sloping surface 612 provided on the ring 574. To actuate the rack 608 downwardly to thereby engage the sloping surface 611 with the sloping surface 612 of the ring an elongated gear 614 is rotatably mounted in a transverse bore 615 which has communication with the bore 609 so that the gear teeth of the elongated pinion gear 614 extend into the bore 609 into engagement with the rack 608. Counterclockwise rotation of the pinion 614, as viewed in FIG. 17, will operate to move the rack 608 downwardly into locking engagement with the ring 574, while clockwise rotation of the pinion 614 will operate to withdraw or effect upward movement of the rack 608 to disengage the sloping surface 611 from the sloping surface 612 of the ring 574 for releasing the clamping engagement. To effect rotation of the pinion gear 614 in either direction, a gear rack 618 is slidably mounted on a bore which is located transversely of the bore 615 and beneath it. The bore 619 is in communication with the bore 615 so that the teeth 620 of the rack 618 extend into the bore 615 in meshing engagement with the teeth of the pinion 614. The rack 618 is provided with a rod 621 which extends outwardly into an enlarged portion 622 of the bore 619.

A fluid actuator 627 is operatively connected to actuate the rack 618 for rotating the pinion 614. To this end, the fluid actuator 627 comprises a cylinder 628 secured to the drum 553 in axial alignment with the bore 619. The cylinder 628 reciprocally supports a piston 626, diagrammatically shown in FIG. 26, having a piston rod 629, the extending end of which is threaded. The extending threaded end of the piston rod 629 is threadedly engaged in an adaptor ring 630 that is threadedly engaged in an enlarged portion 631 of a connecting sleeve 632. At its opposite end the connecting sleeve 632 is provided with an inwardly extending radial flange 633 which engages an enlarged anvil head 634 provided on the rod 621 of the rack 618. The anvil head 634 is disposed within a relatively long chamber 635 which is provided to permit the head 634 of the rod 621 to move within the chamber relative to the connecting sleeve 632. An impact plate 636 is disposed in abutting relationship on the shoulder formed by the chamber 635 and the enlarged portion 631 and is maintained therein by the adaptor ring 630. In FIG. 17, the rack 618 is shown in a rightward position wherein the rack 608 has been moved downwardly into locking engagement with the ring 574 to effectively lock the car wheel against the locating pads 605 of the face plate 558. To release the rack 608 from locking engagement, the fluid actuator 627 is energized to effect movement of the piston rod 629 in a leftwardly direction. Leftward movement of the rod 629 effects a like movement of the connecting sleeve 632 by means of the impact plate 636 abutting against the shoulder. The initial movement of the impact head relative to the anvil head of the gear rack causes a sharp blow to be delivered to the anvil head 634 to produce an impact for breaking the engagement of the wedge surfaces 611 and 612 so that the fluid actuator is able to effect withdrawal of the rack 608.

Power for rotating the drum 553 and thereby the car wheel engaged against its cooperating face plate 558, is obtained from a motor 640 mounted on the base extension 551, as shown in FIGS. 17 and 18. The motor 640 drives a main pulley 641 rotatably mounted on the rear of the fixture head 95a by means of a cogged driving belt 642. From the driving pulley 641 power is transmitted to a drive transmission, generally indicated by the reference numeral 643, through a drive shaft 644 operatively connected to drive the transmission 643 through a clutch mechanism 645, as shown in FIG. 17. As shown in FIG. 18, the drive transmission 643 comprises a change gear 648 keyed to a shaft 649 that is operatively connected to a driven element 664 of the clutch mechanism 645. The change gear 648 is in meshing engagement with a gear 650 keyed to an intermediate shaft 651 journalled in the frame 550. Integrally formed on the shaft 651 is a spur gear 652 which has meshing engagement with a relatively larger spur gear 653 integrally formed on a shaft 654 that is journalled in the housing 550. Another spur gear 656 integrally formed on the shaft 654 has meshing engagement with an idler 657 integrally formed on an idler shaft 658 journalled in the housing 550. The idler gear 657 is adapted to have meshing engagement with a bull gear 660 that is mounted on the drum 553 on a reduced portion thereof and keyed thereto for effecting its rotation.

The clutch mechanism 645 is operable to connect the drive shaft 644 to the gear transmission 643. The clutch mechanism 645 may be of any suitable type and is here shown, as comprising a driving spider element 663 which is secured to the end of the shaft 644 for rotation with it. The driven element 664 is keyed to the end of the shaft 649 to effect its rotation when driven by the spider element 663 of the clutch mechanism and is axially movable thereon into and out of clutching engagement with the spider element. Axial movement of the driven element 664 of the clutch 645 is effected by means of a pair of crank arms 666 and 667 secured to a shaft 668 that is rotatably journalled in a pair of brackets 671 and 672 formed on an interior wall 673 in the frame 550, as shown in FIGS. 17 and 18. The opposite end of the arms 666 and 667 are connected to a yoke 674 of the axially movable driven element 664 of the clutch 645. Axial movement of the driven element 664 is effected by means of a fluid actuator 677 that is disposed on the top of the frame 550, as shown in FIG. 18. The fluid actuator 677 comprises a cylinder 678 one end of which is pivotally secured to a bracket 679 mounted on the top surface of the frame 550. Reciprocally supported within the cylinder 678 is a piston 680 having a piston rod 681, the free end of which is secured to one end of a crank arm 682. The opposite end of the crank arm 682 is operatively connected to the end of the shaft 668 to effect its rotation upon movement of the crank arm 682. Rotation of the shaft 668 will operate to pivot the arms 666 and 667 thereby moving the driven element 664 of the clutch mechanism 645 into or out of engagement with the spider element 663 thereof depending upon the direction of operation of the fluid actuator 677.

After the machining operations have been performed on the car wheel, rotation of the drum 553 and the car wheel secured thereto must be stopped before the positive clamp effected through the wedge rack 608 and the ring 574 can be released to thereby free the chucking spindle 561 for axial movement. Rotation of the drum 553 is stopped by a brake mechanism 683. The brake mechanism 683, as shown in FIG. 19, comprises a brake band 684, having a liner 685 of any suitable material, the brake band 684 being disposed about the drum 553 in position to have the liner material 685 engage a braking surface 686 formed on the periphery of the drum 553. One end of the brake band 684 is secured to a bracket 687 by means of a connector 688. The opposite end of the band 684 is connected to a fluid actuator 689 which is operative to engage the brake band with the braking surface of the drum to stop the rotation of the drum. The fluid actuator 689 comprises a cylinder 690 which is mounted to the top surface of a step portion of the frame 550. A piston 676 reciprocally supported within the cylinder 690 is provided with a piston rod 692 that extends outwardly of the cylinder 690 and downwardly through a suitable opening provided in the frame 550. The free or lower end of the piston rod 692 has a threaded portion 694 which is threadedly engaged in the end of a connector 695. The connector 695 is provided with two arm members 696 and 697 which receive the end of the band 684 between them, as shown in FIG. 19. The arms 696 and 697 are securely clamped to the end of the band 684 by means of a threaded screw 698 which is inserted through a suitable opening in the arm 696 into threaded engagement with a threaded opening provided in the arm 697, as shown in FIG. 19. Thus, energizing the fluid actuator 689 for operation to move the piston rod 692 upwardly will draw the brake band 684 into engagement with the peripheral braking surface 686 on the drum 553 and will be effective to stop rotation of the drum 553 as well as the car wheel carried by it. To release the brake mechanism 683, the fluid actuator 689 will be energized for operation in the opposite direction to move the piston rod 692 downwardly for releasing the brake band 684 from tight engagement with the braking surface 686 of the drum.

In order to render the chucking spindle 561 operable to withdraw the car wheel at station 43 from the transfer line, the upper and lower guide rails 61 and 63 adjacent the flange side of the car wheel must be retractible so as to provide a clear path of movement for the car wheel as it is withdrawn from the line. To this end, the upper and lower guide rails 61 and 63 at station 43 are sectionalized as at 61a and 63a, as best shown in FIGS. 3 and 4. The sectionalized portions of the fence rail 61a and 63a each are pivotally connected to a column 58, as best illustrated in FIG. 4. To effect pivotal movement of the sectionalized fence rails 61a and 63a a fluid actuator 699 is provided. The fluid actuator 699 comprises a cylinder 701 having one end pivotally connected to the free end of the upper fence rail 61a. The cylinder 701 is provided with a reciprocal piston 705 having a piston rod 702 the free end of which is pivotally connected to the free end of the lower fence rail 63a. Thus, fluid pressure supplied to the cylinder 701 at the head end of the piston 705 therein will operate to effect movement of the piston rod 702 outwardly or downwardly, as viewed in FIG. 4, to pivot the sectionalized fence rail 63a downwardly out of a blocking position. When the lower sectionalized fence rail 63a has cleared the car wheel in station 43 it will engage against the top surface of the base 66 preventing further movement thereof. As the sectionalized fence rail 63a engages the top surface of base 66 the fluid pressure will react against the end surface of the cylinder 701 to move it axially upwardly, as viewed in FIG. 4, pivoting the upper sectionalized fence rail 61a upwardly to clear the top portion of the car wheel in station 43. Thus, the two sectionalized portions 61a and 63a serving to maintain the car wheel in an upright condition on the guide rail 65 at station 43 are effectively moved out of the way to permit withdrawal of the car wheel out of the transfer line so that it may be clamped to the fixture head 95a for performing a machining operation on it.

Operation of the fixture head 95a will occur after the transfer mechanism 54 has completed its advancing movement and after the transfer bar 127 has been rotated to retract the arms thereof out of car wheel engagement. The fluid actuator 580 of the chucking spindle 561 will then be energized to advance the chucking spindle 561 leftwardly, as viewed in FIG. 17, to insert the nose 570 within the hub of the car wheel. When the chucking spindle 561 has advanced its full distance of travel, a dog 703 secured to the periphery of the rear portion of the chucking spindle 561, shown in FIG. 17 and diagrammatically in FIG. 26, actuates a limit switch 704 mounted on a bracket (not shown) that extends outwardly from the rear face of the drum 553. The limit switch 704, when actuated, will operate to effect energization of the fluid actuator 590 in a direction to effect rightward movement of the jaw actuating rod 586 thereby moving the chucking jaws 571 radially outwardly of the nose 570 into clamped engagement with the interior wall of the bore 572 of the car wheel. As the pressure builds up in the fluid actuator 590, fluid pressure will be sequenced to the fluid actuator 699 to the head end of the piston 705 within the cylinder 701 to effect upward and downward movement of the fence rails 61a and 63a, respectively. As the fence rail 61a reaches its uppermost position it will actuate a limit switch 706 causing the fluid actuator 580 to be energized to operate in the opposite direction for retracting the chucking spindle 561 and the wheel secured thereto with it. Retraction of the chucking spindle 561 will continue until the dog 703 actuates a limit switch 708 mounted at the end of the chucking spindle 561, as shown in FIG. 17. At this time, the wheel will be firmly engaged against the locating pads 605 on the base plate 558 and the limit switch 708, when actuated, will cause the fluid actuator 627 to be energized for operation in a direction to lower the rack 608 to engage the sloping surface 611 thereof with the sloping surface 612 of the ring 574 to thereby positively clamp the car wheel to the locating pads 605 of the face plate 558.

When the car wheel is positively clamped to the locating pads 605 of the face plate 558, the brake actuator 689 will be energized to release the brake mechanism 683 and the clutch actuator 677 will be energized to move the driven element 664 of the clutch mechanism into engagement with spider 663 so that rotation of the drum 553 and the car wheel will be effected from the constantly operating motor 640.

Since the fluid actuators 580, 590 and 627 associated with the drum 553 will rotate with the drum, the supply of fluid pressure to these actuators are supplied thereto through a manifold device 743, shown in FIG. 17. The manifold device 743, comprises a stationary housing 744 which is mounted on a pedestal 745 that is upstanding from the base extension 551. The stationary housing 744 is provided with a plurality of ports, one of which is shown at 746, each of which communicates with an annular channel such as a channel 747. The manifold housing 744 is provided with an axial bore in which is journalled a manifold shaft 748 having a plurality of passages such as a passage 749 which communicates with the annular channel 747 of the stationary housing 744. The passages provided in the rotatable shaft 748 correspond in number to the ports 746 provided in the housing 744 with each of the passages communicating with an annular channel such as the channel 747 of the housing. The manifold shaft 748 is secured to a manifold plate 754 having a plurality of passages, one of which is shown at 755, and each of which communicates with an individual passage in the shaft 748. The plate 754 is secured to the shaft 748 as by bolts (not shown) so that both the plate 754 and the shaft 748 are rotatable relative to the stationary housing 744. The plate 754 is secured to the drum 553 so as to rotate with it by means of a plurality of brackets 756 that are screw fastened to the drum 553 and the manifold plate 754. Each of the passages 755 in the manifold plate 754 is connected to communicate with a hydraulic line, such as the line 987, and each of such hydraulic lines communicates with the respective fluid actuators 580, 590 and 627.

The conductors (not shown) associated with the limit switches 704 and 708 and which are connected into the electrical circuit extend from the limit switches 704 and 708 into a fitting 759 that is secured in an axial opening 760 that extends through the manifold plate 754 and the shaft 748. The opposite end of the axial opening 760 is enlarged and receives a hollow shaft 764 of a slip ring 765 in a manner so that the slip ring 765 is rotatable with the shaft 748. The conductors associated with the limit switches 704 and 708 extend through the fitting 759 and through the axial opening 760 and are connected, in a well known manner, to take-off rings 766 provided on the slip ring mechanism 765. The slip ring mechanism 765 is provided with stationary brushes 766a, 766b and 766c which engage respective ones of the take-off rings 766. The stationary brushes 766a, 766b and 766c are in turn connected into the electrical circuit (not shown) by means of conductors (not shown), in well known manner. Thus, as the drum 553 is rotated, the manifold plate 754 as well as its cooperating shaft 748 and the conductor associated with the limit switches 704 and 708 which extend through the axial opening 760 of the manifold all rotate with the drum. As the manifold plate 754 and the shaft 748 rotate, fluid pressure supplied to the ports 746 in the stationary housing 744 of the manifold 743 will be distributed into the respective lines 749 in the manifold shaft 748 and be directed therethrough into the line 749 and the associated passages 755 provided in the manifold plate 754. From the passages 755 the fluid pressure is directed into the connected lines, such as 987, that are associated with the respective fluid actuators 589, 590 and 627.

The tool units 97 and 97a associated with the fixture heads 95 and 95a, respectively, are provided for turning the tread or periphery of the car wheel, as previously mentioned. Since the tool units 97 and 97a are identical in construction and operation a detailed description of the tool unit 97a associated with the fixture head 95a will be given and the description will apply to the tool unit 97. As shown in FIGS. 20 and 21, the tool unit comprises a cross slide 98a which is supported on a pair of ways 99a and 99b provided on the compound slide 101a. The cross slide 98a is disposed to be movable toward or away from a car wheel that has been secured to the fixture head 95a, as shown in FIGS. 1b and 20. The finished surface of the periphery or tread surface of the car wheel is to have a slope of approximately 3°, therefore, the compound slide 101a is disposed on the base 103a at an angle of approximately 3° so that as the cross slide 98a is fed to move the cutting tool 710 across the tread surface of a car wheel inwardly toward the flange thereof, the desired slope of the finished surface will be automatically formed by virtue of the setting of the cross slide on the compound slide 101a. The compound slide 101a is also slidably supported on a pair of ways 102a and 102b provided on the base 103a as previously mentioned. A turning tool 711 and a radius forming tool 712 are securely mounted in a holder 713 carried by the cross slide 98a. The radius forming tool 712 is provided to form the radius of the peripheral edge of the car wheel adjacent to the front face surface and engages the car wheel in a work operation when the turning tool 711 engages a radius 720 formed at the junction of the tread and flange.

After the cross slide 98a has been positioned to engage the tool 711 with the car wheel at a desired setting, it may be clamped in position on the compound slide 101a by means of a clamp mechanism 715. The clamp mechanism 715 comprises a pair of clamp bolts 716 and 717 which extend downwardly through suitable openings provided in the cross slide 98a, and through a clamp plate 718 to which they are secured as by welding. The upper ends of the clamp bolts 716 and 717 are threaded and receive nuts 719 and 721, respectively. When the nuts 719 and 721 are rotated in a direction to threadedly engage them on their respective bolts 716 and 717 and into engagement with bosses 722 and 723, respectively, formed on the cross slide they serve to draw the bolts 716 and 717 upwardly, drawing the clamp plate 718 upwardly into tight engagement with the under surface 730 of the overhanging way 99b, as shown in FIG. 21, to thereby clamp the cross slide 98a to the way 99b. The nuts 719 and 721, are actuated by the pivotal movement of a pair of arms 724 and 725 which are welded or otherwise secured to them. A fluid actuator 726 is provided for actuating the arms 724 and 725 to effect the clamping or releasing action of the clamp mechanism 715, and as shown in FIGS. 20 and 21, comprises a cylinder 727 having one end thereof pivotally connected to the arm 725. The cylinder 727 reciprocally supports a piston 729, shown diagrammatically in FIG. 26a, which is provided with a piston rod 728, the extended free end of which is pivotally secured to the arm 724. Fluid pressure supplied to the cylinder 727 at the rod end of the piston 729, will serve to move both the rod 728 and the cylinder 727 relative to each other thereby moving the ends of the arms 724 and 725 inwardly towards each other to engage the nuts 719 and 721 on the bolts 716 and 717 and thereby effect a clamping of the cross slide 98a to the way 99b. In a releasing action, fluid supplied to the cylinder 727 at the head end of the piston rod 729 will act to move the arms 724 and 725 away from each other for loosening the nuts 719 and 721 on the bolts 716 and 717 and thereby effect a release of the clamping action.

The cross slide 98a is actuated in its path of travel by means of a fluid actuator 732 comprising a cylinder 733 which is secured to a mounting bracket 734 provided on the compound slide 101a. The cylinder 733 reciprocally supports a piston 735 having a piston rod 736 the free end of which is operatively connected to the cross slide 98a by means of a coupler 737 that is threadedly connected into the end of the cross slide 98a, as shown in FIG. 20. Likewise, the compound slide 101a is actuated in its path of travel by means of a fluid actuator 739 comprising a cylinder 740 that is secured to a bracket 730 that extends upwardly from the base 103a. The cylinder 740 reciprocally supports a piston 738 having a piston rod 741. The free end of the piston rod 741 is connected to the end surface of the compound slide 101a by means of a coupler 742 that is threadedly engaged in the compound slide 101a and operatively connected to the free end of the piston rod 741, as shown in FIG. 20.

As previously mentioned, the machine units at stations 36 and 43 are operable to perform a profiling operation on car wheels located at the station to generate a desired contour of their flanges. Since the tool units 107 and 107a are identical in construction and operation a detailed description of the tool unit 107a will be given and will apply equally to the tool unit 107. As shown in FIGS. 22, 23 and 24, the cross slide 108a of the tool unit 107a is provided with a tool holder 751 in which a turning tool 752 is secured, and which is positionable by operation of the slides 108a and 110a to generate one-half of the contour of the flange of the car wheel from the rear face of the car wheel to the middle of the flange, as viewed in FIG. 22. Another turning tool 753 secured to the tool holder 751 is provided to generate the other half of the flange, that is, from the top of the flange to the pocket of the car wheel as defined by the radius wherein the tread of the car wheel and the flange meet. The tool holder 751 is secured to an outwardly extending bracket 754 that is secured to the top surface of the cross slide 108a and which is disposed to extend in the direction of the car wheel and fixture head 95a.

To position the turning tool 752 relative to the car wheel secured to the fixture head 95a so that it will be operable to generate one-half of the contour of the flange of the car wheel the cross slide 108a is moved in a direction to advance the tools 752 and 753 toward the face plate of the fixture head 95a. At this time the cross slide 108a will be in a retracted position on the compound slide 110a and the compound slide 110a will also be in its retracted position. Thus, as the cross slide 108a is moved relative to the compound slide 110a and in a direction towards the fixture head 95a the tools 752 and 753 will be positioned behind the rear surface of the car wheel and will be positioned so that the tool 752 may be engaged with the rear surface of the car wheel. With the tool 752 in a desired initial position relative to the rear surface of the car wheel the compound slide 110a is advanced to engage the tool 752 with the car wheel. Thereafter, a coordinate movement of the cross and compound slides 108a and 110a is effected to cause the tool to generate the desired contour to the rear one-half of the flange. When the tool 752 has generated one-half of the contour of the flange the cross slide 108a will be caused to move on the advancing compound slide in a direction to retract the tool 752 away from the car wheel while the compound slide 110a is continued to be advanced. With the cross slide 108a retracted and the compound slide 110a advancing the tool 753 will be moved into a position where it may be engaged with the car wheel flange at the mid-point thereof so that it may operate on the flange to generate the other one-half of the contour. Thus, as the tool 753 is moved into a position where it may be engaged with the flange of the car wheel at the periphery thereof the cross slide 108a is once again caused to move on the compound slide 110a and towards the car wheel to engage the tool 753 with the periphery of the car wheel flange. As the tool 753 engages the flange of the car wheel at the periphery thereof the movements of the cross slide 108a and compound slide 110a are again coordinated to move the tool 753 to generate the other one-half of the contour of the flange. This coordinate movement is continued until the tool 753 generates the radius 720 formed at the juncture of the flange and the tread of the car wheel. When the radius 720 has been formed the cross slide 108a is retracted to clear the tools 752 and 753 outwardly from the car wheel. When the tools 752 and 753 are clear of the car wheel the compound slide 110a is retracted completing the cycle.

The cross slide 108a is actuated in its path of travel by means of a fluid motor 757 that is carried by the compound slide 110a and which is connected to drive a screw 758 through a worm transmission (not shown). The screw 758 is threadedly engaged in a nut 759 that is secured within a suitable opening provided in the cross slide 108a in a well known manner. The fluid motor 757 operates to move the cross slide 108a to feed the tools 752 and 753 into engagement with the car wheel to generate the desired contour of the flange thereof. To advance the tools in a feeding movement across the flange of the car wheel, a fluid motor 761 carried by the base 103a is operatively connected to rotate a screw 762 engaged in a nut mechanism 763 that is secured to the compound slide 110a, in a well known manner. Operation of the fluid motor 761 is controlled by metering the supply of fluid energy to the motor 761 through a flow control valve 750 that is secured to the side of the fixture head 95a as clearly shown in FIG. 22. The flow control valve 750 may be of any suitable type and as shown in FIG. 26b is depicted as comprising a valve body 767 in which a valve plunger 770 having an actuating rod 768 that extends outwardly of the valve body is positionable to meter the flow of fluid pressure through the valve upon actuation of the valve plunger actuating rod 768 through engagement with a feed control cam 769. The cam 769 has a desired feed control curvature 771 provided thereon and is disposed on a bracket 772 that is mounted on the top surface of the compound slide 110a, as shown in FIGS. 22 and 24, in position to be moved into engagement with the outward extending end of the plunger actuating rod 768. Thus, as the fluid motor 761 operates to advance the compound slide 110a leftwardly, as viewed in FIG. 22, the control curvature of the cam 769 will be moved into a position to engage the extending end of the valve plunger actuating rod 768 to effect positioning of the valve plunger 770 for metering the flow of fluid pressure through the valve to the fluid motor 761 to thereby control its rate of operation.

As the compound slide 110a is advanced under the control of the cam 769, the cross slide 108a is moved to position the cutters 752 and 753 into a desired degree of engagement with the flange surface of the car wheel, as previously mentioned. To effect this control movement of the cross slide 108a, the fluid motor 757 is supplied with fluid pressure through a flow control valve 780 which is operable to meter the supply of fluid pressure to the motor 757. The control valve 780 may be of any suitable type, and as shown in FIG. 26b, is depicted as comprising a valve body 773 wherein a movable valve plunger 774 is positionable to meter and selectively direct the flow of fluid pressure to the fluir motor 757. As shown in FIGS. 22 and 23, the valve plunger 774 is provided with an actuating rod 774a which extends outwardly of the valve body the free end of which is disposed to be engageable with the cam control surface of a cam 775 that is disposed and secured to an L shaped bracket 776 that is carried or mounted on the base 103a. The flow control valve 780 is disposed so as to be movable towards or away from the cam 775, and as shown in FIG. 23, is secured to a horizontal plate 778 having depending slide brackets 779, 779a and 779b. The brackets 779, 779a and 779b are slidably disposed on a pair of horizontal spaced guide bars 781 and 782 each of which are secured in pairs of spaced apart depending supporting brackets 783 and 783a that are integrally formed on the bottom surface of the carrier plate 786. The carrier plate 786 is secured to the cross slide 108a and extends outwardly therefrom overhanging the compound slide 110a in position to support the flow control valve 773 in position to render the extending end of the valve plunger actuating rod 774a engageable with the curvature of the cam 775.

The flange of the car wheel is generated by coordinating the movements of the compound slide and the cross slide, in a manner that the compound slide 110a feeds the cutting tools across the car wheel, while the cross slide 108a controls the depth of the cut to establish the profile of the flange. Thus, the cross slide 108a moves with respect to the compound slide 110a toward and away from the moving surface of the periphery of the car wheel to produce the profile of the flange, while the compound slide 110a moves along the width dimension of the car wheel to feed the cutting tools transversely of the car wheel. Since the valve 773 is carried by the cross slide 108a its movement relative to the curvature of the cam 775 must be in the same ratio as the movement of the cross slide 108a is related to the compound slide 110a. It has been found desirable to reduce the curvature of the cam by one-half so that the valve plunger actuating rod 774a in following the cam curvature will not become inoperative by reason of extreme side forces being applied to the rod in following the cam curvature due to an extreme curvature in the cam. Since the curvature of the cam is reduced by one-half, it is necessary that the movement of the valve with respect to the cam be reduced by one-half. That is, assuming that the cross slide 108a moves one unit of movement relative to the compound slide, the valve 773 must move only one-half of the unit relative to the cam. To this end, a motion reduction mechanism 790 is provided, shown in FIGS. 22, 23 and 24, comprising a bar 791, one end 792 of which is pivotally connected to a bracket 793 that is secured to the cross slide 108a. The opposite end 794 of the bar 791 is pivotally connected to a bracket 796 that is secured to the top surface of the compound slide 110a. A screw 797 extends through a suitable opening 798 provided in the bar 791 and is threadedly engaged in the valve body of the valve 773 to connect the valve 773 to the bar so that it will move with the bar on the slide bars 781 and 782. The screw 797 is located in the bar 791 at a point which is two-thirds of the length of the bar 791 from the end 792. Therefore, as the cross slide 108a moves in either direction, the end 792 of the bar 791 will move with it pivoting about the connecting point of the end 794 of the bar. Since, the valve 780 is connected to the bar 791 at a point which will move only one-half as far as the end 792 the valve 780 will be moved one-half the distance that the cross slide 108a moves.

In operation, after the workpiece or car wheel has been clamped to the face plate 558 of the drum 553 of the fixture head 95a, the fluid motor 757 of the cross slide 108a will be energized to advance the cross slide 108a towards the fixture head 95a. When the cross slide 108a is fully advanced, a dog 815, that is mounted on the side of the cross slide 108a, as shown in FIG. 22 and diagrammatically in FIG. 26b, actuates a limit switch 816 that is mounted on the top surface of the compound slide 110a, to effect energization of the fluid motor 761 of the compound slide to effect its operation in a direction to advance the compound slide 110a. As the compound slide 110a advances in a feeding movement, the control surface 771 of the cam 769 will engage the actuating rod 768 of the flow control valve 750 to control the advancement of the compound slide 110a at a rate determined by the control curvature 771 of the cam 769. As the compound slide advances at a controlled predetermined rate, the actuating rod 774a of the valve 780 will engage the control curvature of the cam 775 for effecting the operation of the fluid actuator 757 in a direction to retract the cross slide 108a at a controlled rate. The combined coordinated operation of the compound slide 110a and the cross slide 108a will operate to engage the tool 752 with the flange of the car wheel to generate one-half of the contour of the flange from the rear face of the car wheel to the center of the flange. As the cross slide 108a is retracted to a position wherein the cutting tool 752 has generated one-half of the desired flange contour and is positioned at the periphery of the flange, a dog 817 mounted on the side of the cross slide 108a actuates a limit switch 818 that is mounted on the top surface of the compound slide 110a. The limit switch 818, when actuated, will operate to effect a rapid advancement of the compound slide 110a which will continue until a dog 819, mounted on the side of the compound slide 110a, as shown in FIGS. 22 and 24 and diagrammatically in FIG. 26b, actuates a limit switch 820 that is carried on a bracket 825 secured to the side of the base 103a in position to be engaged by the dog 819. The limit switch 820, when actuated, will cause the fluid actuator 761 to be operated in the direction to advance the compound slide 110a towards the car wheel at a feed rate. Once again the co-ordinated movement of the compound slide under the control of the cam 769 and the cross slide 108a, under the control of the cam 775 will operate so that the tool 753 will perform a profiling operation on the flange of the car wheel to generate the other half of the flange contour. When the cutting tool 753 has been advanced so as to form the radius 720 at the juncture of the flange and tread of the car wheel, a dog 821 mounted on the side of the compound slide 110a will actuate a limit switch 822 that is disposed on the bracket 825 on the side of the base 103a. When the limit switch 822 is actuated it will cause the fluid motor 757 to operate in a direction to retract the cross slide 108a, moving the cutting tools 752 and 753 clear of the car wheel. When the cross slide 108a is fully retracted, the dog 817 will again actuate the limit switch 818. The limit switches 818 and 822 cooperate when actuated to effect operation of the fluid motor 761 in a direction to retract the compound slide 110a. The fluid motor 761 will continue to operate to retract the compound slide 110a until a dog 823, mounted on the side of the compound slide 110a, actuates a limit switch 824 that is carried by the bracket 825. When the limit switch 824 is actuated it operates to effect de-energization of the fluid motor 761 stopping its operation.

The inspection station 46, as shown in FIG. 25, comprises a base or bed 835 that is disposed transversely of the transfer line, and on which is movably supported a car wheel supporting frame, generally identified by the reference numeral 836. The movable car wheel supporting frame 836 comprises a pair of parallel side members 837, one of which is shown, that are upstanding from a base plate 838. The side members 837 are rigidly connected together by means of a reinforcing tie member 839. Upstanding from the top surface of the bed 835 and disposed on either side of the side members 837 are a pair of trunnions 841, one of which is shown. The trunnions support inwardly extending stub shafts 842 on which the car wheel supporting frame 836 is pivotally mounted for movement from the upright position, as shown in full lines in FIG. 25, to a horizontal position, shown in broken lines therein. For supporting a car wheel in position at the station 46 the guide rail 65 is interrupted and the station provided with a pair of aligned supporting rollers 846 and 847. The rollers 846 and 847 are identical and therefore reference will be made to the roller 847 with the description thereof applying to its companion roller 846.

The roller 847 having a tapered periphery which is inclined inwardly towards it axis, its configuration being a frustum of a cone, as shown in FIG. 25, is rotatably supported on a stub shaft 848 which is mounted in a bracket 849 that extends upwardly from the base plate 838 of the car wheel supporting frame 836. The pair of aligned supporting rollers 846 and 847 serve to receive and support the car wheels which are transferred along the guide rail 65 and into position in the station 46. Likewise, the upper fence rail 61 and the lower fence rail 63 are interrupted at station 46 and replaced by a pair of bar members 850 and 851 which are secured to the front surfaces of the side members of the supporting frame 836. Since the peripheries of the rollers 846 and 847 are tapered inwardly toward the frame 836, as shown in FIG. 25, a car wheel moved onto the rollers will be urged against the bar members 850 and 851 so as to be maintained in an upright position. To remove the car wheel from the line for inspection purposes the frame 836 is moved from the vertical position, as shown in full lines in FIG. 25, to a horizontal position, as shown in broken lines in FIG. 25, and while this is being done the car wheel must be securely clamped to the supporting frame 836. To clamp the car wheel to the frame member 836 a clamp member 855 is provided with operates to clamp the car wheel on the supporting rollers 846 and 847, and also to draw the car wheel against the bar members 850 and 851. To this end, the clamp 855 comprises an arm 856 which is pivotally secured to a bracket 857 that depends from the tie member 839. The arm member 856 is disposed so as to engage the periphery of the car wheel by being moved into position through a fluid actuator 858 which is operable to pivot the arm 856 into a clamping engagement with the car wheel or to effect movement of the arm 856 out of clamping engagement therewith.

The fluid actuator comprises a cylinder 859, one end of which is pivotally connected to a horizontally extending bracket 861 that is secured to a cross plate 862 carried by the side members 837 of the supporting frame 836. The cylinder 859 reciprocally supports a piston 860, diagrammatically shown in FIG. 28, having a piston rod 863, the free end of which is pivotally connected to the end of the arm 856 as at 864. As the fluid actuator 855 is energized to effect outward movement of the piston rod 863, the arm 856 is pivoted about the bracket 857 so as to move the end of the arm adjacent the car wheel downwardly to engage a pad 865 thereof into the radius formed by the flange and tread of the car wheel, to clamp the car wheel to the supporting rollers 846 and 847 on which it is cradled and against the bar member 850 and 851. In a releasing action the actuator 858 is energized for operation in the opposite direction, moving the piston rod 863 inwardly within the cylinder 859 thereby disengaging the arm 856 from the car wheel to free the car wheel for further advancement to station 47 through the operation of the transfer mechanism 55. When the car wheel is clamped, the supporting frame 836 may be pivoted between its vertical position and its horizontal position by operation of a fluid actuator 867 which is operable to pivot the frame 836 about the stub shafts 842 of the trunnions 841. The fluid actuator 867 comprises a cylinder 868 which is horizontally disposed in the bed 835 and has one end thereof pivotally secured thereto. The cylinder 868 supports a movable piston 870 that is provided with a piston rod 869 which extends outwardly of the cylinder 868 having its outer end pivotally connected to a bracket 871 that is welded or otherwise secured to the bottom surface of the bottom plate 838 of the supporting fram 836. The fluid actuator 867 may be energized to lower the supporting frame 836 into a horizontal inspection position by manually moving a lever 872 rightwardly as viewed in FIG. 25 from a vertical neutral position. Rightward movement of the lever 872 operates to condition a valve 873 that it is associated with to direct fluid pressure to the hydraulic actuator 867 to effect its operation for lowering the supporting frame 836. By manually returning the actuating lever 872 to the vertical position the fluid actuator 867 will be energized to effect movement of the supporting frame 836 upwardly into the vertical position to return the car wheel into the trasfer line. Likewise, the clamp actuator 858 is energized by manually manipulating a lever 875 rightwardly from its vertical position shown, which movement conditions a valve 876 that its is associated with to effect energization of the fluid actuator 858 for a clamping operation. To reverse the operation of the actuator 858 for releasing the car wheel, the lever 875 is returned to its vertical position. The valves 873 and 876 are mounted on a supporting bracket 878 that is secured to the side of the bed 835.

With the arrangement described, a car wheel at the inspection station and in an upright condition will be cradled on the supporting rollers 846 and 847 and maintained in an upright condition by the bars 850 and 851, and the upper fence rail 62. In this position the car wheel may be manually rotated on the rollers 846 and 847 for inspection purposes so that all portions of the rear face of the car wheel can be readily observed by the inspector. For gauging the flange and periphery of the car wheel and for inspecting the front face thereof the car wheel may be clamped and the frame 836 lowered to the horizontal position and inspection may be conveniently performed.

The action of the transfer mechanism 54 at station 43 and operation of the fixture head 95a as well as the tool slide units 97a and 107a are the results of hydraulic pressure being applied to various hydraulic cylinders which actuate the movements. The various limit switches employed to effect sequential operation of the solenoid operated valves employed in the hydraulic circuit are diagrammatically shown in FIGS. 26, 26a and 26b. FIGS. 29, 29a, 30, 30a, 30b and 31 illustrate wiring diagrams showing the interconnection of the electrical elements associated with the mechanisms of the various stations.

As shown, in FIGS. 26, 26a and 26b, the hydraulic system for actuating the various actuators associated with the machine unit of station 43 has been divided into a plurality of circuits. The operation of the machine unit of station 43, is in a practical organization interlocked to function in synchronism with the various other stations of the machine tool organization. However, for the purposes of the description, station 43 will be described as a solely operating unit and reference will be made to other conditions and other machine units only as they are required for the operation of station 43. In proceeding with the description operation of the station 43 it will be assumed that initial conditions have been obtained such that the transfer bar 127 is in a retracted position; and that the arms 138 to 138f thereof have been moved into position so that the rollers 139 to 139k engage workpieces at stations 39, 40, 41, 42, 43 and 44, and that the compound slide 110a and the cross slide 108a of the tool unit 107a are retracted; and that the compound slide 101a and the cross slide 98a of the tool unit 97a are both retracted; and, also, that the chucking spindle 561 of the fixture head 95a is retracted and in released condition, the transfer bar 127 is retracted, the transfer arm members are in an advanced position and the spindle drum 553 is stopped.

When these conditions have been obtained limit switches 151, 816, 822, 1266 and 1925 will have been deactuated and the limit switches 155, 708, 818, 824, 1285, 1295 and 1301 will have been actuated to complete an electrical circuit for energizing a solenoid 891 of a hydraulic direction valve 892, shown in FIG. 26, to move a spring centered plunger 893 thereof rightwardly to connect a pressure inlet port 894 thereof to a port 895 via a passage 896 provided in the plunger 893.

Thereupon, oil is drawn from an oil reservoir 900 through an intake line 901 and branch lines 902 and 903 which are respectively connected to a pair of pumps 904 and 905, that are constantly driven by a motor 906. Fluid under pressure from the pump 905 will flow therefrom into a line 907 and a pressure supply line 908 and flow through a check valve 909 to a line 911 that is connected to a common supply line 912. Likewise, fluid under pressure from the pump 904 will flow therefrom into a line 915 and by means of connected branch line 916 flows into a line 917 and through a connected check valve 918 into a line 919 connected to the common supply line 912. The combined fluid pressure from the pumps 904 and 905 in the line 912 will flow to the port 894 of the valve 892 through a connecting line 920 and a check valve 921. From the port 894 of the valve 892 the fluid under pressure will flow through the valve via the passage 896 and out through the port 895 into a line 922 and thence into a chamber 923 of the fluid actuator 140 of the transfer mechanism 54. The fluid pressure supplied to the chamber 923 of the actuator 140 will serve to operate the transfer mechanism 54 in an advancing movement whereby car wheels at stations 39, 40, 41, 42, 43 and 44 are advanced two stations, that is, into stations 41, 42, 43, 44, 45 and 46.

As the transfer mechanism 54 operates in a direction to advance the car wheel, the axial movement of the transfer bar 127 is decelerated as it nears the limit of its travel. To this end, the exhaust fluid in a chamber 925 of the fluid actuator 140 is exhausted therefrom to the reservoir 900 with the exhaust fluid from the chamber 925 being metered through a metering valve 926 which is connected into the circuit between the valve 892 and the chamber 925. As diagrammatically shown in FIG. 26, to effect a metering of the exhaust fluid from the chamber 925, a cam 927 that is diagrammatically shown as being mounted on the piston rod 137 of the fluid actuator 140 will be moved into engagement with the extending end of a plunger actuating rod 928 that is provided on a plunger 929 movably disposed within the valve body 930 of the valve 926. The plunger 929 is provided with a passage 931 which serves to connect a port 933 provided in the valve 930 to a port 934 thereof when the plunger 929 is biased into its normal upward position by means of an internal spring 932, as shown in FIG. 26. As the transfer bar moves in an advancing movement, a sloping surface 935 of the cam 927 will ride over the extending end of the plunger actuating rod 928 to force the plunger 929 inwardly to gradually restrict the flow between the ports 933 and 934 by displacement of the passage 931 relative to the ports. When the piston rod 137 has been moved a desired amount to effect like movement of the transfer bar 127 and the plunger 929, by action of the cam 927, will have been fully displaced to block the communication between the ports 933 and 934 of the valve thereby stopping the action of the actuator 140 and stopping the transfer movement. Thus, as fluid pressure is supplied to the chamber 923 of the actuator 140 to effect advancement of the transfer mechanism 54, exhaust fluid from the chamber 925 will flow out of the chamber through a port 937 provided in the cylinder 136 of the actuator 140 and into a line 938 connected between the port 937 and the port 933 of the metering valve 926. Fluid exhaust to the port 933 will flow through the metering valve 926 via the passage 931 of the plunger 929 and out through the port 934 of the valve into a line 939 which is connected to a port 940 of the valve 892. With the plunger 893 of the valve 892 in a rightward position the fluid exhaust will flow through the valve 892 via a passage 941 provided in the plunger 893 which is arranged so as to connect the port 940 with a port 942. The fluid exhaust will flow out of the port 942 of the valve 892 and into a line 943 connected into a line 944 which, in turn, is connected to a return line 945 leading to the oil reservoir 900. The fluid exhaust will be metered by the action of the cam 927 acting on the plunger 929 to gradually restrict the flow of exhaust fluid through the valve 926 slowing the advancing movement of the transfer mechanism 54.

At the end of the transfer movement the dog 150 on the transfer bar 127, as shown in FIG. 4 and diagrammatically in FIG. 26 as being associated with the piston rod 137 of the fluid actuator 140, will actuate the limit switch 151. When the limit switch 151 is actuated it functions to complete an electrical circuit to effect de-energization of a previously energized solenoid 948 of a solenoid operated direction valve 950 and also to energize a solenoid 949 of the valve 950. The solenoid 949, upon being energized, operates to position a plunger 951 within the valve 950 rightwardly, thereby connecting an inlet port 952 to a port 953 of the valve via a passage 954 provided in the plunger 951, and also connects a port 955 with a port 956 via another passage 957 in the plunger 951. Thereupon, oil in the supply line 912 will flow through a check valve 958 and a line 959 to the inlet port 952 of the valve 950. Oil under pressure will continue to flow through the valve 950 via the passage 954 and out through the port 953 into a line 960 connected to a chamber 961 of the arm actuator 132. Fluid pressure in the chamber 961 will serve to operate the fluid actuator 132 so as to resolve the transfer bar 127 to effect retraction of the arms 138, 138a, 138b, 138c, 138d, 138e and 138f of the transfer mechanism 54 out of car wheel engagement.

With the direction valve 950 conditioned to direct fluid pressure to the chamber 961 of the arm actuator 132, a chamber 967 of the actuator will be exhausted to the reservoir 900 to permit exhaust fluid in the chamber to be returned thereto. The fluid in the chamber 967 will be returned to the reservoir 900 via a line 968 which is in communication with the chamber 967 and connected to the port 956 of the valve 950. The exhaust fluid entering the port 956 of the valve will flow through the valve via the passage 957 in the plunger 951 and out through the port 955 into a connected line 969 which communicates with the return line 945.

As the fluid actuator 132 operates to fully retract the arms 138 to 138f, inclusive, the dog 152, shown in FIGS. 14, 15 and 16 and diagrammatically in FIG. 26, will actuate the limit switch 153. The limit switch 153, when actuated, will operate in conjunction with the actuated limit switch 151 to effect de-energization of the solenoid 891 of the valve 892 to permit the plunger 893 thereof to be spring returned to its centered neutral position. The limit switch 153, when actuated, will also operate to effect energization of a solenoid 972 of the hydraulic valve 892. The solenoid 972, when energized, will operate to move the spring centered plunger 893 leftwardly to connect the inlet port 894 of the valve to the port 940 thereof via a passage 973 provided in the plunger 893. The plunger 893, when in a leftward position, will also operate to connect the port 895 to the port 942 by means of a passage 974 also provided in the plunger 893. Thereupon, fluid pressure from the supply line 912 flows via the line 920 and through the check valve 921 to the inlet port 894 where it will flow through the valve 892 via the passage 973 and out through the port 940. From the port 940 the fluid pressure will continue through the line 939 and into a line 975, as diagrammatically shown in FIG. 26. From the line 975 the fluid pressure will flow through a check valve 976 and into the line 977 connected into the line 938 on the opposite side of the flow control valve 926. The by-pass circuit comprising the line 975, the check valve 976 and the line 977 is provided to by-pass the valve 926 since it is now held closed by the cam 927. From the line 977 the fluid pressure will continue to flow through the line 938 into the chamber 925 via the port 937 in the cylinder 136. The fluid pressure supplied to the chamber 925 of the actuator 140 will effect the operation of the transfer mechanism 54 to retract it so that it will repositioned for another cycle of operation. When the transfer mechanism 54 is fully retracted a dog 154, shown in FIGS. 14, 15 and 16 and diagrammatically in FIG. 26, will actuate a limit switch 155 which operates to effect de-energization of the solenoid 972 thereby allowing the plunger 893 of the valve 892 to be spring returned to its central neutral blocking position, as shown in FIG. 26.

As previously mentioned, the limit switch 151 which was actuated by the dog 150 upon full advancement of the transfer mechanism 54 will also operate to effect energization of the solenoid 980 of a valve 981 to position a plunger 982 therein into a leftward position, as shown in FIG. 26, to connect a pressure inlet port 983 thereof to a port 984 via a passage 985 provided in the plunger 982. At this time fluid from the supply line 912 will flow to the inlet port 983 of the valve 981 via a connecting line 986 and will flow through the valve 981 via the passage 985 of the plunger 982 and the outlet port 984 into a line 987 from whence it will be directed into a chamber 988 of the chucking spindle actuator 580. At this time, a chamber 989 in the actuator 580 is vented to the reservoir 900 via a line 992 connected to a port 993 of the valve 981 which is in communication with a port 994 provided in the valve 981 by means of a passage 995 provided in the plunger 982. The port 994 is connected to the reservoir 900 by means of a line 996 which is in communication with the return lines 944, and 945. The fluid under pressure in the chamber 988 of the actuator 580 serves to effect operation of the actuator 580 as previously described to advance the chucking spindle 561 outwardly of the fixture head 95a to engage the nose portion 570 thereof in the hub of the car wheel in the transfer line at station 43. When the chucking spindle 561 has been fully advanced, the dog 703 on the spindle will actuate the limit switch 704.

The limit switch 704, upon being actuated, operates to effect energization of a solenoid 1010 of a valve 1011 to move the plunger 1012 therein to a leftward position, shown in FIG. 26, to connect a pressure inlet port 1013 thereof to a port 1014 via a passage 1015 provided in the plunger 1012. Thereupon, oil from the supply line 912 flows through a connecting line 1016 and through a check valve 1017 into a line 1018 connected to the inlet port 1013 of the valve 1011. The fluid under pressure will enter the inlet port 1013 of the valve 1011 and flow therethrough via the passage 1015 in the plunger 1012 and out through the port 1014 into a connecting line 1019 to enter a chamber 1020 in the fluid actuator 590. Fluid pressure in the chamber 1020 of the actuator 590 serves to effect operation of the actuator in a direction to actuate the clamping jaws 571 in the nose portion 570 of the spindle 561 outwardly into clamping engagement with the interior wall of the hub of the car wheel, as previously described.

As the fluid pressure supplied to the chamber 1020 of the actuator 590 operates to effect a clamping action, exhaust fluid from a chamber 1025 of the actuator will flow into a line 1026 connected to a port 1027 of the valve 1011. With the plunger 1012 of the valve 1011 in a leftward position, as shown in FIG. 26, the exhaust fluid to the port 1027 will flow through the valve via a passage 1028 provided in the plunger 1012 and will flow out of the valve via an outlet port 1029 into a line 1030 connected into the return line 944.

The limit switch 704, upon being actuated by the dog 703, after completion of spindle clamping, will also operate to effect energization of a solenoid 1031 of a hydraulic valve 1032 to position a plunger 1033 thereof into a leftward position, as shown in FIG. 26, to connect an inlet port 1034 thereof to a port 1035 via a passage 1036 provided in the plunger 1033. With the valve 1032 conditioned as described above, fluid from the line 912 will enter the port 1034 of the valve 1032 via a line 1037 and flow through the valve 1032 by means of the connecting passage 1036 and the port 1035. The fluid pressure will flow out of the port 1035 and the valve 1032 and into a line 1038 connected to a chamber 1039 in the cylinder 701. Fluid pressure supplied to the chamber 1039 will effect operation of the sectionalized fence or guide rails actuator 699 to move the guide rails 61a and 63a apart to clear a path for the movement of the car wheel out of the transfer line, as previously described.

When fluid pressure is supplied to the chamber 1039 of the cylinder 701 to actuate the rail sections 61a and 63a apart, fluid in a chamber 1040 on the rod side of the piston of the cylinder 701 will be exhausted therefrom and flow out of the chamber into a line 1041 to enter a port 1042 of the valve 1032 and flow through the valve via a passage 1043 provided in a plunger 1033 of the valve and out of the valve through a port 1044 and by means of a connecting line 1045 will flow into the return line 944, as shown in FIG. 26.

When the guide rail sections 61a and 63a have been moved apart, the limit switch 706 will be actuated to de-energize the solenoid 980 of the valve 981. The limit switch 706, when actuated, will also operate to effect energization of a solenoid 1046 of the valve which operates to move the plunger 982 within the valve 981 rightwardly to connect the inlet port 983 of the valve with the port 993 via a passage 1047 provided in the plunger 982. With the valve 982 conditioned as described fluid pressure from the line 912 will flow from the line 986 into the inlet port 983 of the valve and through the passage 1047 of the plunger out through the port 993 into the line 992 into the chamber 989 of the spindle actuator 580. Fluid pressure supplied to the chamber 989 of the actuator 580 will effect its operation in a direction to retract the spindle 561 and with it the car wheel to move the car wheel from the transfer line into engagement with the serrated pads 605 on the face plate 558 of the drum 553.

When the ram actuator 580 is operated in a direction to retract the spindle 561, fluid in the chamber 988 of the actuator will be exhausted to the reservoir 900 via the line 987 to enter the port 984 of the valve 981 and pass therethrough by means of a passage 1048 provided in the plunger 982 thereof and will flow out of the valve via the port 994 and into the line 996 connected to the return line 944. From the return line 994 the fluid exhaust will continue to flow by means of the connecting line 945 to the reservoir 900.

When the spindle 561 has been fully retracted the wedge rack 608 will be operated into locking engagement with the ring 574. To this end, the dog 703 on the spindle 561 will actuate the limit switch 708 which when actuated will operate to effect energization of a solenoid 1054 of a hydraulic valve 1055 to move a plunger 1056 thereof to a rightward position, as viewed in FIG. 26, to connect a pressure inlet port 1057 thereof to a port 1058 by means of a passage 1059 provided in the plunger 1056. With the valve 1055 conditioned as described above, fluid pressure in the supply line 912 will flow through a check valve 1060 and into a line 1061 connected to the inlet port 1057 of the valve 1055. Fluid pressure supplied to the inlet port 1057 of the valve 1055 will flow through the valve via the passage 1059 and out through the port 1058 into a line 1062 connected to a chamber 1063 of the wedge lock actuator 627. The fluid pressure to the chamber 1063 of the actuator 627 will effect its operation in a direction to move the rack 608 downwardly to engage the tapered end 610 thereof with the ring 574, positively locking the car wheel to the face plate 558. When the wedge lock actuator 627 is operated in the direction to effect a locking action, fluid in a chamber 1064 of the actuator 627 will be exhausted therefrom via a line 1065 that is in communication therewith and which is connected to a port 1066 of the valve 1055. The exhaust fluid to the port 1066 of the valve 1055 enters the valve and passes therethrough by means of a passage 1067 provided in the plunger 1056 of the valve and will flow out of the valve via another port 1068 provided in the valve 1055. From the port 1068 of the valve the fluid exhaust will enter the return line 944 and by means of the connecting return line 945 return to the reservoir 900.

With the rack 608 firmly engaged with the ring 574, fluid pressure in the line 1062 will build up and actuate a pressure switch 1070 which operates to effect energization of a solenoid 1071 of a hydraulic direction valve 1072 to move a plunger 1073 in the valve rightwardly to the position shown in FIG. 26, to connect a pressure inlet port 1074 thereof to a port 1075 via a passage 1076 provided in the plunger 1073. Fluid pressure in the line 911 will flow into a connected line 1077 to the inlet port 1074. From the port 1074 of the valve 1072 fluid pressure will continue to flow through the valve via the passage 1076 in the plunger 1073 and out through the port 1075 of the valve into a connected line 1078 which is in communication with a chamber 1079 of the brake actuator 689.

Fluid pressure supplied to the chamber 1079 of the brake actuator 689 will effect the operation of the actuator in a direction to release the brake band from tight engagement about the braking surface of the drum 553 to free it for rotation. At this time, a chamber 1080 in the actuator 689 is vented to the reservoir 900 via a line 1081, a check valve 1082 and a line 1083 that is connected to a port 1084 of the valve 1072. With the valve plunger 1073 in a rightward position, as described, the port 1084 is in communication with a port 1085 of the valve by means of a communicating cross passage 1086 provided in the plunger 1073. The exhaust port 1085 of the valve 1072 is connected to the return line 945 by means of a connecting line 1087.

When the fluid actuator 689 has operated to release the drum brake 683, fluid pressure in the line 1078 will flow through a sequence valve 1088 in communication with the line 1078 and by means of a branch line 1089 which is connected to the sequence valve 1088 and which is also in communication with a chamber 1090 of the clutch actuator 677, shown in FIGS. 18 and 26, for effecting its operation in a direction to engage the clutch mechanism 645 of the drum rotating drive transmission. With the brake mechanism 683 released and the clutch 645 engaged, the drum 553, with the car wheel secured to the face plate 558 thereof, will be rotated for the performance of a work operation on the car wheel. As the fluid actuator 677 is actuated to engage the clutch 645, a chamber 1091 in the actuator 677 will be vented to the reservoir 900 by means of a line 1092 that is in communication with the chamber 1091 and which is connected to the line 1083 which is in communication with the port 1084 of the valve 1072. The exhaust fluid will enter the port 1084 and flow through the valve 1072 via the cross passage 1086 and flow out of the valve via the port 1085 into the line 1087 that is connected to the return line 945.

As shown in FIGS. 19 and 26, the piston 676 with the fluid actuator 689 is provided with a rod 1093 that extends outwardly of the cylinder 690. The rod 1093 has secured to it a dog 1094 which is disposed thereon in position to actuate a limit switch 1095 when the actuator 689 has been operated to release the brake 683. Also, as shown in FIGS. 18 and 26, a dog 1096 that is secured to the piston rod 681 of the clutch actuator 677 will actuate a limit switch 1097 after the actuator has operated to effect engagement of the clutch mechanism 645. The two limit switches 1095 and 1097 are electrically connected in series, and when both are actuated they operate in conjunction with each other to effect the advancing movement of the compound slide 110a of the tool unit 107a as will be subsequently described.

When the car wheel has been securely clamped to the face plate 558 of the drum 553, the pressure switch 1070, which was actuated upon the build up of fluid pressure in the line 1062 will also operate to effect energization of a solenoid 1109 of a hydraulic valve 1110, as shown in FIG. 26b, to move a spring centered plunger 1111 leftwardly to connect a pressure inlet port 1112 of the valve to a port 1113 thereof by means of a passage 1114 provided in the plunger 1111.

With the valve 1110 conditioned as described above, oil from an oil reservoir 1115 will be drawn through an intake line 1116 into a pump 1117 that is constantly driven by a motor 1118. Fluid under pressure will flow from the pump 1117 into a connected line 1119 and into a branch line 1120 which is connected to the inlet port 1112 of the valve 1110. From the inlet port 1112 fluid under pressure will flow through the valve 1110 via the passage 1114 in the plunger 1111 and out of valve 1110 through the port 1113 into a line 1122 and thence into a line 1123 which is connected to the fluid motor 757 of the cross slide 108a. As fluid pressure is supplied to the fluid motor 757 via the line 1123, exhaust fluid from the fluid motor will be directed to the reservoir 1115 by means of a connected line 1124 which, in turn, is connected to a line 1125 leading to a port 1126 of the valve 1110. The exhaust fluid from the fluid motor to the port 1126 will flow through the valve and through a passage 1127 in the plunger 1111 and out of the valve 1110 through a port 1128 provided in the valve 1110. The exhaust fluid will continue from the port 1128 and flow through a connected line 1129 which leads to a return line 1130 that is in communication with the reservoir 1115. The fluid motor 757, when supplied with fluid pressure from the line 1123, will operate to rapidly advance the cross slide 108a to position the cutting tool 752 carried thereon in a desired position relative to a car wheel secured to the face plate 558.

When the cross slide 108a is advanced to position the cutter 752 in a desired position relative to the car wheel, the dog 815 on the cross slide will actuate the limit switch 816 which, when actuated, will effect de-energization of the solenoid 1109 of the valve 1110 allowing the plunger 1111 thereof to be spring returned to a centered blocking position, as shown in FIG. 26b, stopping the operation of the fluid motor 757.

The limit switch 816 when actuated to stop the advancement of the cross slide 108a will also operate to effect energization of a solenoid 1134 of another hydraulic valve 1135 to move a spring center plunger 1136 in the valve rightwardly, as viewed in FIG. 26b, to connect an inlet port 1137 of the valve to a port 1138 thereof by means of a cross passage 1139 provided in the plunger 1136. Thereupon, oil is drawn from the reservoir 1115 through an intake line 1140 and a branch line 1141 into a pump 1142 which is constantly driven by a motor 1143, as shown in FIG. 26b. Fluid from the pump 1142 will be pumped under pressure into a line 1144 which is connected to the inlet port 1137 of the valve 1135. From the inlet port 1137 the fluid pressure will flow through the valve 1135 via the passage 1139 in the plunger therein, and out through the port 1138 into a connected line 1145 to flow to an inlet port 1146 of the metering valve 750. The inlet port 1146 of the metering valve 750 is connected to an outlet port 1147 which are in communication by means of a passage 1148 provided in the resiliently biased plunger 770 within the valve 750. The fluid under pressure will flow out of the port 1147 of the valve 750 and into a connecting line 1150 which is connected to the fluid motor 761 of the compound slide 110a to effect movement of the compound slide 110a in a direction to advance the cutting tools toward the car wheel.

At this time the fluid motor 757, which is connected to drive the cross slide 108a, receives fluid presure from the control valve 780 which serves to control the operation of the motor 757 as dictated by the cam 775 during the actual machining operation. The valve 780 may be of any suitable type and, as shown in FIG. 26b, comprises the valve body 773 having an inlet port 1156 and a pair of exhaust ports 1157 and 1158 which are spaced on either side of the inlet port 1156, as shown in FIG. 26b. The valve body 773 is also provided with a pair of ports 1159 and 1160 which, as shown in FIG. 26b, are disposed so as to be intermediate of the ports 1156, 1157 and 1158. The valve plunger 774 of the valve 780 which is movably disposed within the valve body 773 comprises a pair of spools 1162 and 1163 which are connected together by means of a rod 1164. The spools 1162 and 1163 are spaced apart a distance sufficient so that when the plunger is in a position, as shown in FIG. 26b, the spools 1162 and 1163 will serve to block the ports 1159 and 1160, while permitting the ports 1156, 1157 and 1158 to be in communication with the interior of the valve body 773. The valve plunger 774 is normally biased to a rightwardly position by means of a spring 1165 that is disposed within the valve body and positioned between the end of the valve body and the spool 1162 and which normally operates to position the plunger 774 rightwardly, as viewed in FIG. 26B. The plunger 774, when in its normal rightward position, will be disposed so that the spools 1162 and 1163 will be positioned to place the port 1157 in communication with the port 1160 and the port 1158 in communication with the port 1159, while the inlet port 1156 is effectively blocked by the spool 1162. To effect positioning of the plunger 774 to control the operation of the fluid motor 757 at a desired rate, the plunger 774 is provided with the actuating rod 774a which extends outwardly of the valve body 773 so that the end thereof may be engaged by the control surface of the cam 775.

Thus, as the fluid motor 761 operates to advance the compound slide 110a carrying the cross slide with it, the valve 780 will move with the cross slide 108a to engage the extending end of the actuating rod 774a with the control curvature of the cam 775. At this time oil is drawn from the reservoir 1115 through the intake line 1140 and a branch line 1167 into a pump 1168 which is also driven by the motor 1118. Fluid pressure from the pump 1168 will flow through a connected line 1169 leading to the inlet port 1156 of the valve 780 and enter into the valve into the space existing between the spools 1162 and 1163. As the compound slide 110a continues to be advanced, the extending end of the actuating rod 774a will follow the curvature of the cam 775 moving the plunger 774 inwardly against the pressure of the spring 1165. At this time, the fluid motor 761, which affects the movement of the compound slide 110a, will be operated at a feed rate as determined by the contour of the cam 769 associated with the valve 767. Thus, as the motor 761 operates, the cam 769 will move with the compound slide 110a into engagement with the extending end of the plunger actuating rod 768 to meter the flow of fluid pressure to the fluid motor 761. At the same time the valve 780 will be moved relative to the cam 775 with the actuating rod 774 following the contour of the cam to move the punger 774 inwardly, thereby placing the inlet port 1156 into communication with the port 1160 to permit fluid pressure to flow through the valve at a controlled rate into a line 1170 which is connected to the line 1123 leading to the fluid actuator 757.

The exhaust fluid from the motor 757 will be returned to the reservoir 1115 via the line 1124 which is connected to the port 1159. Exhaust fluid to the port 1159 will flow through the valve and out through the port 1158 and through a check valve 1171 into a line 1172 connected to a check valve 1173. The check valve 1173 will be opened, to permit the exhaust fluid to flow through, by means of pilot pressure received from the pressurized line 1144 through a pilot line 1174, shown in broken lines in FIG. 26b. The exhaust fluid will flow through the check valve 1173 into a line 1175 that is connected into the line 1129 that, in turn, communicates with the return line 1130. As the coordinated movement of the compound slide 110a and the cross slide 108a is effected the tool 752 will be engaged with the car wheel so as to generate one-half of the desired contour of the car wheel flange. When the coordinated movements of the compound slide 110a and the cross slide 108a have been such that the plunger actuating rod 774a of the valve 780 is at a position along the surface of the cam 775, as indicated by the dotted lines, the cutter 752 will have reached the top of the flange and will leave the workpiece, having completed the first part of the cut. At this time the limit switch 818, shown in FIGS. 22 and 26b, will be actuated by the dog 817 carried by the cross slide 108a to effect deenergization of the solenoid 1134 of the valve 1135 thereby permitting the valve plunger 1136 to be spring returned to its central neutral position, as shown in FIG. 26b, to condition the valve for a subsequent operation.

The limit switch 818, having been actuated by the dog 817, will also operate to effect energization of a solenoid 1179 of a valve 1180 to move a plunger 1181 therein to a leftward position, as viewed in FIG. 26b, connecting an inlet port 1182 of the valve to a port 1183 by means of a passage 1185 in the valve plunger 1181. Thereupon, fluid pressure from the pump 1117 supplied to the inlet port 1182 of the valve 1180 will flow through the valve and out through the port 1183 into a connected line 1186 which is connected to the line 1150 that communicates with the fluid motor 761, to operate the motor for advancing the compound slide 110a at a rapid rate. At this time, when the fluid motor 761 is receiving fluid pressure through the valve 1180 the fluid exhaust from the fluid motor 761 will return to the reservoir 1115 via a line 1187 and a connecting line 1188 which is in communication with a port 1189 provided in the valve 1180. Fluid exhaust entering the port 1189 of the valve will flow through the valve via a passage 1190 and out through a port 1191 and into the line 1130 leading to the reservoir 1115. When the fluid motor 761 is operated by fluid pressure supplied through the valve 1180 to advance the compound slide 110a the actuating rod 774a of the valve 780 will be moved across the flat surface F of the cam 775, while the plunger 768 of the valve 767 associated with the fluid motor 761 will be moved across the flat surface R of the cam 769. The rapid traverse movement of the compound slide 110a will continue until the limit switch 820 is actuated by the dog 819. The limit switch 820, when actuated, will effect de-energization of the solenoid 1179 of the valve 1180 to permit the plunger 1181 thereof to be spring returned to its central blocking position, as shown in FIG. 26b, to block the flow of fluid pressure to the fluid motor 761 and thereby stop its operation at a rapid rate. Simultaneously with the de-energization of the solenoid 1179 the limit switch 820 will effect energization of the solenoid 1134 of the valve 1135 to effect rightward positioning of the plunger 1136 thereby reconnecting the inlet port 1137 of the valve to the port 1138 of the valve via the passage 1139 of the plunger to supply fluid pressure to the fluid motor 761 through the control valve 767. At this time, the actuating rod 768 of the valve 767 will be positioned to follow the curve R2 of the cam 769, which permits the plunger 1149 therein to move rightwardly under spring pressure, as viewed in FIG. 26b. Fluid pressure will now flow from the port 1137 of the valve 1135 through the passage 1139 and out through the port 1138 into the line 1145 and through the valve 767 and thence into the line 1150 leading to the fluid motor 761. Thus, the fluid motor 761 will be continued to be operated in a direction to advance the compound slide 110a and at a feed rate that is controlled by the curved surface R2 of the cam 769. Also, at this time, the plunger 774a of the valve 780 will be disposed at a position T2 on the cam 775 and the tool 753 will be positioned to generate the contour of the other half of the flange of the car wheel and the operation of the motors 757 and 761 will be coordinated to move the compound slide 110a and the cross slide 108a in proper relationship so that the desired contour of the other side of the flange will be generated.

When the compound slide 110a is fully advanced the limit switch 822, shown in FIGS. 22 and 26b, will be actuated by the dog 821. At this time, the plunger actuating rod 774a of the valve 780 will be disposed in position P on the cam 775 which position corresponds to the location of the annular radius of the car wheel that is formed at the juncture of the flange and tread thereof and the desired contour of the flange will have been formed. The plunger 774 of the valve 780 will be positioned, by the action of the spring 1165, so that the spool 1162 will block the inlet port 1156 and thereby stop the flow of fluid pressure to the fluid motor 757 for terminating its operation.

When the limit switch 822 is actuated by the full advancement of the compound slide 110a it will operate to effect energization of a solenoid 1194 associated with the valve 1110 to move the spring centered plunger 1111 rightwardly and thereby connect the inlet port 1112 of the valve to the port 1126 by means of a cross passage 1195 provided in the plunger 1111. Also, the port 1113 is connected to the exhaust port 1128 by means of another cross passage 1196 provided in the plunger. Thereupon, fluid pressure from the pump 1117 will be supplied to the inlet port 1112 of the valve 1110 via the lines 1119 and 1120 and will flow through the valve 1110 via the passage 1195 and out through the port 1126 into the line 1125 and by means of the connected line 1124 will be supplied to the fluid motor 757. Fluid pressure supplied to the motor 757 via the line 1124 will operate the motor in the opposite direction to effect retraction of the cross slide 108a at a rapid traverse rate. At this time the exhaust fluid from the motor 757 will be returned to the reservoir 1115 via the lines 1123 and 1122 and will enter the valve 1110 through the port 1113 and pass therethrough via the passage 1196 of the plunger 1111 and out through the port 1128 of the valve into the line 1129 which is connected to return line 1130. Thus, the control valve 780 which is now conditioned to block the flow of fluid pressure to the fluid motor 757 is bypassed and the operation of the motor is effected through the valve 1110.

When the cross slide 108a is fully retracted the limit switch 818 will again be actuated by the dog 817 and will operate to effect de-energization of the solenoid 1194 of the valve 1110 to allow the plunger 1111 thereof to be spring returned to its central neutral position blocking the flow of fluid pressure to the motor 757 thereby stopping its operation. When the limit switches 818 and 822 are both actuated they operate to effect energization of a solenoid 1197 associated with the valve 1180 to position the plunger 1181 therein rightwardly to connect the inlet port 1182 with the port 1189 by means of a cross passage 1198 provided in the plunger 1181. Fluid pressure in the line 1119 will enter the port 1182 of the valve 1180 and flow therethrough by means of the passage 1198 in the plunger 1181 and out through the port 1189 into the line 1188 which communicates with the line 1187. Fluid pressure will flow from the line 1187 into the fluid motor 761 to effect its operation in a direction to retract the compound slide 110a at a rapid rate. At this time, the fluid exhaust from the motor 761 will be returned to the reservoir 1115 via the line 1150 and the connected line 1186 which is connected to the port 1183 of the valve 1180 and by means of another cross passage 1199 provided in the plunger 1181 will flow through the valve and out through the exhaust port 1191 of the valve into the return line 1130 to be returned to the reservoir 1115.

When the compound slide 110a is fully retracted the limit switch 824 will be actuated by the dog 823. When actuated, the limit switch 824 operates to effect de-energization of the solenoid 1197 of the valve 1180 to permit the plunger 1181 thereof to be spring returned to a central neutral blocking condition, as shown in FIG. 26b, thereby stopping the flow of fluid pressure to the fluid motor 761 of the compound slide 110a to stop its operation.

As the tool unit 107a is operating to generate the desired contour in the flange of the car wheel the tool unit 97a will be operated simultaneously therewith on the opposite side to effect a turning operation on the tread of the car wheel. To this end, after the car wheel has been clamped to the face plate 558 and the pressure switch 1070 actuated by the build up of pressure in the line 1062, as previously described, the latter will also operate to effect energization of a solenoid 1209 of a hydraulic valve 1210, shown in FIG. 26a, to move a spring centered plunger 1211 therein leftwardly to connect an inlet port 1212 to a port 1213 of the valve by means of a passage 1214 provided in the plunger 1211.

With the valve 1210 conditioned as described, oil is drawn from an oil reservoir 1215 through an intake line 1216 and a pair of branch lines 1217 and 1218 into pumps 1219 and 1220 which are respectively connected to receive oil from the branch lines 1217 and 1218. The pumps 1219 and 1220 are constantly driven by a motor 1221 in well known manner. The combined output of the pumps 1219 and 1220 is pumped into a supply line 1222 which is connected to the pumps 1219 and 1220 by means of a pair of connecting lines 1223 and 1224. The fluid pressure from the pumps 1219 and 1220 will flow through the line 1222 to the inlet port 1212 of the valve 1210 and flows through the valve by means of the passage 1214 provided in the plunger 1211 and out of the valve through the port 1213 into a connected line 1225. The fluid presure in the line 1225 will pass through a connected check valve 1226 into a line 1227 and thence into a line 1228 which is in communication with a chamber 1229 of the fluid actuator 739. The fluid pressure supplied to the chamber 1229 of the fluid actuator 739 will serve to operate the actuator in a direction to move the compound slide 101a and thereby the cross slide 98a with it, to an advanced position wherein the cutting tool 711 carried by the cross slide 98a will be positioned ahead of the car wheel which is securely clamped to the face plate 558. As fluid pressure is supplied to the chamber 1229 of the actuator 739, a chamber 1230 of the actuator on the rod side of the piston therein is exhausted to the reservoir 1215 via a line 1231 connected to a port 1232 of the valve 1210. With the plunger 1211 in a leftward position, the port 1232 is connected to an exhaust port 1233 provided in the valve 1210 by means of another passage 1234 provided in the plunger 1211. The exhaust port 1233 is connected to the reservoir 1215 by a return line 1235.

The pressure switch 1070, shown in FIG. 26, when actuated, also operates to effect energization of a solenoid 1239 of a hydraulic valve 1240 to move a spring centered plunger 1241 therein leftwardly from a central neutral position, to connect a pressure inlet port 1242 of the valve to an outlet port 1243 thereof by means of a passage 1244 provided in the plunger 1241. With the valve 1240 conditioned as described above, fluid pressure from the supply line 1222 will flow through a connected branch line 1245 which is in communication with the inlet port 1242 of the valve 1240. The fluid pressure supplied to the port 1242 will flow through the valve 1240 via the passage 1244 in the plunger 1241 and out through the port 1243 of the value into a line 1246 connected thereto. The fluid pressure will flow through the line 1246 and by means of a branch line 1247 will be supplied to a chamber 1248 of the cross slide clamp actuator 726 to insure that the cross slide 98a is unclamped and is free to move on the compound slide 101a.

As fluid pressure is supplied to the chamber 1248 of the cross slide clamp actuator 726 to maintain the clamp in a released condition, a chamber 1249 on the rod side of the piston therein will be vented to the reservoir 1215 via line 1250, a by-pass line 1251, and a check valve 1252 which communicates with a line 1253 connected into a line 1254 that, in turn, is connected to a line 1255. The line 1255, in turn, is connected to a port 1256 provided in the valve 1240, which, when the plunger 1241 of the valve is in a leftward position is connected to a port 1257 by means of a passage 1258 provided in the plunger 1241. The exhaust port 1257 of the valve 1240 is connected to the reservoir 1215 by means of a connecting line 1259.

The fluid pressure supplied to the chamber 1248 of the clamp actuator 726 for maintaining it in an unclamped condition will build up in the line 1246 and will sequence through a connected sequence valve 1260 and flow into a line 1261 which communicates with a chamber 1262 on the rod side of a piston of the cross slide fluid actuator 732. Fluid pressure supplied to the chamber 1262 of the actuator 732 will act to positively maintain the cross slide 98a in an advanced or forward position so that the cutting tool 711 thereon will not engage the car wheel as the compound slide 101a is being advanced toward the car wheel to effect a position of the cutting tool 711 at the front face of the car wheel. When fluid pressure is supplied to the chamber 1262 of the actuator 732 a chamber 1263 at the head side of the piston therein will be exhausted to the reservoir via the line 1255 which is connected to the port 1256 of the valve 1240. The balance of the exhaust circuit is the same as that described for exhausting the chamber 1249 of the clamp actuator 726 which has been previously described.

When the compound slide 101a has been fully advanced to position the cutting tool 711 toward the front face of the car wheel a dog 1265, shown in FIGS. 20 and 26a, which is adjustably mounted on the side of the compound slide 101a, will engage and actuate a limit switch 1266 that is carried on a bracket 1267 mounted on the base 103a. The limit switch 1266, when actuated, will operate to effect de-energization of the solenoid 1209 of the valve 1210 to permit the plunger 1211 therein to be spring returned to its central neutral blocking position, as shown in FIG. 26a, to stop the flow of fluid pressure to the chamber 1229 of the compound slide actuator 739.

The limit switch 1266, when actuated upon full advancement of the compound slide 101a, will also operate to effect de-energization of the solenoid 1239 and energization of a solenoid 1271 of the valve 1240 to move the spring centered plunger 1241 therein rightwardly to connect the inlet port 1242 of the valve to the port 1256 via a passage 1272 provided in the plunger 1241, and to connect the ports 1243 and 1257 together by means of another cross passage 1273 in the plunger 1241.

When the valve 1240 is conditioned as described above with the plunger 1241 thereof in a rightward position, fluid pressure from the line 1245 will enter the port 1242 of the valve and flow through the valve via the passage 1272 in the plunger 1241 and out of the valve through the port 1256 into the line 1255 which is in communication with the chamber 1263 of the actuator 732. At this time the chamber 1262 of the actuator 732 will be exhausted to the reservoir 1215 via the line 1261 and a connecting by-pass line 1280 which is connected to a check valve 1281. The outlet side of the check valve 1281 is connected to a line 1282 which is in communication with the line 1246 which, as previously described, is connected to the port 1243 of the valve 1240. The exhaust circuit then continues by means of the passage 1273 in the plunger 1241 and the exhaust port 1257 of the valve to which the line 1259 leading to the reservoir 1215 is connected. The fluid pressure supplied to the chamber 1263 of the cross slide actuator 732 will operate the actuator 732 in a direction to advance the cross slide 98a to effect the positioning of the cutting tool 711 relative to the car wheel that is clamped to the fixture head 95a. When the cross slide actuator 732 has reached the limit of its stroke, the fluid pressure in the line 1255 will build up and by means of the connecting line 1254 will sequence through a sequence valve 1283 and enter the line 1250 which is in communication with the chamber 1249 of the cross slide clamp actuator 726. At this time, the chamber 1248 of the actuator 726 will be exhausted to the reservoir via the line 1247 and a line 1246 connected to the port 1243 of the valve and by means of the passage 1273 in the plunger 1241 will be connected to the exhaust port 1257 of the valve which is connected to the reservoir 1215 by the line 1259. The fluid pressure supplied to the chamber 1249 will effect operation of the actuator 726 to effect a clamping of the cross slide 98a in the advanced position on the compound slide 101a. The cutting tool 711 on the cross slide 98a will be in position to be advanced into a work engaging operation with the tread of the car wheel, as indicated in FIG. 20. When the clamp mechanism 715 has been operated to clamp the cross slide 98a to the compound slide 101a, a dog 1284 that is adjustably secured to the piston rod 723 of the actuator 726, as shown in FIG. 20 and diagrammatically in FIG. 26a, will actuate a limit switch 1285 that is mounted on the top surface of the cross slide 98a. The limit switch 1285, when actuated by the dog 1284, will operate to effect energization of a solenoid 1289 of the valve 1210 to move the spring centered plunger 1211 therein rightwardly to connect the pressure inlet port 1212 of the valve 1210 with the port 1232 of the valve by means of a passage 1290 that is formed in the plunger 1211. At this time, the port 1213 and the exhaust port 1233 of the valve will be connected together by means of a passage 1291 also formed in the plunger 1211.

With the valve 1210 conditioned as described above, fluid pressure in the line 1222 and supplied to the port 1212 of the valve 1210 will flow through the valve via the passage 1290 and out through the port 1232 into the connected line 1231 leading to the chamber 1230 of the compound slide actuator 739. The fluid pressure supplied to the chamber 1230 of the actuator 739 will effect its operation in a direction to move the compound slide 110a and therewith the cross slide 98a in a direction to move the cutting tool 711 across the tread of the car wheel for the purpose of performing a turning operation on the tread thereof. At this time, the exhaust fluid in the chamber 1229 of the actuator 739 will be returned to the reservoir via the line 1228 which is connected to a flow control valve 1292 and will flow through the valve 1292 into a line 1293 which is connected to the line 1225 leading to the port 1213 of the valve 1210. The exhaust fluid to the port 1213 of the valve will flow through the valve via the passage 1291 in the plunger 1211 and flow out through the valve through the port 1233 into the return line 1235. The exhaust fluid from the chamber 1229 will be metered by the flow control valve 1292 and the feed rate of the compound slide 101a will be determined by the setting of the valve 1292.

The feeding movement of the compound slide 101a will continue until a dog 1294, mounted on the side of the compound slide 101a, as shown in FIGS. 20 and 26a, actuates a limit switch 1295 that is mounted on the bracket 1267. The limit switch 1295, when actuated, will operate to effect de-energization of the solenoid 1289 of the valve 1210 to permit the spring biased plunger 1211 therein to be returned to its central neutral blocking position, thereby stopping the flow of fluid pressure to the chamber 1230 of the compound slide actuator 739. At this time, the cutting tool 711 will have been advanced across the tread of the car wheel into the juncture that is formed by the flange and tread of the car wheel to form the radius 720, as indicated in FIG. 20. When the cutting tool 711 has been advanced so as to form the radius 720 of the car wheel, the radius forming tool 712, shown in FIG. 20, will have been engaged with the car wheel to form the radius on the circumferential edge of the tread adjacent the front face of the car wheel.

The limit switch 1295, when actuated, will also operate to effect de-energization of the solenoid 1271 as well as energization of the solenoid 1239 of the valve 1240 to again effect a positioning of the plunger 1241 therein to direct fluid pressure from the line 1245 through the valve via the inlet port 1242, the passage 1244 of the plunger and the port 1243 into the line 1246 from whence it will flow into the line 1247 connected to the chamber 1248 of the clamp actuator 726.

The fluid pressure supplied to the chamber 1248 of the clamp actuator 726 will effect its operation in a direction to actuate the cross slide clamp mechanism 715 in a releasing action. As the clamp actuator 726 operates to effect a release of the clamp mechanism 715 to free the cross slide 98a for movement on the compound slide 101a, the fluid exhaust in the chamber 1249 of the actuator will be returned to the reservoir 1215 via the line 1250, the by-pass line 1251 and the check valve 1252 which is connected to the line 1253 leading into the line 1254 that communicates with the line 1255. The exhaust fluid in line 1255 will enter the port 1256 of the valve and by means of the passage 1258 in the plunger 1241 of the valve will flow through the valve and out through the port 1257 into the line 1259 to return to the reservoir 1215. When the actuator 726 has operated to effect a release of the cross slide 98a the fluid pressure in the line 1246 will sequence through the sequence valve 1260 and flow into the line 1261 communicating with the chamber 1262 of the cross slide actuator 732. At this time, the fluid pressure supplied to the chamber 1262 of the actuator 732 will effect its operation in a direction to retract the cross slide 98a in a rightwardly direction, as viewed in FIG. 20, to retract the tools 711 and 712 out of engagement with the car wheel. The exhaust fluid in the chamber 1263 of the actuator 732, at this time, will be exhausted into line 1255 to enter the valve 1240 via the port 1256 and by means of the passage 1258 in the plunger 1241 will flow through the valve and out to the port 1257 into the line 1259 to return to the reservoir 1215.

When the fluid actuator 726 has been actuated in a direction to effect a release of the clamping mechanism 715 a dog 1296 on the rod 728 of the actuator will actuate the limit switch 1285 in the opposite direction. The cross slide 98a when returned to its initial position, will by means of a dog 1298 carried on a bracket 1299 that is formed on the side of the cross slide 98a, actuate a limit switch 1301. The limit switch 1285 when actuated by the dog 1296, and the limit switch 1301 when actuated, through the return of the cross slide 98a to its initial position, will operate to effect de-energization of the solenoid 1239 of the valve 1240 to permit the plunger 1241 therein to be spring returned to its central unloading position.

The limit switch 1266, when actuated, will also operate to effect de-energization of the solenoid 1239 of the valve 1240 to permit the plunger 1241 therein to be spring returned to its central neutral position, as shown in FIG. 26a. When the plunger 1241 of the valve 1240 is in its central neutral position it will function to connect the pressure inlet port 1242 of the valve to the port 1243 by means of a passage 1268 provided therein. The port 1256 of the valve 1240 is connected to the exhaust port 1257 thereof by means of another passage 1269 that is provided in the plunger 1241, as illustrated in FIG. 26a. As shown in FIG. 26a, the passages 1268 and 1269 are interconnected by means of a cross passage 1270 which serves the purpose of unloading the pumps 1219 and 1220 so that the pressure supplied by the continuously operating pumps to the line 1222 will circulate through the line 1245 to the port 1242 and enter the valve through the port 1242 and by means of the passages 1268, 1270 and 1269 will flow through the valve and out through port 1257 thereof into the return line 1259 connected to the reservoir 1215.

The limit switch 822 when actuated by the return of the compound slide 110a of the tool unit 107a, as previously described, will also operate to effect de-energization of the solenoid 1197 of the valve 1180 to permit the plunger 1181 therein to be spring returned to its central neutral blocking position that it occupies as shown in FIG. 26b. The limit switches 1295, 1301 and 822, when actuated, operate in conjunction with each other to de-energize the solenoid 1071 of the valve 1072, shown in FIG. 26, as well as to effect energization of a solenoid 1309 of the valve 1072 to move the plunger 1073 of the valve leftwardly to connect the inlet port 1074 of the valve with the port 1084 by means of a passage 1310 and will also connect the port 1085 with the port 1075 by means of another passage 1311 provided in the plunger 1073. With the valve 1072 conditioned as described above, fluid pressure from the line 1077 to the inlet port 1074 of the valve will flow through the valve via the passage 1310 and out through the passage 1084 into the line 1083 connected therewith. From the line 1083 the fluid pressure will flow through the connecting line 1092 into the chamber 1091 of the clutch actuator 677 to effect its operation in a direction to disengage the clutch 645 to interrupt the drive from the motor 640 to the drum 553. At this time the fluid in the chamber 1090 of the actuator 670 will be exhausted therefrom via the line 1089 and will flow through a check valve 1312 and by means of a connected line 1313 flow into the line 1078. In this manner the sequence valve 1088 is by-passed and the fluid exhaust from the chamber 1090 is returned to the reservoir by means of the line 1078 connected to the port 1075 of the valve and by means of the passage 1311 provided in the plunger 1073 will flow through the valve and out via the port 1085 of the valve into the line 1087 connecting into the return line 945 which leads to the reservoir 900.

As fluid pressure builds up in the chamber 1091 of the clutch actuator 677 the fluid pressure in the line 1083 will sequence through a sequence valve 1314 and flow into the line 1081 leading to the chamber 1080 of the brake actuator 689. The fluid pressure in the chamber 1080 of the actuator 689 will operate the fluid actuator in a direction to engage the brake mechanism 683 with the drum 553 to stop its rotation. At this time the fluid exhaust in the chamber 1079 will be exhausted therefrom via the line 1078, the port 1075, the passage 1311, the port 1085 and the line 1087 and the return line 945.

As the clutch actuator 677 operates to disengage the clutch mechanism 645, a dog 1315, shown in FIGS 18 and 26, actuates a limit switch 1316. Also, as the fluid actuator 689 is operated to engage the brake mechanism 683 with the drum 553, a dog 1317 mounted on the rod 1093 will actuate a limit switch 1318, shown in FIGS. 19 and 26. When the rotation of the spindle 561 is stopped by operation of the brake mechanism 683 a zero speed switch 1325, shown in FIGS. 17, 18 and 19, will operate to effect de-energization of the solenoid 1309 of the valve 1072. The zero speed switch 1325, and the limit switches 822, 1316 and 1318, when actuated, operate together to effect energization of a solenoid 1326 of the valve 1055.

The zero speed switch 1325, which may be of any suitable type, and as shown in FIGS. 17, 18 and 19, is mounted on a bracket 1327 that is secured to the frame of the fixture head 95a. The zero speed switch 1325 includes a rotatable shaft 1328 coupled to a shaft extension 1329 of the drum transmission shaft 649, shown in FIGS. 17 and 18, by means of a coupling 1330 so as to effect its operation. The zero speed switch 1325 operates when the shaft 1328 thereof is rotated to interrupt an electrical circuit in which the zero speed switch 1325 is connected. Conversely, as the speed of shaft 1328 slows down below a certain predetermined minimum r.p.m., the contacts (not shown) within the switch 1325 will close to complete the circuit in which the switch 1325 is connected. Thus, as the clutch mechanism 645 is disengaged and the brake mechanism 683 is engaged to stop the rotation of the drum 553 the zero speed switch 1325 will operate to close contacts (not shown) therein and together with the switches 822, 1316 and 1318 operates to effect energization of the solenoid 1326 of the valve 1055.

The solenoid 1326 of the valve 1055, when energized, will operate to position the plunger 1056 of the valve leftwardly, as shown in FIG. 26, thereby connecting the inner port 1057 of the valve to the port 1066 by means of a passage 1331 provided in the plunger 1056. In addition, the ports 1068 and 1058 of the valve are connected together by means of a passage 1337 also provided in the plunger 1056. Therefore, with the drum 553 stopped fluid pressure from the pressurized line 912 to the port 1057 of the valve 1055 will flow through the valve via the passage 1031 and out of the valve through the port 1066 into the line 1065 connected to the chamber 1064 of the wedge lock actuator 627. Fluid pressure supplied to the chamber 1064 of the actuator 627 will effect its operation in the direction to withdraw the rack 608 from engagement with the ring 574 to release the chucking spindle 561 for axial movement. As the actuator 627 operates to withdraw the rack 608 fluid pressure will build up in the line 1065 and actuate a pressure switch 1335 connected into the line 1065 which operates to effect energization of the solenoid 980 of the valve 981 to thereby supply fluid pressure to the chamber 988 of the chucking spindle actuator 589 to effect advancement of the chucking spindle 561 to return the car wheel to the transfer line. When the chucking spindle 561 has been advanced its full limit the dog 703 on the spindle, shown in FIG. 17, will actuate the limit switch 704, previously described, which upon being actuated operates in conjunction with the actuation of the pressure switch 1335 to effect energization of a solenoid 1336 of the valve 1032 to position the plunger 1033 therein rightwardly to connect the inlet port 1034 with the port 1042 via a passage 1332 provided in the plunger 1033. Also, the port 1044 and the port 1035 of the valve will be connected together by means of a passage 1338 provided in the plunger 1033. Thereupon, fluid pressure in the line 912 will flow to the port 1034 of the valve 1032 via the line 1037 and will flow through the valve via the passage 1332 and out through the port 1042 into the line 1041. The fluid pressure flowing in the line 1041 will enter the chamber 1040 of the guide rail actuator 699 to effect its operation in a direcion to close the guide rail sections 61a and 63a for maintaining the car wheels in the upright position in the transfer line. When the guide rail sections 61a and 63a are closed or returned to their normal position, the limit switch 706 will be released and a limit switch 1339 will be actuated by the lower guide rail section 63a which operates to effect energization of a solenoid 1342 of the valve 1011 to position the plunger 1012 therein into a rightward position to connect the inlet port 1013 of the valve to the port 1027 thereof by means of a passage 1343, and to connect the ports 1029 and 1014 together by means of another passage 1344 provided in the plunger 1012.

Thereupon, fluid pressure in the supply line 912 will flow through the line 1016, the check valve 1017, the line 1018 to the port 1013 of the valve and flow through the valve by means of the passage 1343 and out through the port 1027 into the line 1026 leading to the chamber 1025 of the jaw actuator 590. The fluid pressure supplied to the chamber 1025 at this time will effect the operation of the actuator 590 in the direction to effect a release of the clamp jaws 571 of the chucking spindle 561. At this time fluid pressure in the chamber 1020 of the actuator 590 will return to the reservoir via the line 1019, the port 1014, the passage 1344, the port 1029 and the line 1030 connected to the return line 944.

The limit switch 1339, when actuated by return of the fence rail section 63a to its normal position, will also operate to effect de-energization of the solenoid 980 of the valve 981 and also effect energization of the solenoid 1046 thereof to position the plunger 982 of the valve rightwardly so as to effect retraction of the spindle 561 as previously described. As the spindle 561 returns, the dog 703 will actuate the limit switch 708 to effect de-energization of the solenoid 1046. With the replacement of the car wheel into the transfer line and return of the chucking spindle 561 to its normal retracted position a complete cycle of operation of the machine unit of station 43 has been completed and the car wheel in the station 43 is now ready to be advanced to station 45 in the next cycle of operation.

The move out station 39 is powered by the pump 904 supplied with fluid from the oil reservoir 900, as shown in FIG. 26, although operation of the move out stations may be separately powered by a separate pump receiving the fluid pressure from a separate supply source, if so desired. To operate the move out station 39 the actuating lever 446 of the valve 447 is manually moved rightwardly from its upright posiiton that it occupies, as shown in FIG. 8, to a position as diagrammatically shown in FIG. 26. The lever 446 is connected to the actuating rod 1350 of a plunger 1351 movably contained within the valve 447 and when moved to a rightward position, operates to shift the plunger 1351 of the valve leftwardly therein so that it will occupy the position, shown in FIG. 26. When the valve plunger 1351 is in the position shown in FIG. 26 it operates to connect an inlet port 1352 to a port 1353 provided in the valve 447 by means of a passage 1354 provided in the plunger 1351. An exhaust port 1355 is connected to a port 1356 by means of a passage 1357 also provided in the plunger 1351. With the valve 447 conditioned as described, fluid pressure from the pump 904 supplied to the line 917 will enter the port 1352 of the valve and flow therethrough by means of the passage 1354 and out through the port 1353 into a line 1358 connected to a chamber 1361 in the fluid actuator 425 associated with the carriage 386 of the move out station 39. Fluid pressure supplied to the chamber 1361 of the actuator 425 will effect its operation in a direction to move the carriage 386 rearwardly on the base 385 to retract the car wheel from the transfer line. As the actuator 425 is operated to retract the carriage 386, fluid in a chamber 1362 on the head side of the piston therein will be exhausted from the chamber via a line 1363 and will flow through the line to enter a port 1364 of the deceleration valve 448.

The deceleration valve 448 is provided to effect a reduction in the rate of retraction of the carriage as it nears its limit of travel. To effect a metering of the exhaust fluid through the deceleration valve 448, the cam 449 that is secured to the side of the carriage 386, as shown in FIG. 8 and diagrammatically shown in FIG. 26 as being mounted on the rod 431 of the fluid actuator, will move into engagement with the extending end of the plunger 450. The actuating rod 450 is secured to a plunger 1365 and extends outwardly of the valve 448. The plunger 1365 is movably disposed within the valve 448 and is provided with a passage 1366 that operates, when the plunger 1365 is in its normal biased position, to connect a port 1367 with the inlet port 1364 of the valve. As the carriage 386 moves rearwardly a sloping surface 1368 on the cam 449 will ride over the extending end of the plunger actuating rod 450 to force the plunger 1365 inwardly to gradually displace the passage 1366 and thereby restrict the passage between the ports 1364 and 1367. When the fluid actuator 425 has operated through the limit of its stroke to move the carriage 386 rearwardly, the plunger 1365 will have been moved inwardly within the valve 448 to effect the operation of the actuator 425 so that it will operate to move the carriage at a relatively slow rate.

The exhaust fluid entering the port 1364 of the deceleration valve 448 will flow through the valve via the passage 1366 and out of the valve through the port 1367 into a line 1369 that is connected to the port 1356 of the manually actuated valve 447. The fluid exhaust to the port 1356 of the valve 447 will flow through the valve via the passage 1357 in the plunger 1351 and out through the port 1355 into a connected line 1374 which leads to the fluid reservoir 900. When the carriage 386 is retracted, the table 433 thereon will be rotated 90° by the action of the cam follower 439 engaged in the cam track 438 of the cam 434 as previously described. To return the carriage 386 back into the line, the manual lever 446 will be moved to the vertical position, as shown in FIG. 8, and it will effect movement of the plunger 351 of the valve 447 to a rightward position to connect the inlet 1352 of the valve with the port 1356 by means of a passage 1375 provided in the plunger 1351. Rightward positioning of the plunger 1351 will also operate to connect the ports 1353 and 1355 together by means of another passage 1376 provided in the plunger 1351. With the valve 447 conditioned as described, fluid pressure in the line 917 to the port 1352 will flow through the valve via the passage 1375 and out through the port 1356 into the line 1369 connected to the port 1367 of the deceleration valve 448. Since the deceleration valve 448 is partially closed by the action of a cam 449, the flow of fluid through the valve entering via the port 1367 and passing therethrough via the passage 1366 and out through the port 1364 will be restricted so that the flow of fluid pressure into line 1363 and thereby into the chamber 1362 of the actuator 425 will start the actuator operating at a relatively slow rate to move the carriage 386 at a relatively slow rate. As the carriage 386 is moved forward toward the line, the rate at which it will be moved will gradually pick-up since the cam 449 will be gradually withdrawn from engagement with the plunger actuating rod 450 allowing the plunger under spring pressure to gradually return to its normal open or fully aligned condition. The actuator 425 will continue to operate in a direction to move the carriage 386 back into the transfer line until it reaches its limit of its forward stroke and the carriage 386 engages against the positive stop 404, shown in FIG. 9. When the carriage 386 has been moved back into the transfer line, the deceleration valve 448 will again be wide open by virtue of the fact that the plunger 1365 therein will be biased leftwardly, as viewed in FIG. 26, to establish full communication between the ports 1364 and 1367 of the valve via the passage 1366 of the plunger.

As shown in FIG. 26, the hydraulic circuit for the move out station is typical of that provided for all of the move out stations and the description of the move out station 39 will apply to all of the illustrated move out stations.

The various operating mechanism associated with the storage station 20 and the loading station 21 are the result of hydraulic pressure being applied to the various hydraulic cylinders which actuate the movements of the several mechanisms. The limit switches employed to effect sequential operation of the several solenoid operated valves employed in the hydraulic circuit associated with these stations are diagrammatically shown in FIG. 27. FIGS. 29 and 29a illustrate a wiring diagram showing the interconnection of the electrical elements associated with the mechanisms of stations 20 to 24, inclusive. The oil pressure in the hydraulic circuit associated with these two stations is maintained by means of a pump 1380 which is constantly driven by an electric motor 1381.

As shown in FIG. 27, the hydraulic system for actuating the various actuators associated with the storage and loading units of stations 20 and 21 is illustrated as an integrated unit since they are employed together. In proceeding with the descriptive operation of the stations 20 and 21 it will be assumed that initial conditions have been obtained such that the loading mechanism 171 of station 20 is retracted and the carriage 172 with car wheels is in a retracted or initial position. Also, that the gate mechanism 221 of the loading station 21 is closed, a transfer bar 1382 of the transfer mechanism 50 is returned to its starting position, the arms of the transfer bar 1382 are in an advanced position in engagement with car wheels at stations 21, 22, 23, 24 and 25, the boring unit of station 23 is fully retracted and the car wheel at station 23 is unclamped.

When these conditions have been obtained, a solenoid 1384 of a hydraulic direction valve 1385 is energized to effect a leftwardly positioning of a plunger 1386 in the valve into the position shown in FIG. 27 to connect a pressure inlet port 1387 with a port 1388 provided in the valve by means of a passage 1389 provided in the plunger 1386. With the plunger 1386 of the valve positioned leftwardly within the valve 1385, a port 1391 and a port 1392 are connected together by means of another passage 1393 provided in the plunger 1386.

Thereupon, oil is drawn from an oil reservoir 1394 through an intake line 1395 into the pump 1380 where the fluid is pumped into the circuit under pressure. The fluid flows from the pump 1380 into a line 1396 from whence it will flow into a connected supply line 1397 communicating with the inlet port 1387 of the valve 1385. From the inlet port 1387 of the valve 1385 fluid under pressure will flow through the valve via the passage 1389 in the plunger 1386 and out through the port 1388 into an oil line 1398 and thence into a chamber 1399 of the gate actuator 221. Fluid pressure supplied to the chamber 1399 of the gate actuator 221 will effect its operation in a direction to move the gate 220 to an open position to permit the car wheel, shown in FIG. 7, in the chute 207 of the carriage 172 to be moved out of the chute into the transfer line, as previously described. When fluid pressure is supplied to the chamber 1399 of the gate actuator 221 to effect its operation, fluid in a chamber 1401 of the actuator will be exhausted therefrom via a line 1402 connected to the port 1392 of the valve 1385. The fluid exhaust to the port 1392 of the valve will pass through the valve by means of the passage 1393 in the plunger 1386 and flow out of the valve via the port 1391 into a connected line 1403 which is in communication with a return line 1404 leading to the reservoir 1394.

When the gate actuator 221 has operated to open the gate 220 a dog 1405 that is carried on a rod 1406 which is secured to the piston 233 of the actuator 221 will actuate a limit switch 1407 in a clockwise direction, as viewed in FIG. 27.

The limit switch 1407, when actuated by the dog 1405 of the gate actuator 221, will operate to effect de-energization of the solenoid 1384 of the valve 1385 to condition the valve for a subsequent operation. Also, the limit switch 1407 will operate to effect operation of the transfer mechanism 50 to advance the car wheels in stations 21, 22, 23, 24 and 25 one station so that the car wheels will be moved into stations 22, 23, 24, 25 and 26.

When the transfer mechanism 50, shown in FIGS. 1 and 2, has completed its transfer movement, a dog 1410, illustrated in FIG. 1, carried on the transfer bar 1382 of the transfer mechanism 50, will actuate a limit switch 1411 which, when actuated, will operate to condition the hydraulic circuit associated with the transfer mechanism 50 for operation to retract the transfer bar 1382 of the transfer mechanism. The actuated limit switch 1411 will also initiate the operation of the fixture head 70 of station 23 to effect the clamping of the car wheel in the station 23 to the fixture head 70 of the boring unit at the station. When the car wheel in station 23 is clamped to the fixture head 70 a plurality of limit switches 1412, 1413 and 1417, shown in FIG. 1, and associated with the various workpiece locators and jaws of the fixture head 70 will be actuated to effect a return or retraction of the arms associated with the transfer bar 1382 of the transfer mechanism 50 out of engagement with the car wheels in stations 22, 23, 24, 25 and 26. Also, the limit switches 1412, 1413 and 1417, when actuated, will effect operation of the boring head 73, shown in FIG. 1, to effect its advancement in a boring operation to bore the hub of the car wheel.

The limit switches 1412, 1413 and 1417, will also operate to energize a solenoid 1420 of the valve 1385 to move the plunger 1386 within the valve rightwardly to connect the inlet port 1387 of the valve with the port 1392 thereof by means of a passage 1421 provided in the plunger 1386, and to connect the ports 1388 and 1391 thereof together by means of a passage 1422 provided in the plunger 1386. With the valve 1385 conditioned as described fluid pressure supplied to the inlet port 1387 of the valve will flow through the valve via the passage 1421 and out through the port 1392 into the line 1402 and into the chamber 1401 of the gate actuator 221. The fluid pressure supplied to the chamber 1401 of the gate actuator 221 will effect its operation in a direction to close the gate 220 for preventing a car wheel from rolling out of the carriage into the transfer line. As the gate actuator 221 operates to close the gate 220, a dog 1423 on the rod 1406 will actuate the limit switch 1407 in the opposite or counterclockwise direction, as viewed in FIG. 27. The limit switch 1407, when actuated by the dog 1423, will operate to effect de-energization of the solenoid 1420 of the valve 1385. The limit switch 1407 will also operate to effect energization of a solenoid 1424 of a valve 1425 to move a spring centered plunger 1426 in the valve rightwardly to connect an inlet port 1427 of the valve with a port 1428 by means of a passage 1429 provided in the plunger 1426. The plunger 1426, when in a rightward position within the valve 1425, will also operate to connect a port 1430 with a port 1431 of the valve by means of a passage 1432 provided in the plunger.

With the valve 1425 conditioned as described, fluid pressure from the supply line 1396 will flow into a line 1433 which is connected to the inlet port 1427 of the valve 1425. Fluid pressure supplied to the inlet port 1427 will flow through the valve via the passage 1427 and out through the port 1428 and into a connected line 1434 which communicates with a chamber 1435 of the carriage actuator 238. The fluid pressure supplied to the chamber 1435 of the actuator 238 will operate the actuator to effect advancement of the carriage 172 to move the chute 207, as shown in FIG. 7, out of alignment with the transfer line and move the chute 208 of the carriage 172 into alignment with the transfer line. As the actuator 238 operates to advance the carriage, the fluid in a chamber 1436 will be exhausted therefrom into a connected line 1437 which is connected to the port 1431 of the valve 1425. The flow of fluid exhaust from the chamber 1436 will enter the port 1431 of the valve and flow therethrough by means of the passage 1432 and out through the port 1430 into a return line 1438 which communicates with the line 1404 leading to the reservoir 1394.

When the carriage actuator 238 has operated to advance the carriage 172 so as to align the chute 208 with the transfer line the dog 250, shown in FIG. 7 and diagrammatically in FIG. 27, will actuate the limit switch 251 to stop carriage advancement. The limit switch 251, when actuated, will operate to de-energize the solenoid 1424 of the valve 1425 to permit the plunger 1426 thereof to be spring returned to its central neutral blocking position, shown in FIG. 27. When the boring head 73, shown in FIG. 1, has advanced to complete the boring operation on the car wheel at station 23 a dog 1446 will actuate a limit switch 1447 which operates to effect retraction of the boring head 73 to withdraw the boring tool 72 out of workpiece engagement. When the boring head 73 is fully retracted a dog 1448, diagrammatically shown in FIG. 1, as being mounted to the side of the boring head 73, will actuate a limit switch 1449 which in conjunction with the limit switch 1411, previously mentioned, will effect operation of the transfer mechanism 50 in a direction to retract the transfer bar 1382 associated with it. The limit switch 1449 will also operate to effect a release of the car wheel from clamping engagement with the fixture head 70.

When the transfer mechanism 50 has operated to fully return the transfer bar 1382 thereof to its initial position a dog 1451 carried by the transfer bar 1382 of the transfer mechanism 50, as shown in FIG. 1, will actuate a limit switch 1452 to stop the operation of the transfer mechanism 50 and also to effect rotation of the transfer bar 1382 and its associated arms to engage the rollers associated with the arms into car wheel engagement at stations 21, 22, 23, 24 and 25. When the rollers on the arms of the transfer mechanism 50 have been advanced into workpiece engagement, a dog 1453, shown diagrammatically in FIG. 2, carried on the transfer bar 1382 of the transfer mechanism will actuate a limit switch 1454 which operates to condition the transfer bar rotating mechanism for an operation in the opposite direction. With the transfer arms associated with the transfer bar 1382 of the transfer mechanism 50 in workpiece engagement the initial condition previously set forth have again been obtained and the solenoid 1384 of the valve 1385 will be energized to start another cycle of operation. The cycle of operation set forth above will be repeated until the carriage 172 has been fully advanced in increments to align the chute 211 of the carriage 172 with the transfer line. When this position of the carriage has been obtained, the dog 256, as shown in FIGS. 7 and 27, will actuate the limit switch 257. The limit switch 257, when actuated, will operate to effect de-energization of the solenoid 1424 associated with the valve 1425 to permit the spring centered plunger 1426 thereof to be spring returned to its central neutral position to thereby condition the valve so that it may be operated to effect operation of the carriage actuator 238 in a direction to retract the carriage 172. Thus, with the limit switch 257 actuated and the gate 220 closed, thereby actuating the limit switch 1407 by means of a dog 1423, the two limit switches will cooperate to effect de-energization of the solenoid 1420 of the valve 1385 and also to effect energization of a solenoid 1458 of the valve 1425. The solenoid 1458, when energized, will operate to effect a positioning of the plunger 1426 of the valve leftwardly to connect the inlet port 1427 with the port 1431 by means of a passage 1459 provided in the plunger, and will also connect the ports 1428 and 1430 together by means of another passage 1460 provided in the plunger 1426.

With the plunger 1426 of the valve 1425 in a leftward position, fluid pressure flows from the supply line 1396 to the inlet port 1427 of the valve via the line 1433 and will flow through the valve via the passage 1459 and out through the port 1431 into the line 1437 communicating with the chamber 1436 of the carriage actuator 238. The fluid pressure supplied to the chamber 1436 of the carriage actuator 238 will effect the operation of the actuator to retract the carriage 172. When the carriage 172 is fully retracted the dog 258, shown in FIGS. 7 and 27, will actuate the limit switch 259. The limit switch 259, when actuated, will operate to effect de-energization of the solenoid 1458 of the valve 1425 allowing the plunger 1426 therein to be spring returned to its central neutral position, shown in FIG. 27. The limit switch 259 will also operate to effect energization of a solenoid 1464 of a valve 1465 to move a spring centered plunger 1466 therein leftwardly to connect an inlet port 1467 thereof to a port 1468 by means of a passage 1469 provided in the plunger 1466. The plunger 1466 of the valve 1465, when in a leftward position, will also operate to connect a port 1470 with a port 1471 by means of another passage 1472 provided therein.

Thereupon, fluid pressure from the supply line 1396 will flow through a line 1473 to enter the port 1467 of the valve 1465 and will flow through the valve via the passage 1469 and out through the port 1468. From the port 1468 of the valve 1465 the fluid pressure will flow into a connected line 1474 which is in communication with a chamber 1475 of the fluid actuator 177 associated with the arm 173 of the starter mechanism 171 of the storage station 20 by means of a line 1476. Fluid pressure from the line 1474 will also be supplied to a chamber 1477 of the fluid actuator 177a of the arm 174 of the starter mechanism 171 by means of a connecting line 1478. The fluid pressure supplied to the chambers 1475 and 1477 of the actuators 177 and 177a, respectively, will effect operation of the actuators to move the starter mechanism 171 in a direction to roll the car wheel in the storage station 20 out of the storage station and into the aligned chutes of the loading carriage 172.

When the loading mechanism 171 has been fully advanced the limit switch 266, shown in FIG. 6 and diagrammatically in FIG. 27, will be actuated by the dog 268 carried on the arm 173. The limit switch 266, when actuated, will operate to effect de-energization of the solenoid 1464 of the valve 1465, and will also operate to energize a solenoid 1485 of the valve 1465 to position the plunger 1466 therein rightwardly to connect the inlet port 1467 with the port 1471 by means of a passage 1486 provided in the plunger 1466 and to connect the port 1470 and the port 1468 together by means of another passage 1487 provided in the plunger 1466.

With the valve 1465 thus conditioned, fluid pressure supplied to the inlet port 1467 of the valve 1465 from the supply line 1396 via the line 1473 will flow through the valve by means of the passage 1486 and flow out through the port 1471 into a connected line 1488 which is in communication with a chamber 1489 of the actuator 177a. A branch line 1490 which is connected to the line 1488 and in turn communicates with a chamber 1491 of the actuator 177 will supply the fluid pressure from the line 1488 to the chamber 1491 of the actuator 177. The fluid pressure supplied to the chambers 1489 and 1491 of the actuators 177a and 177, respectively, will effect their operation in a direction to retract the started mechanism 171 to its initial position. When the starter mechanism 171 has been fully retracted, the dog 269 will actuate the limit switch 267, as shown in FIG. 6 and diagrammatically in FIG. 27. The limit switch 267, when actuated, will operate to effect de-energization of the solenoid 1485 of the valve 1465 to thereby permit the plunger 1466 to be spring returned to its central neutral blocking position, as shown in FIG. 27, to block the flow of fluid pressure to the actuators 177 and 177a.

At this time, the initial condition for operation of the stations 20 and 21 has been again obtained and another cycle of operation will be initiated through the energization of the solenoid 1384 of the valve 1385.

The mechanism of the unloading station 48 is timed to operate in sequence with the operation of the transfer mechanism 55, the various fluid actuators of the transfer mechanism 55, the unloading station 48, as well as the inspection station 46, are supplied with hydraulic pressure from a common fluid pressure source, as shown in FIG. 28. In describing the operation of the unloading station 48, it will be assumed that the initial conditions have been obtained such that there are car wheels in stations 45, 46 and 47, and that the carriage 275 of the unloading station 48 is in the position shown in FIGS. 1b and 11, wherein the chute 298 of the carriage 275 is in alignment with the guiding and supporting rail 65. It will also be assumed that a transfer bar 1505 of the transfer mechanism 55 is fully retracted and that the arms of the transfer mechanism are in a retracted position with their associated rollers out of car wheel engagement.

With the initial conditions as set forth above obtained, a solenoid 1509 of a hydraulic valve 1510 will be energized to move a plunger 1511 therein rightwardly to connect a pressure inlet port 1512 with a port 1513 provided in the valve 1510 by means of a cross passage 1514 provided in the plunger 1511. With the plunger 1511 in a rightward position within the valve 1510 a port 1515 will also be connected to a port 1516 by means of another cross passage 1517 also provided in the plunger 1511.

With the valve 1510 thus conditioned, oil is drawn from an oil reservoir 1518 through an intake pipe 1519 and by means of a pair of branched lines 1520 and 1521 into pumps 1522 and 1523, respectively, which are constantly driven by a motor 1524 connected thereto. The fluid from the pump 1523 will flow into a line 1525 from whence it will flow into a supply line 1526 which is connected to the inlet port 1512 of the valve 1510. The fluid pressure to the inlet port 1512 of the valve 1510 will flow through the valve via the passage 1514 and out through the port 1513 of the valve into a connected line 1527 to enter a chamber 1528 of the fluid actuator 1529 that is provided to rotate the transfer bar 1505 of the transfer mechanism 55 to pivot the arms thereof into and out of engagement with the car wheels in the transfer line. The fluid actuator 1529 is similar in construction and in operation to the actuator 132 associated with the transfer mechanism 54, previously described in detail. The fluid pressure supplied to the chamber 1528 of the actuator 1529 will effect its operation in a direction to pivot the arms of the transfer mechanism 55 to move their associated rollers into car wheel engagement. At this time fluid in a chamber 1530 of the actuator 1529 will be forced out of the chamber and into a line 1531 that is connected to the port 1516 of the valve 1510 and will flow through the valve via the passage 1517 and out through the port 1515 of the valve into a return line 1532 which is connected to the port 1515 of the valve 1510 and is in communication with the reservoir 1518. As the fluid actuator 1529 operates to move the rollers on the arms of the transfer mechanism 55 into car wheel engagement, a dog 1533, shown diagrammatically in FIG. 28, will actuate a limit switch 1534. The limit switch 1534, upon being actuated, will operate to effect energization of a solenoid 1535 of a solenoid actuated valve 1536 to move a spring centered plunger 1537 rightwardly in the valve to connect a pressure inlet port 1538 provided in the valve with a port 1539 thereof by means of a cross passage 1540 provided in the plunger 1537 and also to connect a port 1541 with a port 1542 provided in the valve by means of another cross passage 1543.

With the valve 1536 thus conditioned, oil in the fluid supply line 1526 will flow through a branch line 1544 that is connected to the port 1538 and the fluid pressure will flow through the valve via the passage 1540 and out through the port 1539 of the valve into a line 1545 connected to a chamber 1546 of the transfer mechanism actuator, as shown in FIG. 28. Fluid pressure in the chamber 1546 of the actuator will effect its operation in a direction to advance the transfer mechanism 55 and thereby advance the car wheels one station, or from stations 45, 46 and 47 into stations 46, 47 and into the chute 298 of the carriage 275 of the unloading station 48. As the fluid actuator of the transfer mechanism 55 is operating to advance the transfer mechanism, fluid in a chamber 1547 of the actuator will be exhausted therefrom into a line 1548 which communicates with a port 1549 of a deceleration valve 1550 and will flow through the deceleration valve 1550 via a passage 1551 provided in a plunger 1552 movably supported within the valve 1550. The exhaust flowing through the valve 1550 will flow out of the valve via a port 1553. The plunger 1552 of the valve 1550 is normally maintained in its upward position, as shown in FIG. 28, by means of a spring 1554 contained within the valve so as to maintain the passage 1551 in alignment with the ports 1549 and 1553 to establish communication through the valve. The fluid pressure flowing through valve 1550 will enter a connecting line 1555 that is connected to the port 1542 of the valve 1536 and will flow through the valve by means of a passage 1543 in the plunger 1537 and out through the port 1541 into a line 1558 which is connected thereto and which is in communication with the return line 1532.

As the transfer bar 1505 of the transfer mechanism 55 approaches the limit of its stroke, a cam 1556, shown in FIG. 2b and diagrammatically in FIG. 28, will engage the extending end of a plunger actuating rod 1557 that is connected to the plunger 1552 of the valve 1550 and will force the plunger 1552 inwardly to displace the passage 1551 and thereby gradually restrict the communication between the ports 1549 and 1553 to effect a decrease in the rate of advancement of the transfer mechanism. When the transfer mechanism 55 has been fully advanced, a dog 1573, shown in FIG. 2b as being carried on the transfer bar 1505 of the transfer mechanism 55 and in FIG. 28 as being carried by the piston rod of the fluid actuator of the transfer mechanism 55, will actuate a limit switch 1559. The limit switch 1559, upon being actuated, will operate to effect de-energization of the solenoid 1535 of the valve 1536 to permit the plunger 1537 of the valve to be spring returned to its central neutral blocking position, as shown in FIG. 28. The actuated limit switch 1559, also, operates to effect de-energization of the solenoid 1509 and to effect energization of a solenoid 1560 of the valve 1510 to move the plunger 1511 therein to a leftward position within the valve, as shown in FIG. 28, and thereby connect the inlet port 1512 with the port 1516 by means of a passage 1561 provided in the plunger and also to connect the ports 1513 and 1515 together by means of another passage 1562 provided in the plunger. With the valve 1510 conditioned as described fluid pressure supplied to the inlet port 1512 of the valve 1510 through the line 1526 will flow through the valve via the passage 1561 and out through the port 1516 and into the line 1531 that communicates with the chamber 1530 of the arm actuator 1529 to operate the actuator in a direction to retract the arms of the transfer mechanism and their associated rollers out of car wheel engagement. At this time the fluid in the chamber 1528 of the actuator 1529 will exhaust therefrom into the line 1527 and will flow through the valve 1510 via the port 1513, the connecting passage 1562 and out through the port 1515 and into the return line 1532 communicating with the reservoir 1518. When the arms of the transfer mechanism 55 are fully retracted, a dog 1563, shown diagrammatically in FIG. 28, will actuate a limit switch 1564 which operates to effect energization of a solenoid 1565 of the valve 1536 to move the plunger 1537 therein leftwardly to thereby connect the inlet port 1538 of the valve to the port 1542 thereof by means of a passage 1566, and also to connect the ports 1539 and 1541 together by means of another passage 1567.

Fluid pressure supplied to the inlet port 1538 of the valve 1536 will then flow through the valve via the passage 1566 and out through the port 1542 into the line 1955 and by means of a by-pass circuit, comprising a line 1568, a check valve 1569 and a line 1570, will flow into the line 1548 from whence it will enter into the chamber 1547 of the transfer mechanism actuator. The by-pass circuit comprising the line 1568, the check valve 1569 and the line 1570 operates to by-pass the deceleration valve which is now held closed by reason of the full advancement of the transfer bar 1505 of the transfer mechanism 55 wherein the cam 1556 has fully depressed the actuating rod 1557 to move the plunger 1552 of the valve 1550 to its lowermost position interrupting the communication between the ports 1549 and 1553 of the valve. The fluid pressure supplied to the chamber 1547 of the transfer mechanism 55 will effect operation of the actuator to retract the transfer mechanism. As the actuator is operating to retract the transfer bar 1505 of the transfer mechanism 55, fluid in the chamber 1546 of the actuator will exhaust therefrom via the line 1545 and flow through the valve 1536 via the port 1539, the passage 1567, the port 1541, and into the line 1558 which communicates with the return line 1532. When the transfer bar 1505 of the transfer mechanism 55 has been fully retracted another dog 1571, shown in FIG. 2b as being mounted on the transfer bar of the transfer mechanism 55 and schematically shown in FIG. 28 as being attached to the piston rod of the fluid actuator of the transfer mechanism 55, will actuatate a limit switch 1572. The limit switch 1572, upon being actuated, operates to effect de-energization of the solenoid 1560 of the valve 1510 to condition it for a subsequent operation and, also, operates to effect de-energization of the solenoid 1565 of the valve 1536 to permit the plunger 1537 therein to be spring returned to its central neutral blocking position.

The limit switch 1572, which is actuated by the retraction of the transfer bar 1505 of the transfer mechanism 55, operates to effect energization of a solenoid 1587 of a hydraulic valve 1588 to move a spring centered plunger 1589 in the valve rightwardly from a central neutral position to connect an inlet port 1590 with a port 1591 thereof by means of a passage 1592 provided in the plunger 1589 and to connect a port 1593 with a port 1594 by means of another passage 1595 provided in the plunger. With the valve 1588 conditioned as described, fluid pressure from the supply line 1526 will be supplied to the inlet port 1590 of the valve via a connecting line 1596. Fluid pressure supplied to the inlet port 1590 of the valve 1588 will flow through the valve via the passage 1592 of the plunger 1589 and will flow out of the valve through the port 1591 into a connected line 1597 communicating with a chamber 1598 of the carriage actuator 327. Fluid pressure supplied to the chamber 1598 of the actuator 327 will effect its operation to advance the carriage 275 to move the chute 298 of the carriage out of alignment with the supporting rail 65 of the transfer line and to bring the chute 299 of the carriage into alignment with the guide rail 65. As the fluid actuator 327 is operated to advance the carriage, fluid in a chamber 1599 on the rod side of the piston of the fluid actuator will be exhausted therefrom and will flow into a line 1601 which is in communication with the chamber 1599 and also connected to the port 1594 of the valve 1588. The fluid exhaust flowing through the line 1601 will enter the port 1594 of the valve and will flow through the valve via the passage 1595 provided in the plunger 1589 and flow out of the valve via the port 1593 into a line 1602 connected thereto and which communicates with the return line 1532.

The fluid actuator 327 associated with the carriage 275 will operate to advance the carriage until a dog 336, shown in FIGS. 11 and 28, mounted on the side of the carriage actuates a limit switch 338 which, upon being actuated, operates to effect de-energization of the solenoid 1587 of the valve 1588 to permit the plunger 1589 therein to be spring returned to its central neutral blocking position, as shown in FIG. 28. At this time the chute 298 of the carriage 275 will have been moved out of alignment with the guide rail 65 and the chute 299 of the carriage will be positioned to receive a car wheel therefrom.

In the cycle of operation just described the transfer mechanism 55 has operated to move car wheels out of the stations 45, 46 and 47 and advance them one station thereby leaving the station 45 empty. Thus, in the next cycle of operation the transfer mechanism 54 associated with the station 43 will operate to advance workpieces two stations and the transfer mechanism 55 will operate simultaneously therewith to advance car wheels in stations 46, 47 out of the stations and into station 47 and into the chute 299 of the carriage 275. Thus, the transfer mechanism 54 has two clear stations into which to advance the car wheels, that is the car wheels that are in stations 43 and 44 will be advanced by the transfer mechanism 54 into the stations 45 and 46. This alternating cycle of operation, wherein the transfer mechanism 55 operates first and then in the following cycle both the transfer mechanisms 54 and 55 operate simultaneously until the carriage 275 has been fully advanced whereat the chute 303 of the carriage will be aligned with the guide rail 65 of the transfer line and has received a car wheel therefrom so that all of the chutes 298, 299, 301, 302 and 303 are occupied by car wheels. When the carriage 275 has been fully advanced, a dog 343 mounted on the side of the carriage 275, as shown in FIG. 11 and diagrammatically in FIG. 28, will actuate a limit switch 344. As a car wheel is rolled into the chute 303 of the carriage 275 it actuates a limit switch 1585 which functions in conjunction with the limit switch 344 to effect energization of a solenoid 1609 of a valve 1610 to move a plunger 1611 therein rightwardly to connect an inlet port 1612 with a port 1613 thereof by means of a cross passage 1614 provided in the plunger 1611 and to connect a port 1615 with a port 1616 by means of another cross passage 1617 provided in the plunger. With the valve 1610 conditioned as described, fluid pressure from the supply line 1626 will flow to the port 1612 of the valve 1610 via a connecting line 1618 and will flow through the valve via the passage 1614 and out through the port 1613 of the valve into a line 1619 which is connected to the port 1613 and is in communication with a chamber 1620 of the gate actuator 321. Fluid pressure supplied to the chamber 1620 of the gate actuator 321 will effect its operation in a direction to actuate the gate mechanism 311 to an open condition thereby permitting the car wheels in the chutes 298, 299, 301, 302 and 303 of the carriage 275 to roll therefrom and into the aligned chutes 351, 352, 353, 354 and 355 of the storage station 49. As the gate actuator 321 operates to effect an opening of the gate mechanism 311 fluid in a chamber 1621 on the head side of the piston of the actuator 321 will be forced out of the chamber and into a connecting line 1622 which is connected to the port 1616 of the valve 1610. The fluid exhaust entering the port 1616 of the valve 1610 will flow through the valve by means of a passage 1617 of the plunger 1611 and will flow out of the valve through the port 1615 into a connected line 1623 which communicates with the return line 1532.

When the car wheels have rolled out of the carriage 275 into the respective chutes 351 to 355, inclusive, of the storage station 49, each will actuate respective limit switches 357 to 361, inclusive, as previously described. When all of the limit switches 357 to 361, inclusive, have been actuated, they operate to effect de-energization of the solenoid 1609 of the valve 1610 and also operate to effect energization of the solenoid 1624 of the valve to move the plunger 1611 therein to a leftward position to thereby connect the inlet port 1612 with the port 1616 by means of a passage 1625 provided in the plunger 1611 and to connect ports 1615 and 1613 together by means of a passage 1626 provided in the plunger.

Fluid pressure supplied to the inlet port 1612 of the valve 1610 via the supply line 1526 and the connecting line 1618 will then flow through the valve by means of the passage 1625 and out through the port 1616 into the line 1622 which communicates with the chamber 1621 of the gate actuator 321, and will effect its operation in a direction to operate the gate mechanism 311 to a closed position. As fluid pressure is supplied to the chamber 1621 of the gate actuator 321 the fluid in the chamber 1620 of the actuator will be exhausted therefrom into the line 1619 which is connected to the port 1613 of the valve 1610. Fluid exhaust to the port 1613 of the valve will flow through the valve via the passage 1626 in the plunger 1611 and out through the port 1615 into the connected line 1623 leading to the return line 1532.

As the gate mechanism 311 is operated to a closed condition the dog 362 on the crank arm 326, as shown in FIGS. 11 and 12 and diagrammatically in FIG. 28, will actuate the limit switch 364. The limit switch 364, upon being actuated, will operate to de-energize the solenoid 1624 of the valve 1610 to condition it for another cycle of operation. The limit switch 364, upon being actuated, will also operate to effect energization of the solenoid 1637 of the valve 1588 to move the spring centered plunger 1589 therein leftwardly and thereby connect the inlet port 1590 of the valve to the port 1594 thereof via the cross passage 1638. The leftward movement of the plunger 1589 also operates to connect the port 1593 with the port 1591 via another cross passage 1639 provided in the plunger 1389.

Fluid pressure supplied to the inlet port 1590 from the supply line 1526 via the connecting line 1596 will then flow through the valve via the cross passage 1638 and out through the port 1594 into the connected line 1601 communicating with the chamber 1599 of the carriage actuator 327 to effect retraction of the carriage 275 to its original position wherein the chute 398 of the carriage is in alignment with the guide rail 65 of the transfer line of the machine tool organization. As the carriage 275 is retracted, the fluid in the chamber 1598 of the actuator 327 will be exhausted therefrom into the line 1597 connected to the port 1591 of the valve 1588 and flow through the valve via the cross passage 1639 and out through the port 1593 into the line 1602 connected to the return line 1532.

When the carriage 275 of the unloading station 48 is fully retracted to its initial position the dog 365 carried on the side of the carriage 275 will actuate the limit switch 366 which operates to effect de-energization of the solenoid 1637 of the valve 1588 to permit the plunger 1589 therein to be spring returned to its central neutral blocking position to stop the flow of fluid pressure to the actuator 327. The carriage is now repositioned for another cycle of operation and the car wheels in the storage station 49 may be removed therefrom at a convenient time prior to the succeeding complete advancement of the carriage 275. When the car wheels in the storage rack 286 of the storage station 49 are removed from the storage rack, the limit switches 357 to 361, inclusive, will be released and be conditioned for the next cycle of operation.

The fluid actuators 858 and 867 of the inspection station 46 are conveniently supplied with fluid pressure from the reservoir 1518, as shown in FIG. 28. When it is desired to lower a car wheel at station 46 for inspection purposes the car wheel at the station must be clamped on the rollers 846, and 847, as previously described. To this end, the valve actuating lever 875 is manually actuated from its upright position, as shown in FIG. 25, rightwardly to a position it occupies, as shown in FIG. 28. The lever 875 when it is actuated into the position shown in FIG. 28, operates to position a plunger 1650 within the valve 876 leftwardly, as shown in FIG. 28, to thereby connect an inlet port 1651 of the valve with a port 1652 thereof by means of a cross passage 1653 provided in the plunger 1650 and to connect a port 1654 with a port 1655 by means of another cross passage 1656 provided in the plunger 1650. When the valve 876 is conditioned, as described above, fluid pressure from the pump 1522 will flow into a connected supply line 1657 which communicates with the inlet port 1651 of the valve. Fluid pressure supplied to the inlet port 1651 of the valve 876 will flow through the valve via the cross passage 1653 of the plunger 1650 and flow out of the valve via the port 1652 into a connected line 1658 communicating with a chamber 1659 of the clamp actuator 858. As the actuator 858 operates to effect a clamping of a car wheel to the rollers 846 and 847, fluid in a chamber 1660 on the rod side of the piston of the actuator will be exhausted therefrom into a line 1661 connected to the port 1655 of the valve 876. The fluid exhaust to the port 1655 of the valve will flow through the valve via the cross passage 1656 and out through the port 1654 of the valve into a connecting line 1662 which is connected to the return line 1532. When the fluid actuator 858 is operated to effect a clamping of the car wheel to the frame 836 fluid pressure in the line 1658 and a connected branch line 1663 will flow through a check valve 1664 into a line 1665 which is in communication with an inlet port 1666 of the valve 873. Therefore, if the actuating lever 872 of the valve 873 is in its normal vertical position, as shown in FIG. 25, a plunger 1667 within the valve 873 will be in a rightward position and in this position operates to connect the inlet port 1666 with a port 1668 of the valve by means of a passage 1669 provided in the plunger 1667 and to connect a port 1670 with a port 1671 by means of another passage 1672 provided therein.

Thus, with the valve 873 in its normal condition with the plunger 1667 in a rightward position within the valve 873, fluid pressure to the inlet port 1666 of the valve 873 will flow through the valve via the passage 1669 and out through the port 1668 into a connected line 1673 which is in communication with a chamber 1674 of the fluid actuator 867. The fluid pressure supplied to the chamber 1674 of the actuator 867 will insure that the car frame 836 is in the upright position, as shown in FIG. 25. Thus, with a car wheel clamped to the rollers 846 and 847 the frame 836 may be lowered by actuating the lever 872 of the valve 873 rightwardly to a position, as shown in FIG. 28, to effect a leftward positioning of the plunger 1667 within the valve 873, as shown in FIG. 28, to thereby connect the inlet port 1666 of the valve to the port 1671 by means of a cross passage 1675 and also to connect the port 1670 with the port 1668 by means of another cross passage 1676. With the plunger 1667 in a leftward position, as shown in FIG. 28, fluid pressure to the inlet port 1666 will flow through the valve by means of the cross passage 1675 and flow out of the valve through the port 1671 into a connected line 1677 which communicates with a chamber 1678 on the head side of the piston of the fluid actuator 867. The fluid pressure supplied to the chamber 1678 of the actuator 867 will effect its operation in a direction to lower the frame 836. At this time, the fluid in the chamber 1674 of the actuator 867 will be exhausted therefrom into the line 1673 and will enter the valve 873 via the port 1668 and flow through the valve via the passage 1676 and flow out of the valve via the port 1670 into a line 1679 which is connected to the line 1662 that is in communication with the return line 1532.

With the car wheel clamped to the rollers 846 and 847 and with the frame 836 in the horizontal position, as indicated by the broken lines in FIG. 25, the car wheel may be unclamped for removal from the frame by actuating the lever 875 of the valve 876 into its normal vertical position, as shown in FIG. 25. The lever 875, when in its normal vertical position, operates to position the plunger 1650 of the valve rightwardly to thereby connect the inlet port 1651 to the port 1655 by means of a passage 1680 provided in the plunger and also to connect the ports 1652 and 1654 together by means of another passage 1681 provided in the plunger 1650. Fluid pressure to the inlet port 1651 of the valve 876 will then flow through the passage 1680 and and out through the port 1655 into the connected line 1661 which communicates with the chamber 1660. The fluid pressure in the chamber 1660 of the actuator 858 will effect operation of the actuator to unclamp the car wheel. When the actuator 858 is operated to effect an unclamping of the car wheel, fluid in the chamber 1659 of the actuator will be exhausted therefrom into the line 1658 and will enter the port 1652 of the valve 876 and flow therethrough via the passage 1681 and out through the port 1654 into the line 1662 connected to the return line 1532. When the valve 876 is conditioned to effect operation of the actuator 858 in an unclamping operation, the frame actuator 867 cannot be operated to raise the frame by reason of the fact that fluid pressure is not flowing in the line 1658 to which the supply line 1663 for the actuator 867 is connected. Thus, even though the lever 872 of the valve 873 be accidentally moved to its upright vertical position, as shown in FIG. 25, a corresponding movement of the frame 836 would not occur since there would be no supply of fluid pressure to the inlet port 1666. It is therefore apparent that before the frame 836 can be raised or lowered the valve 876 must be conditioned so as to effect a clamping of the car wheel to the rollers 846 and 847.

An electrical circuit for effecting automatic sequential operation of the various operating mechanisms at stations 20 to 24 shown for purposes of illustration in FIGS. 29 and 29a, which together constitute a typical electrical circuit for effecting such automatic sequential control. The reference characters, appearing on the extreme left-hand edge of the drawings and having the prefix L, identify the particular horizontal lines in which the electrical elements are connected. The control circuit is energized from a source represented by conductors 1710 and 1711. The relay contacts are shown connected to their associated relay coils by broken lines and are depicted in the deenergized condition of the relay. Assuring that the gate 220 in the loading station is closed, the loading mechanism 171 of station 20 is in the retracted position, the transfer bar 1382 of the transfer mechanism 50 is in the retracted position, the transfer arm members of the transfer mechanism 50 are positioned in engagement with workpieces, the boring head 73 of station 23 is in the retracted position, the workpiece at station 23 is in unclamped and the loading carriage 172 of station 21 is in retracted position and has car wheels therein, a cycle of operation will be initiated.

The closed gate 220 functions to actuate the limit switch 1407 to close its contact 1712 which appears in line L8 to complete a circuit to the coil of relay 4CR–21. With the loading arm or mechanism 176 in the retracted position, the limit switch 266 will be released so that its contact 1713 appearing in line L35 thereof is opened. The normally open limit switch 267 is likewise actuated so that its contact 1714 appearing in line L39 is closed to complete a circuit to the coil of the relay 11CR–21 appearing in line L39. With the transfer bar 1382 of the transfer mechanism 50 in the retracted position, as shown in FIG. 1, the limit switch 1411 will be released and contact 1715 appearing in line L68 will return to a closed condition as shown in FIG. 29a.

The retraction of the transfer bar 1382 also causes the limit switch 1452 to be actuated so that its contact 1716 in line L68 is closed to complete a circuit for energizing the coil of a relay 8CR–23. Simultaneously therewith, a circuit is also completed to a coil of a relay 22CR–23, line L69, to energize this relay. With the transfer arm members of the transfer mechanism 50 in an advanced position, the limit switch 1454 is actuated so that its contact 1717 in line L72, is to energize the coil of a relay 10CR–23.

With the boring head 73 of station 23 in the retracted position, the limit switch 1447 is released so that its contact 1718 appearing in line L84, is closed. In addition, retraction of the head 73 causes the limit switch 1449 to be actuated so that its contact 1719 shown in line L84 is closed to complete a circuit to the coil of a relay 16CR–23. The energized relay 16CR–23 operates to close its normally open contact 1784 in line L85 so that a circuit is established from the conductor 1710 to the line L85 and through the closed contact 1785 of the automatic relay 3CRA–23, the closed contact 1786 of the energized latch relay 3CRL–23, the normally closed contact 1787 of the deenergized relay 18CR–23 and the now closed contact 1784 of the energized relay 16CR–23, to the coil of the relay 17CR–23 to energize the relay. The relay 17CR–23 includes a contact (not shown) which, when the relay is energized, is positioned to effect a conditioning of a valve (not shown) for maintaining the clamp mechanisms associated with the boring head 73 in an unclamped condition, in the manner shown in the aforementioned copending application, Serial No. 713,573.

When the relay 4CR–23 in line L 60 is energized, its contact 1720 in line L61 is closed to complete a circuit to the coil of the latch relay 2CRL–23. When a selection switch 1714 is actuated for initiating a transfer cycle its contact 1722, in line L92 will be closed to complete a circuit for energizing the coil of a relay 21CR–23 through a closed contact 1721 of energized relay 4CR. Energization of the latch relay 2CRL–23 causes its contact 1723 in line L89 to close. In like manner, energization of the relay 21CR–23 causes its contact 1724 in line L88 to close for establishing a shunt circuit around the contact 1725 of the latch relay 3CRL–23 in line L89. The energized relay 8CR–23 will close its contact 1726, in line L89. Energization of the relay 16CR–23 serves to close its contact 1727, in line L90, while the energization of relay 11CR–21 functions to close its contact 1728, in line L90. The energized relay 4CR–21 closes its contact 1729, in line L90, and the energized relay 10CR–23 operates to close its contact 1730, in line L90. With the workpiece unclamped, the limit switches 1412, 1413 and 1417 will be released so that their respective contacts 1731, 1732 and 1733, appearing in line L86, are released to a closed condition to establish a circuit to the coil of the relay 18CR–23, which, upon being energized, operates to close its contact 1734, in line L89, for completing a circuit to a relay 19CR–23. With the relay 18CR–23 energized its normally closed contact 1787, in line L85, is opened thereby deenergizing the relay 17CR–23.

With the relay 19CR–23 energized, a contact 1735 appearing in line L2 is closed to establish a circuit to a relay 7CR. Simultaneously therewith, an interlocking relay 8CR appearing in line L1 is also energized through a branch conductor 1709 and a normally closed contact 1707 of a deenergized relay 8CR–21. The relay 8CR is an interlocking relay for the other operating stations. With the relays 7CR and 8C energized, and with an operational mode selector switch 1736, appearing in line L18, in auto-cycle position wherein its contact 1737, in line L17, is in a closed position, a cycle can be initiated. The operator will depress the actuating button of a cycle start switch 1738 to close the contact 1739, in line L17, to complete the circuit to an automatic relay 1CRA–23. This circuit to the coil of the automatic relay 1CRA–23 is completed through a now closed contact 1740 of the energized initial condition relay 19CR–23. Simultaneously therewith, a branch circuit from line L17 is also energized so that an automatic relay 2CRA–23 in line L16, is energized while an automatic relay 3CRA–23, in line L14, is also energized. In manual mode operation the automatic relays 1CRA–23, 2CRA–23 and 3CRA–23 are energized through the line L22, the closed contact 1741 of the energized manual mode relay 21CR–23 and thence through a closed contact 1705, in line L22, of the energized relay 7CR a branch conductor 1699 to the line L17 and thence through the coils of the respective relays to the supply conductor 1711. The automatic relays 1CRA–23, 2CRA–23 and 3CRA–23 are maintained energized upon the release of the cycle start button 1738 through a holding circuit established from line L17 through a branch conductor 1745 to the line L22 and thence through a branch conductor 1742 from line L22 through a now closed contact 1743 of the energized relay 1CRA–23, in line L20, to a branch conductor 1704 of line L18 and thence through line L17 to the energized supply line 1711. For automatic mode of operation a shunt circuit is established around the contact 1741 in line L22 via a conductor 1745 which is connected to line L22 and to line L17 between the contact 1737 of the operational mode selector switch 1736 and the contact 1739 of the cycle start switch. When the initial condition relay 19CR–23 is deenergized and when the boring head 73 is in a retracted position, a secondary circuit is provided for energizing the coils of the automatic relays 1CRA–23, 2CRA–23 and 3CRA–23. With the initial condition relay 19CR–23 deenergized its contact 1740, in line L17, will be open, so that the relays cannot be energized as previously described. However with the boring head 73 retracted, the relay 16CR–23 is energized so that its contact 1691, in line L22, is closed. At this time a latch relay 1CRL–23, in line L48, will be energized so that its contact 1692, in line L22, is closed. Thus, a circuit is established from line L22, as previously described, through the closed contact 1705, therein, a branch conductor 1693, the closed contacts 1692 and 1691 to the branch conductor 1704, in line L18, and thence to line L17 from whence the current will flow to the coils of the automatic relays 1CRA–23, 2CRA–23 and 3CRA–23.

As the operator actuates the button of the cycle start switch 1738, another contact 1746, in line L46, is closed so that a circuit from the line 1710 is established through the now closed contact 1746 and a now closed contact 1747 of the energized initial condition relay 19CR–23 through a now closed contact 1748 of the energized relay 22CR–23, the now closed contact 1749 of the automatic relay 2CRA–23 via a branch conductor 1750 to the coil of the relay 2CR–23 to energize the relay. The relay 2CR–23 upon being energized operates to close its contact 1874, in line L51, to establish a circuit along the line for energizing the unlatching relays 2CRU–23, in line L51, and 3CRU–23, in line L52. These relays when energized unlatch the contacts of the relays 2CRL–23 and 3CRL–23, respectively, to permit these contacts to return to their normal positions.

With the relay 2CR–23 energized, a holding circuit is established for maintaining the relay energized, along the line L44, through a now closed contact 1780, in line L44, and a branch conductor 1890, to the line L46, and thence by means of the balance of the circuit along line L46 to the coil of the relay 2CR–23, as previously described. Also, a circuit is established for energizing the latch relay 1CRL–23, in line L48. Such circuit is from the line L46, through a branch conductor 1701, a normally closed contact 1702 and the line L48 to the coil of the latch relay 1CRL–23.

With the relay 2CR–23 energized, its contact 1741, in line L37, is closed so that a circuit is established from the conductor 1710 through the now closed contact 1751, a now closed contact 1752 of the energized automatic relay 1CRA–23 and a normally closed contact 1753 of a deenergized relay 3CR–21 to the coil of the relay 1CR–21. With the relay 1CR–21 energized, a contact 1754 thereof, in line L97, is closed to establish a circuit to the solenoid 1384 of the valve 1385, shown in FIG. 27, to condition the valve for supplying fluid pressure to the actuator 221 for opening the gate 220. When the gate is opened, the limit switch 1407 is actuated in a clockwise direction so that its contact 1712, in line L8, is released to interrupt the circuit to the relay 4CR–21. The clockwise actuation of the limit switch 1407 also serves to close its contact 1755, in line L5, to establish a circuit to the coil of the relay 2CR–21. With the relay 2CR–21 energized, a contact 1756, in line L53, is closed so that a circuit is now established from the line 1710 via the line L53, a closed contact 1757 of the previously energized relay 2CR–23, the closed contact 1758 of the previously energized relay 10CR–23, the normally closed contact 1759 of a deenergized latch relay 2CRL–23, the now closed contact 1756 of the energized relay 2CR–21, the closed contact 1761 of the energized automatic relay 2CRA–4, the closed contact 1762 of the energized relay 18CR–23, the closed contact 1763 of the energized relay 16CR–23 and the normally closed contact 1764 of a deenergized relay 7CR–23 to the coil of the relay 3CR–23. A holding circuit for maintaining the relay 3CR–23 energized is established along the line L55 through a closed contact 1707 of the energized relay 3CR–23 and thence through a branch conductor 1706 to the line L53.

With the relay 3CR–23 energized, a contact 1765 thereof, in line L71, is closed so that a circuit is established from the conductor 1710 through the now closed contact 1766 of the energized relay 10CR–23, the now closed contact 1765 of the relay 3CR–23 to a branch conductor 1767 which is connected to line L70 and thence through the coil of the relay 9CR–23. This circuit along the line L71 serves to hold the relay 9CR–23 energized to insure that the transfer arms are maintained in engagement with car wheels upon advancement of the transfer mechanism 50. The relay 3CR–23 includes contacts (not shown) which when the relay is energized are positioned to effect a conditioning of valve (not shown) to effect an advancement of the transfer bar 1382 of the transfer mechanism 50 for advancing car wheels in stations 21, 22, 23 and 24 one station into stations 22 to 25, inclusive, in the manner shown in the aforementioned copending patent application, Serial No. 713,573.

When the transfer bar 1382 has fully advanced, the limit switch 1452 is released and the limit switch 1411 is actuated so that contacts 1768 and 1769 respectively, in line L60, are closed. This established a circuit from the conductor 1710 through line L60 to the coil of the relay 4CR–23 to energize the relay. With the relay 4CR–23 energized, the contact 1720, in line L61, is closed, completing a circuit from the energized conductor 1710 via the line L61 to the coil of the latch relay 2CRL–23 to energize this relay. With the latch relay 2CRL–23 energized, a contact 1771 thereof, in line L75, is closed to that a circuit from the conductor 1710 is established through the line L74 and the normally closed contact 1772 of deenergized latch relay 3CRL–23. The circuit continues via the line L75, through the now closed contact 1771 of the energized automatic relay 2CRL–23, the closed contact 1773 of energized automatic relay 3CRA–23, the normally closed contact 1774 of deenergized relay 21CR–23, to the coil of the relay 11CR–23 and then through the normally closed contact 1775, in line L76, of relay 17CR–23 to energize the relay 11CR–23. A holding circuit is established to bypass the contact 1772 for maintaining the relay 11CR–23 energized via the line L73 and the closed contact 1776 of the energized relay 11CR–23 to the line L75 and thence as previously described. The relay 11CR–23 includes contacts (not shown) which when the relay is energized are positioned to effect a conditioning of valve (not shown) to effect the operation of the various chucking and clamping mechanisms associated with the boring head 73 to clamp the car wheel at the station 23 to the head, in the manner shown in the aforementioned copending patent application, Serial No. 713,573.

When the workpiece is clamped, the limit switches 1412, 1413 and 1417 are actuated so that the contacts 1731, 1732 and 1733, in line L86, are opened to interrupt the circuit to the relay 18CR–23. Also, the limit switches 1412, 1413 and 1417 when actuated, will operate to close contacts 1777, 1778 and 1779 thereof, in line L77, to establish a circuit to the coil of the relay 12CR–23. With the relay 12CR–23 energized, a contact 1781 thereof, in line L80, is closed so that a circuit is established through the line L80, the closed contact 1781, a closed contact 1782 previously energized relay 3CRA–23, to the coil of a relay 13CR–23 and thence through the closed contact 1783 of the energized relay 3CRL–23. The relay 13CR–23 likewise includes a contact (not shown) which, when the relay is energized is positioned to effect a conditioning of a valve (not shown) to effect the advancement of the boring head 73 in the manner shown in the copending patent application, Serial No. 713,573.

When the boring head 73 is advanced to full depth, the limit switch 1447, shown in FIG. 1, will be actuated so that a contact 1788 thereof, in line L81, will be closed. At the same time, the limit switch 1449 will be released and a contact 1789 thereof, in line L81, will return to its normal closed condition. Thus, a circuit will be established to the coil of the relay 14CR–23 to energize this relay. With the relay 14CR–23 energized, its contact 1791, in line L82, is closed to thereby establish a circuit to the coil of the latch relay 3CRL–23 to effect the energization of this relay. As the latch relay 3CRL–23 is energized, a contact 1792 in line L83 will be closed so that a circuit is now established via the line L83, a closed contact 1793 of energized automatic relay 3CRA–23 to the coil of the relay 15CR–23. The circuit continues from the coil of relay 15CR–23 through the closed contact 1792 of the latch relay 3CRL–23 and the normally closed contact 1794 of deenergized relay 16CR–23 to the conductor 1711. The relay 15CR–23 when energized operates to open a normally closed contact 1795 in line L80, so that the circuit to the relay 13CR–23 is interrupted so that its contact (not shown) previously mentioned is positioned to effect a conditioning of a hydraulic valve (not shown) associated with the boring head for a subsequent operation. The relay 15CR–23 includes a contact (not shown) which when the relay is energized is positioned to effect a conditioning of a valve (not shown) for effecting the retraction of the boring head 73, in the manner shown in the aforementioned copending application, Serial No. 713,573.

Prior to the advancement of the boring head 73 and after the car wheel has been clamped, a circuit to the relay 5CR–23, in line L65, is established via the line L64, a closed contact 1796 of a relay 24CR–23, line L79, which was energized by the actuation of the limit switches 1412 and 1413. The circuit will continue from the closed contact 1796, in line L64, through the closed contact 1797 of the latch relay 2CRL–23, through the closed contact 1798 of the energized automatic relay 2CRA–23, through the closed contact 1799 of the energized relay 4CR–23 and continues on through the normally closed contact 1801 of the deenergized relay 9CR–23 to line L65 and thence to the relay 5CR–23. The circuit will continue from the coil of the relay 5CR–23 to line L66, and thence to the return conductor 1711. The relay 5CR–23 includes a contact (not shown) which when the relay is energized is positioned to effect a conditioning of a valve (not shown) for effecting the retraction of the arm members of the transfer mechanism 50 out of car wheel engagement, in the manner shown in the aforementioned copending application, Serial No. 713,573.

When the arm members of the transfer mechanism 50 are retracted the limit switch 1454 will be actuated in the opposite direction to close its contact 1703, in line L67, thereby completing the circuit along the line to the coil of the relay 6CR–23. With the relay 6CR–23 energized, it operates to close its contacts 1826, in line L56, and 1876, in line L62.

In automatic mode of operation energization of the relay 5CR–23 for effecting retraction of the arm members of the transfer mechanism 50 is effected through a circuit which by-passes the contact 1796, in line L64, of the relay 24CR-23. This by-pass circuit is via the line L63, through a closed contact 1795, in line L63, of the energized relay 21CR-23 to the line L64 and thence through the balance of the circuit along lines L64, L65 and L66 as previously described.

As the workpiece is clamped, the relay 12CR-23 in line L77 is energized, as previously described, and a contact 1804, in line L6, is closed so that a circuit is established to the coil of a relay 3CR-21. The circuit is completed from the energized conductor 1710 via the closed contact 1804 of the relay 12CR-23, through the closed contact 1805 of the previously energized automatic relay 1CRA-23 and through the normally closed contact 1806 of the deenergized relay 4CR-21 to the coil of the relay 3CR-21. With the relay 3CR-21 energized, a contact 1807, on line L98, is closed to establish a circuit to the solenoid 1420 of the valve 1385 to obtain distribution of hydraulic pressure to the actuator 221, shown in FIG. 27 to effect its operation for closing the gate 220. With the fixture associated with the boring head 73 in an unclamped condition, to establish a circuit to the relay 3CR-21 for closing the gate 220, a shunt circuit around the contact 1804 in line L6, is provided. Such circuit is via the line L7, a contact 1810 of relay 21CR-23 and a contact 1813 of relay 2CRL-23 to the line L6.

When the gate 220 is closed, the limit switch 1407 is actuated in the opposite direction so that a contact 1712 on line L8 is closed. This completes a circuit to the coil of the relay 4CR-21 to effect its energization, opening the normally closed contact 1806 thereof in line L6, to deenergize the relay 3CR-21.

With the relay 4CR-21 energized, a contact 1808, in line L9, is closed so that a circuit is now completed to the coil of the relay 1TR-21 via closed contacts 1813, 1814 and 1744 of the previously energized relays 12CR-23, 1CRA-23 and 11CR-21, respectively. Simultaneously therewith, by means of a branch conductor 1809 connected to line L9, a circuit to the coil of the relay 5CR-21 is established. This circuit is completed via the normally closed contact 1811 in line L10, of a deenergized relay 7CR-21 and a normally closed contact 1812 of a deenergized latch relay 1CRL-21.

With the relay 5CR-21 energized, a contact 1815 in line L95 is closed so that a circuit from the conductor 1710 is established through the line L95 and the now closed contact 1815 to solenoid 1424 of the valve 1425, shown in FIG. 26. With the solenoid 1424 energized, the valve is conditioned to supply fluid pressure to the carriage actuator 238 for advancing the carriage to align the chute 208 thereof, as shown in FIG. 7, with the guide rail 65.

A holding circuit for maintaining the carriage advance relay 5CR-21 energized is provided via the line L13, a contact 1800, in line L11, of the relay 5CR-21, a contact 1818 of the relay 21CR-23 a branch conductor 1834 connected to the line L9, and thence, by means of the previously described circuit along line L9 to the relays 5CR-21.

In the event that the chute next to be aligned with the guide rail 65 is empty, the cycle may be interrupted and the loading carriage advanced another increment without the necessity of going through the entire cycle. A circuit for this purpose is provided and is established when a car wheel is clamped in the fixture of the boring head 73 and when the transfer arms of the transfer mechanism 50 are retracted. Such circuit by-passes the contact 1813, in line L9, of the unclamp relay 12CR-23. This by-pass circuit is established along the line L12 through a contact 1835 of the return transfer arm relay 5CR-23 and a branch conductor 1866 to the line L11, and thence via the circuit previously described to the relays 1TR-21 and 5CR-21 to effect advancement of the loading carriage.

When the next position of the carriage is reached, the limit switch 251, shown in FIG. 27, is actuated so that the contact 1816, in line L26 of FIG. 29, is closed. Since the time delay relay 1TR-21 has previously been energized, the time to close contact 1817, in line L26, will close to complete a circuit from the conductor 1710 via the line L26, the time to close contact 1817 of the time delay relay 1TR-21, the closed contact 1816 of the limit switch 251 to the coil of the latch relay 1CRL-21. The energized relay 1CRL-21 will operate to open the contact 1812 in line 10, to interrupt the circuit to the relay 5CR-21 to deenergize it, so that the solenoid 1424 of the valve 1425 is deenergized and the valve will be conditioned for a subsequent operation. The energized relay 1TR-21 will also open a contact 1864, line L23, to deenergize the unlatching relay 1CRU-21, line L24 for subsequent operation. The relay 1CRU-21 had been previously energized by energization of the initial condition relay 19CR-23 which closes its contact 1865, in line L24.

As the boring head 73 is retracted, the relay 16CR-23, in line L84, will be energized, as previously described, to close a contact 1819, in line L56, to complete the circuit to the coil of the relay 7CR-23. This circuit to the coil of the relay 7CR-23 is established by reason of the contacts 1820, 1821, 1822, 1823 and 1826 of the previously energized relays 8CR-21, 2CRA-23, 3CRL-23, 11CR-21 and 6CR-23, respectively, being closed while the contacts 1824 and 1825 of deenergized relay 8CR-23 and 7CR-21 are in their normally closed positions. Should the operation be in manual mode, the relay 7CR-23 would be energized along the line L56, through the contacts 1820 and 1821 and thence by means of a branch conductor 1877 through a contact 1878, in line L58, of the energized manual relay 21CR-23 to a branch conductor 1879 connected to the line L56. In this manner the contact 1822 of the automatic mode latch relay 3CRL-23 is shunted. The relay 7CR-23 includes a contact (not shown) which when the relay is energized is positioned to effect a conditioning of a valve (not shown) for effecting retraction of the transfer bar 1382 of the transfer mechanism 50, in the manner shown in the copending application, Serial No. 713,573.

To insure the positive retention of the arm members of the transfer mechanism 50 in a retracted position as the transfer bar 1382 is being retracted, a shunt circuit to maintain the relay 5CR-23 energized is established around the contacts 1796, 1797, 1798 and 1799, in line L64 of relays 24CR-23, 2CRL-23, 2CRA-23 and 4CR-23, respectively, is provided. Such circuit is from the energized conductor 1710 along the line L62, through now closed contacts 1875 and 1876 of energized relays 7CR-23 and 6CR-23, to the line L64, and thence through the balance of the circuit of lines L64, L65 and L66, as previously described.

As the transfer bar 1382 is being retracted to its initial position, the limit switch 1411 will be released to open its contact 1769, in line L60, and to close its contact 1715, in line L68. When the transfer bar 1382 is fully retracted, the limit switch 1452 will be actuated to close its contact 1716, in line L68, and to open its contact 1768, in line L60. With the contacts 1716 and 1715, in line L68, closed, the relay 8CR-23 will be energized as will the relay 22CR-23, in line L69. With the relay 8CR-23 energized, its contact 1824, in line L56, will be opened to deenergize the relay 7CR-23. The energized relay 8CR-23 will, also, operate to close a contact 1830 in line L70.

With the contact 1830 closed, the relay 9CR-23 will be energized by reason of the contacts 1827, 1828, 1829 and 1831, in line L70, of previously energized relays 2CRA-23, 11CR-21, 18CR-23 and 16CR-23, being closed, while the contacts 1832 and 1833, of previously deenergized relays 2CRL-21 and 10CR-23, respectively, are in their normally closed positions. The relay 9CR-23 includes a contact (not shown) which when the relay is energized is positioned to effect a conditioning of a valve (not shown), associated with the transfer mechanism 50, to effect advancement of the arm members thereof into car wheel engagement, in the manner shown in copending application, Serial No. 713,573.

With the relay 22CR-23, in line L69 energized, as previously described, its contact 1748, in line L46, will be closed thereby completing the circuit to the coil of the relay 2CR-23, in line L42 to energize the relay. This circuit is established along the line L50, through the closed contact 1836 of relay 7CR, in line L49, the line L49 to the line L46. The circuit continues through the closed contact 1747 of the energized initial condition relay 19CR-23, the closed contact 1748 of the energized relay 22CR-23, the closed contact 1749 of energized automatic relay 2CRA-23, via the conductor 1750 to the coil of relay 2CR-23 to the conductor 1711. With the relay 2CR-23 energized, its contact 1751, in line L37, is closed, while the contact 1752 of the energized automatic relay 1CRA-23 is also closed, and the normally closed contact 1753 associated with the deenergized relay 3CR-21 is closed so that a circuit via the line L37 is established to the coil of the relay 1CR-21. The energized relay 1CR-21 operates to actuate its contact 1754, in line L97, to a closed condition thereby establishing a circuit to the solenoid 1384 of the valve 1385, shown in FIG. 27. When the valve 1385 is conditioned by energization of the solenoid 1384 it operates to supply fluid pressure to the actuator 221 for effecting its operation in a direction to open the gate 220. The cycle is now completed for one machining operation.

The aforedescribed cycle will be repeated until the carriage 172 has been fully advanced so that the chute 211 thereof is aligned with the guide rail 65 and the car wheel that is in the chute has been moved out of the carriage. At this time the limit switch 257 will be actuated so that its contact 1837, in line L27, is closed to establish a circuit for energizing a coil of the relay 6CR-21. With the relay 6CR-21 energized, a contact 1838, in line L25, is closed so that circuit from the conductor 1710 is established through the line L25 to the line L26, to energize the coil of the latch relay 1CRL-21. The energized latch relay 1CRL-21 operates to open its normally closed contact 1812, in line L10, which, upon opening, will effect deenergization of the relay 5CR-21. Deenergization of relay 5CR-21 operates to open its contacts 1815 in line L95, so that the solenoid 1424 of the valve 1425, shown in FIG. 27, is deenergized and the valve is reconditioned to its neutral blocking position for subsequent operation.

Also, at this time, a circuit is established to the coil of the relay 7CR-21, line L29, from the conductor 1710 through line L32, to a closed contact 1839 of the energized latch relay 2CRL-21, and thence to line L31. The circuit continues through the closed contact 1841, in line L29, of the energized relay 12CR-23, thence through the normally closed contact 1842, in line L29, of a deenergized relay 8CR-21, the closed contact 1843 of the energized automatic relay 1CRA-23, the closed contact 1844 of the energized relay 4CR-21 to the coil of the relay 7CR-21. The relay 7CR-21, upon being energized, operates to close a contact 1845, in line L96, so that a circuit to the solenoid 1458 of the valve 1425 is established. The energized solenoid 1458 operates to condition the valve 1425, shown in FIG. 27, to effect a distribution of fluid pressure to the carriage actuator 238 for effecting retraction of the carriage. The relay 6CR-21 when energized will also close its contact 1870, in line L28, so that with the contact 1871 of the energized initial condition relay 19CR-21 closed, the coil of the relay 2CRL-21 will be energized.

In the event that it is desired to retract the loading carriage before the car wheel is unclamped, a shunt circuit is provided around the contact 1841 of the unclamp relay 12CR-23. Such circuit is estabished via the line L32, through the contact 1839, in the line to a branch conductor 1867, line L31, through a contact 1868 of the relay 4CR-23, branch conductor 1869, line L30, through a contact 1872 of the relay 21CR-23 in the line to the line L29 and thence through the balance of the circuit in line L29 to the coil of the relay 7CR-21.

With the carriage 172 returned to its initial position the limit switch 259 will be actuated so that its contact 1846, in line L33, is closed to establish a circuit to the coil of the relay 8CR-21. The energized relay 8CR-21 operates to close its contact 1847, in line L34, to complete the circuit to the coil of a relay 9CR-21. This circuit has been previously partially conditioned through the previous energization of relays 2CRL-21, 8CR-21, 1CRA-23, 4CR-21 and 2CRU-23 so that their associated contacts 1848, 1850, 1851 and 1852, respectively, are closed and deenergization of the relay 19CR-21 so that its contact 1853 is closed. Thus, when the relay 8CR-21 is energized a circuit to the relay 9CR-21 is immediately established to energize it thereby effecting the closing of its contact 1854, in line L93, to effect energization of solenoid 1464 of the hydraulic valve 1465 associated with the loading mechanism 176, shown in FIG. 27. With the solenoid 1464 of the valve 1465 energized, the valve is conditioned to supply fluid to the actuators 177 and 177a to effect advancement of the loading mechanism 176, pushing the car wheels in the storage racks into the chutes of the retracted carriage. When the loading mechanism 176 advances, the limit switch 267 is released to open its contact 1714, the line L39, to deenergize the relay 11CR-21 and also to deenergize the unlatching relay 3CRU-21, in line L40. The unlatching relay 3CRU-21 was previously energized when the relay 8CR-23 was energized to close its contact 1856, in line L40. With the relay 3CRU-21 energized, the contacts 1857 and 1858, in lines L38 and L57, are released to return to their normally open position.

With the loading mechanism 176 fully advanced, the limit switch 266, shown in FIG. 27, is actuated so that its contact 1713, in line L35 of FIG. 29, is closed, thereby establishing a circuit to the coil of latch relay 3CRL-21 to energize the relay. Simultaneously therewith, the coil of the unlatching relay 2CRU-21, in line L36, is also energized through a connected conductor 1859. The energized unlatching relay 2CRU-21, operates to unlatch the contacts 1839, 1860 and 1832, in lines L32, L34 and L70, respectively, of deenergized latch relay 2CRL-21, so that the contacts all return to the normal positions.

With the latch relay 3CRL-21 energized, its contact 1857, in line L38, is closed thereby energizing the coil of the relay 10CR-21 in line L38. This circuit to the coil of relay 10CR-21 is established through the closed contact 1857 of the latch relay 3CRL-21, the closed contact 1861 of the previously energized automatic relay 1CRA-23 and the normally closed contact 1862 of the deenergized relay 11CR-21. With the relay 10CR-21 energized, it operates to close its contact 1863, in line L94, to energize the solenoid 1485 of the hydraulic valve 1465, shown in FIG. 26. With the solenoid 1485 of the hydraulic valve 1465, shown in FIG. 27, energized, the valve is conditioned to supply fluid pressure to the actuators 177 and 177a of the loading mechanism 176 to effect a retraction of the loading mechanism. As the loading mechanism 176 retracts, the limit switch 266 is released so that its contact 1713, in line L35, is released thereby deenergizing the latch relay 3CRL-21, but the contacts thereof continue to be held in the actuated position by means of the latch mechanism. Simultaneously with the deenergization of the latch relay 3CRL-21, the coil of the unlatching relay 2CRU-21 is deenergized for its subsequent operation. With the loading mechanism retracted, the limit switch 267 is actuated so that its contact 1714, in line L39, is closed to thereby establish a circuit to the coil of the relay 11CR-21 for a subsequent cycle of operation.

Upon completion of a cycle of operation the initial condition 19CR-23 will again be energized for initiating the succeeding cycle of operation. As the initial condition relay 19CR–23 is energized, an unlatching relay 1CRU–23, in line L88, will be energized to unlatch the contacts of the deenergized latch relay 1CRL–23 shown in line L48 of FIG. 29.

A suitable hydraulic circuit with solenoid actuated valves for effecting the operation of the boring head and the actuation of the transfer mechanism 50 is shown in the previously mentioned copending application of Arthur H. Fotsch, John R. Finley, Gilbert W. Ross and Richard F. Fischer, Serial No. 713,573 filed February 6, 1958.

An electrical circuit for effecting automatic operation of the various operating mechanisms at station 43 as well as the compound and cross slides at stations 42 and 44 and the transfer mechanism 54, is shown for the purpose of illustration in FIGS. 30, 30a and 30b, which together constitute a typical electrical circuit for effecting the automatic and sequential control of the mechanisms at these stations. The control circuit is energized from conductors 1710 and 1711. Assuming that the transfer bar 127 of the transfer mechanism 54 is in a retracted position, the transfer arms of the transfer mechanism 54 are in advanced position in engagement with car wheels at the various stations, the station 42 compound and cross slides 110a and 108a, respectively, are in their retracted positions, the station 44 compound slide 101a and the station 44 cross slide 98a are in retracted position, the spindle drum 553 is stopped and the workpiece or car wheels unclamped. These initial conditions are met when latch relays 2CRL–43, 4CRL–42 and 4CRL–44 are in latched condition.

With the above initial conditions obtained, a relay 8CR–43, in line L127, will be energized since the transfer bar 127 is in a retracted position to actuate limit switch 155 and release limit switch 151 so that the contacts 1880 and 1881, respectively, in line L127, are closed to complete a circuit for energizing the relay. A relay 32CR–43, in line L181, will also be energized by reason of the workpiece being unclamped actuating the limit switch 708 to close its contact 1882, in the line. A relay 20CR–42, in line L148, is energized because of the initial condition established, wherein the cross slide 108a is in retracted position thereby actuating the limit switch 818 and releasing the limit switch 816 so that the respective contacts 1883 and 1884, respectively, in line L148, are closed to complete the circuit to the coil of the relay 20CR–42. A relay 25CR–42, in line L154, is also energized by reason of the compound slide 110a being in a retracted position thereby actuating the limit switch 824 and releasing the limit switch 822 so that respective contacts 1885 and 1886 thereof, in line L154, are closed to complete the circuit to the coil of the relay. A relay 27CR–43 will be energized by reason of the spindle drum 553 being stopped so that the zero speed switch 1325 will have its contact 1887, in line L167, closed and that the limit switch 1318 is actuated by reason of the drum brake being engaged so that the contact 1888 of the switch, in line L167, is closed. The clutch 645, shown in FIG. 17, is disengaged, actuating limit switch 1316, shown in FIG. 18, wherein its contact 1889 in line 167 of FIG. 30a, is closed completing a circuit to the coil of the relay 27CR–43. Since the compound slide 101a is in a retracted position, the limit switch 1295 will be actuated, while the limit switch 1266 will be released so that the respective contacts 1890 and 1891 thereof, in line L153, are closed to complete the circuit to the coil of the relay 22CR–44 to effect its energization. In addition, the relay 24CR–44, the coil of which appears in line L165, will be energized by reason of the fact that the cross slide 98a is retracted and unclamped so that the limit switch 1285, shown in FIG. 20, is actuated in the counterclockwise direction while the limit switch 1301, FIG. 20, is actuated and the limit switch 1925 is released whereby the respective contacts 1892, 1893 and 1894, in line L165, are closed to complete the circuit to the coil of the relay 24CR–44. With the above conditions existing, a contact 1895 of the energized relay 8CR–43, in line L176, will be closed; a contact 1896 of the latch relay 2CRL–43, in line L176, is latched in a closed position; a contact 1897 of the energized relay 32CR–43, in line L183, is closed; a contact 1898 of the latch relay 4CRL–44, in line L183, is latched in a closed position; a contact 1899 of the latch relay 4CRL–42, in line L183, is also in a latched closed position; a contact 2003 of the energized relay 20CR–42, in line L186, will also be closed; a contact 1901 of a latch relay 7CRL–43, in line L187, is in its normally closed position; a contact 1902 of relay 25CR–42, in line L187, is closed; a contact 1903 of the energized relay 27CR–43, in line L187, is also closed; and the respective contacts 1904 and 1905 of relays 22CR–44 and 24CR–44, in line L187, are closed. The closing of these contacts serves to establish a circuit for energizing the coil of the initial condition relay 33CR–43, appearing in line L186. With the above relays energized as described and with a selector switch 1907, shown on line L102, positioned as shown in the automatic position so that its contact 1908, in line L101, is closed, the operator may actuate a cycle start switch button 1909 which will close the contact 1910, in line L101, to complete a circuit from the conductor 1710 through the line L101 and the closed contact 1913 in line L101, of the energized initial condition relay 33CR–43 to the coil of the automatic relay 1CRA–43 and thence to the supply conductor 1711. Simultaneously therewith, automatic relays 2CRA–43 and 3CRA–43, in lines L102 and L103, respectively, are energized through a branch conductor 1914 which is connected to line L101, with the current being distributed to the lines L102 and L103. To maintain the automatic relays 1CRA–43, 2CRA–43 and 3CRA–43 energized upon a release of the cycle start button switch 1909, a holding circuit is established through the line L104, a branch conductor 1915, and the closed contact 1916 of the energized automatic relays 1CRA–24, in line L106, to the line L105 and thence back to the line L101 to maintain the circuit to the automatic relays 1CRA–43, 2CRA–43 and 3CRA–43 upon the release of the cycle start button switch 1909.

For manual operation the cycle start button switch 1909 is actuated by the operator, its contact 1917, is closed to complete a circuit through line L109, the closed contact 1917, the closed contact 1918 of the energized initial condition relay 33CR–43, the closed contact 1919, in line L109, of the energized relay 8CR–43, the closed contact 1920, in line L109, of the energized automatic relay 1CRA–43, the coil of the relay 2CR–43 and thence to the supply conductor 1911. With the coil of the relay 2CR–43 energized, a holding circuit is established through line L112, the closed contact 1923 of the relay 2CR–43, in line L112, and by means of the connected branch conductor 1924 back to the line L109, and thence through the closed contacts 1919 and 1920 of the energized relays 7CR–43 and 8CR–43, respectively, to the coil of the relay 2CR–43.

In automatic mode of operation the contact 1917, in line L109, is by-passed and a circuit is established to the cost of the relay 2CR–43 from the energized supply conductor 1710 through line L111, the closed contact 1921 of the energized relay 8CR and by means of the branch conductor 1922, to the line L109 and thence through the established close contacts of the various relays to the coil of the relay 2CR–43. The relay 8CR has been previously energized upon the operation of the mechanisms of stations 20 to 24, inclusive, as previously described.

As an initial condition the transfer arms of the transfer mechanism 54 are in an advanced position in engagement with the car wheels. This is accomplished by energizing the solenoid 949 of the valve 950 to condition the valve for directing fluid pressure to the actuator 132 for effecting its operation to pivot the fingers into car wheel engagement. Energization of the solenoid 949 is effected through a circuit established along the line L128 through the closed contacts 1926, 1927, 2101, 2102, 2103, 2104, 2105 and 2106 of previously energized relays.

8CR–43, 1CRA–43, 6CRL–43, 20CR–42, 25CR–42, 22CR–44, 24CR–44 and 32CR–43 respectively. The circuit continues through the line L129 to the coil of the relay 9CR–43 and thence through the normally closed contacts 1928 and 1929 of de-energized relays 8CRL–48 and 9CRL–48, respectively to the conductor 1711.

The relays 8CRL–48 and 9CRL–48 are associated with the loading station 43 and will be described subsequently. With the relay 9CR–43 energized a contact 1930, in line L191, is closed to complete a circuit for energizing the solenoid 949. When the transfer arms are advanced a limit switch 1931, shown in FIGS. 15 and 26, is actuated to close its contact 1932, in line L132, completing a circuit to unlatching relays 6CRU–43 and 7CRU–43, to energize these relays. The energized relays 6CRU–43 and 7CRU–43 operate to unlatch the contacts of de-energized relays 6CRL–43 and 7CRL–43, to insure that the respective contacts thereof are in their normal positions.

With the relay 2CR–43 energized, unlatching relays 2CRU–43, 4CRU–42 and 4CRU–44 in lines L113, L114 and L115, respectively, are energized via the line L113 and the closed contact 1933 of the energized relay 2CR–43 in line L113. When the unlatching relay 2CRU–43 is energized it operates to release the contacts of the relay 2CRL–43 so that they return to their normal position as shown. Thus, a contact 1934, in line L110, of the latch relay 2CRL–43 is in its normal closed position so that a circuit is established from the energized line L109 through the closed contact 1934 in line L110, to the coil of the latch relay 1CRL–43 with the circuit being completed to the supply conductor 1711. This will establish a secondary circuit for maintaining the automatic relays 1CRA–43, 2CRA–43 energized upon de-energization of the initial condition relay 33CR–43. The circuit is established through the line L104, the closed contact 1935, in line L104 of the energized relay 8CR, the closed contact 1936 in line L104 of the now energized relay 1CRL–43, the closed contacts 1937 and 1938 of the energized relays 20CR–42 and 25CR–42, respectively and the now closed contacts 1939 and 1940 of the energized relays 22CR–44 and 24CR–44, both of which appear in line L104. The circuit continues on through the line L105 back to the line L101 to maintain a circuit to the coils of the relays 1CRA–43, 2CRA–43 and 3CRA–43, upon the deenergization of the initial condition relay 33CR–43, the relay 7CR–43 or the relay 8CR–43.

With the relay 2CRL–43 unlatched, a circuit is established from the conductor 1911 through the line L114 the closed contact 1941 of the energized relay 2CR–43 and the normally closed contact 1942 of the unlatched deenergized relay 2CRL–43 in line L114, the branch conductor 1943 to the normally closed contact 1944, in line L118, of the deenergized relay 7CR–43, the circuit continues through the closed contact 1945, in line L118, of the energized automatic relay 1CRA–43, the normally closed contact 1946 in line L118 of the deenergized latch relay 7CRL–43, the closed contact 1947 and 1948 of the energized relays 20CR–42 and 25CR–42, respectively, to the coil of the relay 3CR–43 and thence through the now closed contacts 1949, 1950 and 1951 of the energized relays 22CR–44, 24CR–44, and 32CR–43, respectively. With the circuit being completed back to the conductor 1912.

With the relay 3CR–43 energized, a contact 1952 thereof in line L116, is closed so that a holding circuit is established from the line L114 by means of a conductor 1953, to line L117, the closed contact 1952 of the energized relay 3CR–43, in line L116, back to the line L114 to maintain the relay 3CR–43 energized when the relay 2CR–43 is deenergized. With the relay 3CR–43 energized, a contact 1954, in line L189, FIG. 30b, is closed to establish a circuit from the supply conductor 1710 to the line L189 through the closed contact 1954 of the energized relay 3CR–43 and thence to the solenoid 891 of the hydraulic valve 892, shown in FIG. 26. The energization of solenoid 891 conditions the valve 892 to direct fluid pressure to the actuator 140 of the transfer mechanism 54 to advance the transfer bar 127. As the transfer bar 127 advances, the limit switch 155 is released and upon full advancement of the transfer bar, the limit switch 151 is actuated so that the contacts 1955 and 1956, in line L119, FIG. 30, are closed to establish a circuit to the coil of the relay 4CR–43. Also, with limit switch 155 released, its contact 1880 in line L127, is released to interrupt the circuit to the relay 8CR–43 to deenergize it. With the relay 8CR–43 deenergized its contact 1919 in line L189, is opened to deenergize the relay 2CR–43. Deenergization of relay 8CR–43 will operate to open its contact 1926 in line L128. Deenergizing the relay 9CR–43 opens its contact 1930 in line L191 to deenergize solenoid 949 of valve 950, so that the valve will be conditioned for a subsequent operation.

With the relay 4CR–43 energized, its contact 1957, in line L120, is closed thereby establishing a circuit to the coil of latch relay 2CRL–43 to effect energization of the relay. When the latch relay 2CRL–43 is energized, its normally closed contact 1942, in line L114, is opened to interrupt the circuit to the coil of the relay 3CR–43 in line L118, so that the relay is deenergized thereby opening its contact 1954, in line L189, FIG. 30b, to effect de-energization of the solenoid 891 of the valve 892 so that the valve plunger is returned to its central neutral blocking condition and is conditioned for a subsequent operation.

With both the relays 4CR–43 and 2CRL–43 energized, contacts 1958 and 1959, respectively, in line L121, are closed so that a circuit is established via the line L121 through the closed contact 1958 of the energized relay 4CR–43, a closed contact 1960 of the energized automatic relay 1CRA–43 and the closed contact 1954 of the energized latch relay 2CRL–43 to the coil of the relay 5CR–43 and thence through a normally closed contact 1961 of a deenergized relay 9CR–43, the coil of which is shown in line L130. The circuit is completed from the normally closed contact 1961, in line L121, to the conductor 1711 with the relay 5CR–43 energized, a contact 1962 thereof, in line L192, in FIG. 30b, is closed to complete a circuit from the conductor 1710 to the solenoid 948, in line 192, of the valve 950 associated with the actuator 132, shown in FIG. 26, for effecting pivotal movement of the transfer bar 127 to move the transfer arms out of car wheel engagement.

Upon energization of the coil of the latch relay 2CRL–43 a contact 1963, in line L136 of FIG. 30, is closed to complete the circuit to the coil of the relay 11CR–43, in line L137. Such circuit is established through the line L134, the normally closed contacts 1964 and 1965 of deenergized latched relays 4CRL–42 and 4CRL–44, these relays having been unlatched upon the energization of the unlatching relays 4CRU–42 and 4CRU–44, previously described. The circuit continues on through the line L136, the closed contact 1963 of latch relay 2CRL–43, a closed contact 1966 of the energized automatic relay 1CRA–43, to the line L137, and through the coil of the relay 11CR–43 and thence through the normally closed contact 1967, in line L137, of the deenergized relay 28CR–43 to the conductor 1711. With the relay 11CR–43 energized a contact 2107, in line L135, is closed to complete a holding circuit to the coil of the relay. The holding circuit is established through the conductor of line L135, the closed contact, 2107 to the conductor of line L136 as previously described.

With the relay 11CR–43 energized, a contact 1968, in line L193 of FIG. 30b, is closed so that a circuit from the conductor 1710 is established through the conductor of line L193, the now closed contact 1968 a normally closed contact 1969 of a deenergized relay 12CR–43, to the solenoid 980 of the hydraulic valve 981, shown in FIG. 26. With the solenoid 980 of the valve 981 energized, the valve will be conditioned to direct fluid pressure to the actuator 580 to effect the advancement of the chucking spindle 561 into engagement with a car wheel at station 43.

With the arms of the transfer mechanism 54 retracted, the limit switch 153 will be actuated so that its contact 1970, in line L123 of FIG. 30, is closed to establish a circuit from the energized conductor 1710 via the line L123, through the now closed contact 1970 of the limit switch 153 to the coil of the latch relay 7CRL-43 to actuate the relay. As the latch relay 7CRL-43 is actuated, its contact 1901, in line L187 of FIG. 30b, is opened thereby interrupting the circuit to the coil of the initial condition relay 33CR-43, in line L186. Simultaneously with the energization of the latch relay 7CRL-43 in line L123 of FIG. 30, the latch relay 6CRL-43 in line L124 is also energized. With the latch relay 6CRL-43 energized, its contacts 2078 and 2101, in lines L126 and L128, respectively, are closed.

As the chuck spindle 561 advances, the limit switch 708, shown in FIG. 17, is released so that its contacts 1882, in line L182 of FIG. 30b, is opened thereby interrupting the circuit to both of the relays 32CR-43 and 13CR-43. Upon deenergization of the relay 13CR-43, a contact 1971, in line L199 of FIG. 30b, is opened to interrupt the circuit to the solenoid 1054 of the valve 1055 associated with the wedge lock 627, shown in FIG. 26, so that the valve is conditioned for subsequent operation. When the chucking spindle 561 has been advanced to its forward limit of movement, into engagement with a car wheel, the limit switch 704, shown in FIG. 17, will be actuated so that a contact 1972, in line L173 of FIG. 30a, is closed. Thus, a circuit is established from the conductor 1710 through the now closed contacts 1973 and 1974 of the relays 7CRL-43 and 11CR-43 which have been previously energized as described. This circuit continues through the coil of the latch relay 3CRL-43 to the conductor 1711. With the latch relay 3CRL-43 energized, a contact 1975, in line L182, is closed to partially condition a circuit to the relay 13CR-43. Also, a contact 1976 of the latch relay 3CRL-43, in line L195 of FIG. 30b, is closed so that a circuit is established from the conductor 1710 via the line L193, through the now closed contact 1968 of the relay 11CR-43 and via a branch conductor 1977 to line L195. The circuit continues through the closed contact 1976 of the energized latch relay 3CRL-43 and thence to the solenoid 1010 of the valve 1011, shown in FIG. 26. With the solenoid 1010 energized, the valve 1011 is conditioned to supply fluid pressure to the chuck jaw actuator 590 for operating it in a direction to engage the chuck jaws with the car wheel. Simultaneously with the energization of the solenoid 1010, the solenoid 1031, shown diagrammatically in FIG. 30b on line L196 and, also, in FIG. 26, is energized so that the valve 1032 is conditioned to supply fluid pressure to the actuator 699 for operating the fence rails in a direction to open them to permit withdrawal of the car wheel from the guide rail 65.

When the fence rails 61a and 63a are open, the limit switch 706 is actuated while the limit switch 1339 is released so that the respective contacts 1978 and 1979, in line L138 of FIG. 30a, are closed to complete a circuit to the coil of the relay 12CR-43. Energizing the coil of the relay 12CR-43 will effect its operation so that its contact 1980, in line L197 of FIG. 30b, is closed to establish a circuit from the branch conductor 1977 through the now closed contact 1980 of relay 12CR-43 and by means of line 197 to the solenoid 1046 of the valve 981 associated with the chucking spindle 561 to energize the solenoid. The valve will then be conditioned to direct fluid pressure to the actuator 580 to effect retraction of the spindle 566, withdrawing the car wheel from the transfer line. When the spindle 561 with the car wheel thereon is fully retracted, the limit switch 708 will be actuated so that its contact 1882, in line L182 of FIG. 30b, is closed to establish a circuit through the now closed contact 1975 of the energized latch relay 3CRL-43 to the coil of the relay 13CR-43, to energize this relay. With the relay 13CR-43 energized, its contact 1971, in line L199, is closed so that a circuit is established to the solenoid 1054 of the valve 1055 to condition the valve to direct fluid pressure to the wedge lock actuator 627 to effect its operation for locking the spindle 561 in retracted position.

With the wedge in locking position, the pressure in the line 1062, shown in FIG. 26, will increase and actuate the pressure switch 1070 so that its contact 1981, shown in line L139 of FIG. 30a, closed, establishing a circuit to the coil of the relay 15CR-43. This circuit to the relay 15CR-43 is completed by meason of the fact that the two normally open contacts 1982 and 1983 in line L139, are now closed since their associated relays 12CR-43 and 13CR-43 have been previously energized. With the relay 14CR-43 is completed by reason of the fact that the two and since a contact 1985 in the same line of the previously energized 2CRL-43 relay is also closed, a circuit is established to the coil of the relay 15CR-43 to operate this relay. Also, a contact 1986 of the relay 14CR-43, in line L142, is closed so that a circuit is established along line L142 to the coil of the relay 17CR-42 through a closed contact 1987 of the energized relay 2CRA-43, a normally closed contact 1988 of the deenergized latch relay 4CRL-42 and the closed contact 1989 of the previously energized relay 25CR-42, the coil of which appears in line L154. The relay 25CR-42 is energized by reason of the fact that the compound slide 110a is in an initial retracted position releasing limit switch 822 and actuating switch 824 so that the respective contacts 1885 and 1886 are closed to complete the circuit to the relay 25CR-42. Returning now to the circuit along line 142, the circuit continues through the now closed contact 1986 of the energized relay 14CR-43 and through the normally closed contacts 1990, 1991 and 1992, respectively, of the deenergized relay 19CR-42, 18CR-42 and 23CR-42.

With the relay 14CR-43 energized, a contact 1993 in line L155 is closed so that a circuit is also established to the coil of the relay 17CR-44, in line L155. This circuit is established through a closed contact 1994 of the previously energized automatic relay 3CRA-43, the normally closed contact 1995 of the denergized relay 4CRL-44, the now closed contact 1993 of the energized relay 14CR-43, the normally closed contact, 1996 of deenergized relay 18CR-44, the normally closed contact 1997 of deenergized relay 21CR-44 to the coil of the relay 17CR-44 and thence through the closed contact 1998 of the energized relay 24CR-44, which has been previously energized by reason of the cross slide 98a being in its initial retracted and unclamped condition.

With the relay 15CR-43 energized, a contact 1999, in line 203, is closed so that a circuit from the conductor 1710 is established through the closed contact 1999 to the solenoid 1071 of the valve 1072 shown in FIG. 26, to condition the valve to direct fluid pressure to the brake actuator 689 for releasing the brake and also to direct fluid pressure to the clutch actuator 677 to operate it for engaging the clutch 645 to effect rotation of the drum 553. As the drum 553 starts to rotate, the zero speed switch 1325 will be operated so that its contact 1887, shown in line L167 of FIG. 30a, is opened thereby interrupting the circuit to the coil of the relay 27CR-43, which operates to insure that the wedge 610 cannot be unlocked.

When the brake actuator 689, shown in FIG. 19, is released, the limit switch 1095 will be actuated while the limit switch 1318 will be released. When the clutch 645 is engaged, the limit switch 1316, shown in FIG. 18, is released, while the limit switch 1097 associated with the clutch 645 is actuated. Thus, the contact 2001 of the limit switch 1095, shown in line L141, is closed and contact 2002 of the limit switch 1097, also shown in line L141, is closed, to complete a circuit to the coil of the relay 16CR-43 to energize this relay.

With the relays 16CR-43, 1CRA-43 and 6CRL-43 energized their contacts, 2076, 2077 and 2078, respectively, in line L126, are closed to effect the energization of the relay 7CR-43. The relay 7CR-43 operates to close its contact 2079, in line L190, completing the circuit to the solenoid 972 of the valve 892, shown in FIG. 26, to direct fluid pressure to the actuator 140 for operating the actuator in a direction to retract the transfer bar 127. As the transfer bar 127 retracts, the limit switch 151 is released so that its contact 1881, in line L127, is closed. When the transfer bar 127 is fully retracted, the limit switch 155 will be actuated to close its contact 1880, in line L127. With contact 1880 and 1881 closed a circuit to the coil of the relay 8CR-43 is established to energize the relay.

With the relays 16CR-43, in line L141, 17CR-42 in line L142, and 17CR-44, energized in line L155, the machining cycle will begin. The compound slide 110a and the cross slide 108a of the profiling unit at station 42 will be operated to perform a profiling operation on the car wheel. Also, the compound slide 101a and the cross slide 98a of the tool unit at station 44 will be operated in proper sequence to perform a turning operation on the tread of the car wheel. The sequential operation of the slides 110a and 108a of the tool unit at station 42 will first be described, and, thereafter, the operation of the compound slide 101a and the cross slide 98a of the tool unit at station 44 will be described.

With the relay 17CR-42 energized, a contact 2006, in line L205 of FIG. 30b, is closed to establish a circuit for energizing the solenoid 1109 of the valve 1110. Energization of the solenoid 1109 serves to condition the valve 1110 so as to direct fluid pressure to the motor 757 for advancing the cross slide 108a at a rapid rate. The cross slide 108a will advance at a rapid rate until such time as the tools carried by the slide are located in a desired position relative to the car wheel. When this position has been obtained, the limit switch 816, shown in FIG. 26b, will be actuated and a contact 2007, in line L143, is closed. In line 143, a contact 2008 of the limit switch 818 will have been closed upon the advancement of the cross slide 108a so that with the closing of the contact 2007 of the switch 816, a circuit will be established through the normally closed contact 2009 of deenergized relay 20CR-42 to the coil of the relay 18CR-42.

With the relay 18CR-42 energized, its normally closed contact 1991, in line L142, is opened to interrupt the circuit to the relay 17CR-42, and thereby opens its contact 2006 in line L205, to break the circuit to the solenoid 1109, of valve 1110 for conditioning the valve 1110 to its central blocking position, as shown in FIG. 26b. The energized relay 18CR-42 will also operate to close a contact 2011, in line L147, so that a circuit is established along the line L147 to the coil of the relay 19CR-42 in the line to effect the operation of the relay. The circuit along the line L147 was previously partially conditioned through the energization of relays 16CR-43 and 2CRA-43 which closed their respective contacts 2012 and 2013, while the normally closed contacts 2014, 2015, 2016 and 2017 of the deenergized relays 4CRL-43, 21CR-42, 22CR-42 and 24CR-42 are maintained closed. The energized relay 19CR-42 operates to close its contact 2018, in line L206, to establish a circuit to the solenoid 1134 of the valve 1135, shown in FIG. 26b, to energize the solenoid and condition the valve for effecting the distribution of fluid pressure to the motor 761 for advancing the compound slide 110a at a feed rate. At this time, the cross slide 108a will be operated through the valve 780 in response to the contour of the cam 775 to generate the desired contour along a portion of the flange as previously described. As the tool leaves the workpiece upon completing the first part of the cut, the cross slide 108a will be in a retracted position and the limit switch 818 will be actuated by the cross slide so that its contact 1883, in line L148 is closed. In addition, the contact 1884 of the limit switch 816, which has previously been released, is closed so that a circuit is now established along line L148 to the coil of the relay 20CR-42 to energize the relay.

Energization of the relay 20CR-42 causes its contact 2019, in line L149, to close, and during the advancing movement of the compound slide 110a in effecting the desired profiling operation. At this time the limit switch 820 will be released and its contact 2020, in line L149, will be closed. With contacts 2021 and 2022 of the previously energized relays 2CRA-43 and 18CR-42 closed, and with a contact 2023 of deenergized relay 24CR-42 in its normal closed position the circuit along line L149 is completed to the coil of the relay 21CR-43. With the relay 21CR-43 energized a contact 2024, in line L207, is closed to complete a circuit to solenoid 1179 of the valve 1180 for directing fluid pressure to the motor 761 of the compound slide 110a for advancing the compound slide at a rapid rate. The energized relay 21CR-43 also operates to open its normally closed contact 2015 in line L147, so that the coil of the relay 19CR-42 is deenergized to open its contact 2018 in line L206 for interrupting the circuit to the solenoid 1134 of the valve 1135 to condition it to a blocking position as shown in FIG. 26b.

The compound slide 110a is advanced at a rapid rate until the limit switch 820 is contacted which operates to open its contact, 2020 shown in line L149, thereby interrupting the circuit to the relay 21CR-43. Deenergization of the relay 21CR-43 causes its contact 2024 in line 207, to open and interrupt the circuit to the solenoid 1179 of the valve 1180 which actuates the valve to a blocking condition, as shown in FIG. 26b. When the relay 21CR-43 is deenergized, its contact 2015 in line L147, returns to its normal closed condition to once again establish the circuit to the coil of the relay 19CR-42 for effecting its energization and operation so that its contact 2018 in line L206, is closed. Closure of the contact 2018 completes the circuit to the solenoid 1134 of the valve 1135 thereby directing fluid pressure to the compound slide actuator 761 for effecting its operation to advance the compound slide at a feed rate. At this time, the cross slide 108a will move in accordance with the contour of the cam 775 and the servo valve 780 will operate to control the cross slide motor 757 for moving the cross slide 108a for completing the other one half of the profile as previously described.

When the compound slide 110a of the tool unit 107a is fully advanced, the limit switch 822, shown in FIG. 26b, will be actuated while the limit switch 824 has been released upon the advancement of the slide. With the limit switch 822 actuated and the limit switch 824 released, the contacts 2025 and 2026, respectively, in line L150, are closed so that a circuit is established along the line L150 to the coil of the relay 22CR-42 for energizing the relay. With the relay 22CR-42 energized, it will operate to close a contact 2027 in line L15 to complete a circuit for energizing the coil of the relay 4CRL-42. The energized relay 4CRL-42 will operate to close its contact 2028 in line L152 so as to complete a circuit along the line L152 by reason of the fact that a contact 2029 of the energized automatic relay 2CRA-43 is closed and a closed contact 2030 of a deenergized relay 20CR-42 is in its normally closed position, thereby energizing the coil of the relay 23CR-42. The energized relay 23CR-42 will operate to close a contact 2031, in line L208 of FIG. 30b, to complete a circuit along the line L208 to the solenoid 1194 of the valve 1110, shown in FIG. 26b. Energization of the solenoid 1194 serves to condition the valve 1110 so that fluid pressure will be directed to the cross slide motor 757 to effect its operation for returning the cross slide 108a to its retracted position at a rapid rate. The cross slide 108a will be returned at a rapid rate until such time as the limit switch 818 is actuated.

As the retraction of the cross slide 108a is initiated, the limit switch 816 will be released so that when the limit switch 818 is actuated, the respective contacts, thereof, 1884 and 1883, in line L148 of FIG. 30a, will be closed to establish a circuit to the coil of the relay 20CR–42 along the line L148. The energized relay 20CR–42 will operate to open its contact 2030, in line L152, to interrupt the circuit to the previously energized relay 23CR–42 thereby opening its contact 2031, in line L208, to interrupt the circuit to the solenoid 1194 of the valve 1110 to permit the valve to be actuated to its central blocking position as shown in FIG. 26b. The operation of the relay 20CR–42 will also close another contact 2032, in line L153, to complete a circuit along the line L153 to the coil of the relay 24CR–42. This circuit is completed because relays 2CRA–43 and 4CRL–42 have been previously energized so that their contacts 2033 and 2034, respectively, in the line L153 are closed, while the contact 2035 is in its normally closed position because its associated relay 25CR–42 is deenergized. Thus, with the closing of the contact 2032 a circuit is established along the line L153 to the coil of the relay 24CR–42 to effect its operation. The operation of the relay 24CR–42 will close a contact 2036 in line L209, to complete a circuit along the line to the solenoid 1197 of the fluid valve 1180 shown in FIG. 26b. With the solenoid 1197 energized, the valve will be conditioned to direct fluid pressure to the compound slide motor actuator 761 to effect its operation in a direction to return the compound slide 110a at a rapid rate.

As the compound slide retracts, the limit switch 822 will be released and when retraction is completed the limit switch 824 will be actuated so that the contacts 1886 and 1885 of the respective limit switches in line L154, are closed as shown in FIG. 30a, to complete a circuit along the line to the coil of the relay 25CR–42. With the relay 25CR–42 energized, its normally closed contact 2035, in line L153, is opened to interrupt the circuit to deenergize the relay 24CR–24. As a result, the contact 2036 in line L209 is opened to interrupt the circuit to the solenoid 1197 of the valve 1180 to allow the valve plunger 1181 to return to its central neutral blocking condition to stop the operation of the motor 761. This completes the profiling cycle and returns the slide 110a to its initial position for a subsequent cycle of operation.

The compound slide 101a and the cross slide 98a of the tool unit 97a at station 44 operate for effecting a turning operation on the tread of the car wheel, as previously described. The coordinated operation of these slides is effected through the energization of the relay 17CR–44, shown in line L155 of FIG. 30a, the energization of which was previously described. The energized relay 17CR–44 operates to close a contact 2040, in line L210 of FIG. 30b, which completes a circuit to energize the solenoid 1209 of the hydraulic valve 1210 shown in FIG. 26a. With the solenoid 1209 energized, the valve is conditioned, as previously described, to effect a distribution of fluid pressure to the compound slide actuator 739 for advancing the compound slide 101a.

At this time the cross slide 98a is in a retracted position and its associated clamp mechanism 715, FIGS. 20 and 21, is in a released condition, as an initial condition. With the cross slide 98a in a retracted position the limit switch 1301 is actuated and its contact 1893, in line L165 is closed; the limit switch 1925 is released and its contact 1892, in line L165, is closed. Also, with the clamp mechanism 715 in a released condition the limit switch 1285 is actuated so that its contact 1894 in the line is closed. With these contacts closed a circuit is established to the coil of the relay 24CR–44, to energize the relay. The energized relay 24CR–44 operates to close its contact 2039, in line L163. Since the relay 17CR–44 is energized its contact 2053, in line L163, is closed and with the closing of the contact 2039 a circuit is complete along the line through the closed contacts 2053 and 2039 to the line L162 and thence to the coil of the relay 23CR–44 and to the energized conductor 1711, to energize the relay. With the relay 23CR–44 energized it operates to close its contact 2046, in line L213, to complete a circuit along the line to energize the solenoid 1239 of the valve 1240. The valve 1240 is conditioned to effect a distribution of fluid pressure to both the cross slide actuator 732 and to the clamp actuator 726, to insure that the cross slide 98a is maintained in its retracted position and that the clamp mechanism 715 is maintained in a released condition during the advancement of the compound slide 101a. When the compound slide 101a leaves its retracted position the limit switch 1295 is released and when the compound slide 101a is fully advanced so as to locate the cutting tool assembly 710 in a desired position relative to the car wheels the limit switch 1266 will be actuated so that the respective contacts, 2047 and 2048 thereof, in line L156, are closed to establish a circuit along the line L156 to the coil of the relay 18CR–44. Energization of the relay 18CR–44 will operate to open its normally closed contact 1996 in line L155, to deenergize the relay 17CR–44 and thereby cause deenergization of the solenoid 1209 of the valve 1210 to stop advancement of the compound slide 101a. The deenergized relay 17CR–44 will, also, open its contact 2053, in line L163, to effect deenergization of the relay 23CR–44 which when deenergized operates to open its contact 2046, in line L213, to deenergize the solenoid 1239 of the valve 1240, so that the valve is conditioned to its blocking condition, as shown in FIG. 26a. The deenergized relay 23CR–44 will also operate to close its contact 2051, in line L157. The energized relay 18CR–44, will, also, close its contact 2049, in line L157, to complete a circuit along the line L157, through a closed contact 2050 of the previously energized automatic relay 3CRA–43, the now closed contact 2049 of the energized relay 18CR–44, the coil of the relay 19CR–44 and thence through the normally closed contact 2051 of the deenergized relay 23CR–44 to the conductor 1716. With the relay 19CR–44 energized, it will operate to close a contact 2053 in line L211, to complete a circuit along the line to the solenoid 1271 of the valve 1240 to condition the valve for supplying fluid pressure to the cross slide actuator 732 to advance the cross slide 98a. When the cross slide 98a is fully advanced the fluid pressure will be sequenced to the clamp actuator 726 to effect a clamping of the cross slide to the compound slide as previously described.

As the cross slide 98a advances, the limit switch 1301 will be released, and when the cross slide is fully advanced, the limit switch 1925, shown in FIGS. 20 and 26a, will be actuated. In addition, the limit switch 1285 associated with the clamp will be actuated in a clockwise direction as viewed in FIGS. 20 and 26a so that the contacts, 2054, 2055 and 2056, respectively, of these limit switches shown in line L160 are closed to establish a circuit along the line L160 to the coil of the relay 20CR–44. With the relay 20CR–44 energized, a contact 2057, in line L168, is closed to establish a circuit to the relay 4CRL–44. The energized relay 20CR–44 also operates to close a contact 2058, in line L161, so that a circuit is established to the coil of the relay 21CR–44. The circuit to the relay 21CR–44 is established along the line L161 through the closed contact 2059 of the previously energized relay 16CR–43, the closed contact 2060 of the energized automatic relay 3CRA–43, the closed contact 2058 of energized relay 20CR–44 and the closed contact 2061 of deenergized relay 2TR–44.

The energized relay 21CR–44 operates to close a contact 2062, in line L212, to complete a circuit to the solenoid 1289 of the valve 1210 to condition the valve for distributing fluid pressure to the actuator 739 for effecting a return of the compound slide 101a to move the cutter assembly 710, in a work operation.

Thus, with the cross slide 98a clamped in the advanced position on the compound slide, 101a, and with the compound slide 101a being retracted, the turning operation on the tread of the car wheel will be completed. As the compound slide 101a approaches the end of its retracting movement, the limit switch 1295 will be actuated, while the limit switch 1266 has been released, so that the respective 1891 and 1890 contacts in line L158, are closed as shown in FIG. 30a, to complete a circuit to the coil of the relay 22CR–44 and to the time delay relay 2TR–44. The contact 2061 of the time delay relay 2TR–44 in line L161 will open after a time delay, to interrupt the circuit to the relay 21CR–44 for deenergizing the solenoid 1289 of the valve 1210 to stop the return movement of the compound slide 101a.

With the time delay relay 2TR–44 energized, a normally open time to close contact 2042, in line L162, will, after a time delay, be closed to again establish the circuit to the coil 23CR–44 for energizing the relay. The relay 23CR–44 operates to close its contact 2046 in line L213, to complete the circuit to the solenoid 1239 of the valve 1240 to effect unclamping of the cross slide 98a and, thereafter, to effect a return of the cross slide 98a to its original position, in the manner previously described.

With the clamp mechanism 715 in an unclamped condition, the limit switch 1285 will be actuated in a counterclockwise direction so that its contact 1894, in line L165, is closed, and with the cross slide 98a in a retracted position, the limit switch 1925 will be released so that its contact 1892, in line L165, is closed. The limit switch 1301 will likewise be actuated so that its contact 1893 is closed for establishing a circuit to the coil of the relay 24CR–44 to energize this relay. With the relay 24CR–44 energize, its contact 1905 in line L187 of FIG. 30b, is closed thereby completing a circuit to the initial condition relay 33CR–43, shown on line L186.

As the limit switches 1285 and 1301 are actuated, and the limit switch 1925 is released, the respective contacts, 2056, 2054 and 2055, in line L160, are opened, as shown in FIG. 30a, so that the circuit to the coil of the relay 20CR–44 is interrupted, which operates to open its contact 2057, in line L168, to interrupt the circuit to the relay 4CRL–44. With the relay 4CRL–44 deenergized its contact 2044, in line L162, is opened to effect deenergization of the relay 23CR–44 and thereby effect the deenergization of the solenoid 1239 of the valve 1240. The turning cycle is now complete and the circuits associated with the tool unit 97a are conditioned for another cycle of operation.

When both the profiling and turning operations on the car wheel are completed, and the slides of the tool units 107a and 97a are returned to their initial positions, and with the relays 3CRA–43, 4CRL–42, 4CRL–44, 20CR–42, 25CR–42, 22CR–44 and 24CR–44 energized, and the respective normally open contacts 2063 to 2069 inclusive, in line L166 of FIG. 30a, are closed while a normally closed contact 2070 of denergized relay 32CR–43 will remain in its normally closed position so that a circuit will be established along the line L166 to the coil of the relay 26CR–43. With the relay 26CR–43 energized a contact 2071, in line L204, is closed to complete a circuit to the solenoid 1309 of the valve 1072, shown in FIG. 26. The energized relay 26CR–43 also operates to open a normally closed contact 2072 in line L140, to deenergize the relay 15CR–43. With the relay 15CR–43 deenergized its contact 1999, in line L203 of FIG. 30b, is opened to deenergize the solenoid 1071 of the valve 1072.

Thus, with the solenoid 1071 of the valve 1072 deenergized and the solenoid 1309 of the same valve energized, the valve will be conditioned so as to effect a distribution of fluid pressure to the clutch actuator 677 for disengaging the clutch 645, shown in FIG. 17. This setting of the valve 1072 also causes it to direct fluid pressure to the brake actuator 689 so as to operate it in a direction for engaging the brake to stop the rotation of the drum 553. As the clutch is released, the limit switch 1097 is released and when the clutch is fully disengaged, the limit switch 1316 will be actuated. Also, with the brake actuator operated for effecting a braking action, the limit switch 1095 will be released while the limit switch 1318 will be actuated. Thus, with the limit switches 1095 and 1097 released, the contacts, 2002 and 2001, respectively, in line L141, will be released to an open condition to interrupt the circuit to the coil of the relay 16CR–43. The deenergized relay 16CR–43 operates to open its contact 2076 in line L126, to interrupt the circuit to the coil of the relay 7CR–43 to deenergize the relay. With the relay 7CR–43 deenergized its contact 2079, in line L190, is opened thereby deenergizing the solenoid 972 of the valve 892 to permit the valve to be reconditioned to its central blocking condition as shown in FIG. 26, for subsequent operation. As the limit switches 1316 and 1318 are actuated, the contacts 1889 and 1888, respectively, in line L167, are closed, and when the drum 553 comes to a stop, the zero speed switch 1325 will operate to that its contact 1887, shown in line L167, will be closed as shown in FIG. 30a. This will complete a circuit along the line L167 to the coil of the relay 27CR–43.

The energization of the relay 27CR–43 operates to close its contact 1903 in line L187 of FIG. 30b, in the circuit to the initial condition relay 33CR–43. The relay 27CR–43 also operates to close a contact 2080, in line L169, to complete the circuit along the line to the coil of the relay 28CR–43, because at this time contacts 2073, 2074 and 2075, of relays 3CRA–43, 4CRL–42 and 4CRL–44, respectively are closed. With the relay 28CR–43 energized, a contact 2081 in line L200 of FIG. 30b will be closed to complete the circuit to the solenoid 1326 of the valve 1055, shown in FIG. 26, to condition the valve for directing fluid pressure to the wedge lock actuator 627 for effecting its operation in a direction to withdraw the wedge 608 for releasing the chucking spindle 561.

The normally closed contact 1967 of the relay 28CR–43, in line L137 of FIG. 30, will be opened to interrupt the circuit to the coil of the relay 11CR–43. As the relay 11CR–43 is deenergized, its contact 1968, in line L193, is opened, thus interrupting the circuit to the solenoid 1031 of the valve 1032, to the solenoid 1010 of the valve 1011, to the solenoid 1046 of the valve 981 and to the solenoid 1054 of the valve 1055. This conditions the valves 1032, 1011 and 981 for a subsequent operation, while the deenergization of the solenoid 1054 and the energization of the solenoid 1326 will condition the valve 1055 to direct fluid pressure to the actuator 627 for withdrawing the wedge 608, as previously described. When the wedge is fully retracted, fluid pressure will develop in the line 1065, shown in FIG. 26, and actuate a pressure switch 1335 which thereupon operates to move its contact 2083, in line L170, to a closed position to complete a circuit along the line to the coil of the relay 29CR–43. At the same time, the pressure switch 1070 is released so that its contact, 1981, in line L139, is opened to interrupt the circuit to the coil of the relay 14CR–43.

With both the relays 28CR–43 and 29CR–43 energized, a circuit will be completed to energize the solenoid 980, shown in line L193, of the valve 981 via the line L200 through the now closed contact 2081 of energized relay 28CR–43 and thence by means of a branch conductor 2084, through the now closed contact 2085 of energized relay 29CR–43 along the line L194, through a normally closed contact 2086 of deenergized relay 31CR–43, to the line L193. The circuit continues along the line L193 to the solenoid 980 of the valve 981 associated with the chuck spindle 561. The energized solenoid 980 will condition the valve 981 to direct fluid pressure to the actuator 580 for advancing the chuck spindle 561 with a car wheel secured thereto for returning the car wheel to the transfer line. As the chuck spindle 561 advances, the limit switch 708 is released and when the spindle is fully advanced, the limit switch 704 is actuated. With the limit switch 704 actuated, its contact 1972, in line L173, is closed thereby completing a circuit along line L173 to the line L172 and thence by means of the now closed contacts 2087 and 2088, of the energized relays 28CR–43 and 29CR–43, respectively, to the coil of the relay 30CR–43 to energize this relay. The energized relay 30CR–43 operates to close a contact 2089 in line L175, to complete a circuit along the line L175 energizing the unlatching relay 3CRU–43 which operates to release the contacts of the relay 3CRL–43. With the contacts of the relay 3CRL–43 unlatched, the contact 1976 in line L195 is opened to deenergize the solenoid 1031 of the valve 1032, thereby conditioning the valve for a subsequent operation. In addition, the solenoid 1010 of the valve 1011 is deenergized so that this valve is also conditioned for a subsequent operation.

The energized relay 30CR–43 also operates to close a contact 2090, in line L201, so that a circuit is completed to the solenoid 1336 of the valve 1032 associated with the fence rail actuator 699. The energized solenoid 1336 serves to condition the valve 1032 to direct fluid pressure to the actuator 699 for operating it is a direction to return the fence rail 61a and 63a to their normal closed positions. The limit switch 706 is then released while the limit switch 1339 is actuated so that their respective contacts, 2091 and 2092, in line L179 are closed to complete the circuit to the coil of the timer relay 3TR–43 for energizing the relay. With the timer relay 3TR–43 energized, a contact 2093, in line L202, is closed to complete a circuit from the branch conductor 2084 along the line L201 and thence through the now closed contact 2093 in line L202 to the solenoid 1342 of the valve 1011 associated with the jaw actuator 590 of the spindle 561, so that the valve is now conditioned to direct fluid pressure to the actuator 590 to operate the jaws in a releasing action.

At the same time, another contact 2094 of the energized relay 3TR-43, in line L180, will be closed, after a time delay, so that a circuit will be established along the line L180 to the coil of the relay 31CR–43 to energize this relay. With the relay 31CR–43 energized, a contact 2095, in line L181, is closed, but, at this time, the circuit to the relay 32CR–43 is maintained deenergized because the contact 1882 of the limit switch 708, in line L182, is open, by reason of the spindle 561 being in an advanced position, also, with the relay 31CR–43 energized, its normally closed contact 2086, in line L194, is opened thereby interrupting the current flow along the line to the line L193 to deenergize the solenoid 980 of the valve 981 to deenergize this solenoid and thereby condition the valve for a subsequent operation. Simultaneously with the opening of the normally closed contact 2086 in line L194 of the energized relay 31CR–43 another contact 2096, in line L198, of the relay 31CR–43 is closed to establish a circuit to the solenoid 1046 of the valve 981. This circuit extends from the branch conductor 2084 along the conductor of line L198, through the now closed contact 2096 of relay 31CR–43, to the conductor of line L197 and thence to the solenoid 1046.

With the solenoid 1046 energized, the valve 981 will be conditioned to direct fluid pressure to the actuator 580 for effecting its operation in a direction to retract the chuck spindle 561. As the chucking spindle 561 retracts, the limit switch 704 is released so that its contact 1972 in line L173 of FIG. 30a, is opened interrupting the circuit to the relay 30CR–43 for deenergizing it, which in turn operates to release its contact 2090, in line L201, to effect deenergization of the solenoid 1336 of the valve 1032, so that the valve is conditioned for a subsequent operation. When the chucking spindle 561 is fully retracted, the limit switch 708 is actuated so that its contact 1882, in line L182, is closed as shown in FIG. 30b, to complete a circuit to the coil of the relay 32CR–43, in line L181, via the line L182, the line L181 and the now closed contact 2095 of the energized relay 31CR–43 to the coil of the relay 32CR–43. With the relay 32CR–43 energized, its normally closed contacts 2097 and 2098 in lines L169 and L171, are opened to interrupt the circuits to relays 28CR–43 and 30CR–43 to deenergize these relays. The deenergized relay 28CR–43 effects deenergization of the solenoids 1326, 1342 and 1046, associated with the valves 1055, 1011 and 980, respectively, to condition these valves for the next cycle of operation. In like manner, the deenergized relay 30CR–43 will effect deenergization of the solenoid 1336 associated with the valve 1032 to condition this valve for the next cycle of operation. This completes a cycle of operation for the two tool units 97a and 107a and the fixture 95a at stations 42, 43, 44, as well as the operating cycle of the transfer mechanism 54.

In FIG. 31 an electrical circuit is illustrated for controlling the sequential operation of the transfer mechanism 55 and the carriage and unloading rack of stations 48 and 49. The operation of the electrical control circuit serves to effect a complete cycle of operation in which the transfer mechanism 55 will function to individually transfer five car wheels from the guide rail 65 into the five separate chutes of the carriages 275 with the latter being indexed one increment after receiving each car wheel to bring the succeeding chute into alignment with the guide rail 65. After all of the chutes 298 to 303 inclusive, have been loaded by the transfer mechanism 55, the five car wheels contained in the chutes are released simultaneously for rolling movement into the storage rack 286. The carriage 275 is then retracted to its starting position to prepare the mechanism for a succeeding cycle of operations.

At the start of a cycle the contacts of the latch relay 2CRL–48 are latched in the position as established by the prior energization of the relay, the transfer arm members and the transfer bar 1505 of the transfer mechanism 55 are retracted and the carriage 275 is in its retracted position, as shown in FIG. 1b. In the electrical circuit relays 8CR–48, 2CRL–48, 7CRL–48 and 3CRL–48 will be energized and their contacts 2111, 2112, 2113 and 2114, in line L267, respectively will be in a closed position, resulting in the energization of relay 19CR–48, in line L266.

With the relay 8CR energized, the coil of which appears in line L1 of FIG. 29, as previously described, its contacts 2122 and 2123 in lines L217 and L224, are closed so that the automatic relays 1CRA–48 and 2CRA–48, a cycle start relay 2CR–48, the latch relay 1CRL–48 and the unlatching relay 2CRU–48, are all energized.

The relay 1CRA–49 is energized through the circuit established from the conductor, 1710, the closed contact 2124 in line L215, of a selector switch 2125, to a branch conductor 2126. The circuit continues from the branch conductor 2126, through the line L217, the closed contact 2122, the branch conductor 2127 back to line L215 and thence through a closed contact 2129 of energized relay 19CR–48, and the coil of the relay 1CRA–48 to the conductor 1711. Simultaneously therewith, the circuit for energizing the relay 2CRA–48 is also completed from line L215 via a branch conductor 2128 through the coil of the relay 2CRA–48 thence to the conductor 1711. With the relay 1CRA–48 energized a holding circuit for the relay 1CRA–48 and 2CRA–48 is established from the branch conductor 2126 through line L218, a closed contact 2130, in line L218, a branch conductor 2131 to line L215.

With the transfer bar 1505 of the transfer mechanism 55 in a retracted position the limit switch 1572 is actuated to close its contact 2134, in line L235, while the limit switch 1559 is released to close its contact 2135, in line L235. This will complete a circuit along the line L235 to the coil of the relay 8CRA–48 to energize the relay.

With the relay 8CRA–48 energized a contact 2136, in line L220 is closed to compete the circuit to the cycle start relay 2CR–48. Such circuit is established through line L224, the closed contact 2123 to a branch conductor 2137 to line L220. The circuit continues along line L220 through the closed contact 2138, the closed contact 2136 and the closed contact 2139 to the coil of the relay 2CR–48 and thence to the conductor 1711. With the relay 2CR–48 energized a contact 2140, in line L225, is closed to complete a holding circuit for the relay 2CR–48. Such holding circuit is established through line L225, the closed contact 2140 to a branch conductor 2141 to line L220 and thence through the remainder of the circuit previously described. This holding circuit will maintain the relay 2CR–48 energized upon advancement of the transfer bar 1505.

The energized relay 2CR–48 also, operates to close its contact 2176, in line L226, to complete a circuit along the line L226 to the coil of the unlatching relay 2CRU–48. This relay then operates to release the contacts of the deenergized relay 2CRL–48 so that they are all returned to their normal positions as shown.

A cycle start button switch 2142 is shown, with its associated contacts 2143, 2144 and 2145, in line L215, L219 and L220, respectively, as well as, an associated manual mode latch relay 1CRL–48 and its associated contacts 2146 and 2147 in lines L217 and L219. The cycle start button switch 2142 is shown solely for the purpose of illustrating a means for initiating a single cycle of operation in the event that the automatic interlocking relay 8CR is deenergized. With the automatic relays thus energized, the cycle will begin.

While the carriage 275 is in the retracted position the limit switch 366, shown in FIGS. 1b and 28, will be actuated so that its contact, in line L262, is closed to complete a circuit to the coil of the relay 18CR–48 to energize the relay. With the relay 18CR–48 energized its normally closed contact 2236, in line L261, is opened so as to maintain the carriage return relay 17CR–48 deenergized. Also, the gate fingers 315 to 319, inclusive, will be in blocking position so that the limit switch 364, shown in FIGS. 11 and 28, is actuated in a direction to close its contact 2230, in line L257 of FIG. 31, thereby establishing a circuit to energize the coil of the latch relay 5CRL–48. Energization of the latch relay 5CRL–48 closes its contact 2231 in line L261, to partially condition the circuit to the carriage return relay 17CR–48.

With the transfer arms member of the transfer mechanism 55 in a retracted position, the limit switch 1534, shown in FIG. 28, will be actuated so that its contact 2150, in line L232 of FIG. 31, is closed thereby completing a circuit along line L232 to energize the coil of the latch relay 7CRL–48. Simultaneously therewith, a circuit will be completed to energize the coil of the latch relay 6CRL–48 in line L233. With the relay 7CRL–48 energized, a contact 2151 in line L236 is closed so that a circuit is completed along the line L236 through the now closed contact 2152 of the energized relay 8CR–48. The relay 8CR–48 has been previously energized by the return of the transfer bar 1505 of the transfer mechanism 55. The circuit along the line L236 will continue through a now closed contact 2153 of the energized automatic relay 1CRA–48, the now closed contact 2154 of the energized cycle start relay 2CR–48, the closed contact 2151 of the energized latch relay, 7CRL–48 to the coil of the relay 9CR–48. The energized relay 9CR–48 operates to close a contact 2157, in line L283, so that the solenoid 1509 of the hydraulic valve 1510, shown in FIG. 28, is energized to condition the valve for effecting a distribution of fluid pressure to the actuator 1529 to operate it in a direction to move the transfer arms members into engagement with car wheels on the guide rail 65.

As the transfer arms member are pivoted into engagement with car wheels, the limit switch 1534, shown in FIG. 28, will be released so that the contact 2150 in line L232, is opened to interrupt the circuit to both of the latch relays 7CRL–48 and 6CRL–48. When the arms members are fully advanced, a limit switch 1564, shown in FIG. 28, is actuated to close a contact 2158, in line L238, thereby establishing a circuit along the line L238 to energize the coil of the unlatching relay 7CRU–48 and also to energize the coil of the unlatching relay 6CRU–48, in line L239. With the unlatching relays 6CRU–48 and 7CRU–48 energized, the contacts of the deenergized latch relays 6CRL–48 and 7CRL–48 respectively, will be released to return to their normal positions. When the contacts of the deenergized latch relay 7CRL–48 are returned to their normal condition, a contact 2159 thereof, in line L240, will return to its normally closed position to complete a circuit along the line L240 for energizing the coil of the timer relay 2TR–48. After a time delay, a normally open, time-to-close, contact 2160, of the timer relay 2TR–48, in line L227 will close so that a circuit is established along the line L227 through the normally closed contact 2161 of deenergized relay 7CR–48, the now closed contact 2160 of the energized timer relay 2TR–48, the closed contact 2162 of the energized automatic relay 1CRA–48, the normally closed contact 2163 of the deenergized and unlatched relay 2CRL–48, the normally closed contact 2164 of the deenergized and unlatched relay 6CRL–48 and through the normally closed contact 2165 of deenergized relay 17CR–48 to the coil of the relay 3CR–48 to energize this relay. With the relay 3CR–48 energized, it will close a contact 2166, in line L237, so that a holding circuit is established for the relay 9CR–48 along the line L237 through the now closed contact 2166 and the normally closed contact 2167 of the deenergized latch relay 7CRL–48 to the coil of relay 9CR–48, to maintain the relay energized to insure that the arms members of the transfer mechanism will be retained in their advanced position during the advancement of the transfer bar 1505.

With the relay 3CR–48 energized another contact 2168, in line L284 is closed to complete the circuit along the line for energizing the solenoid 1535 of the valve 1536, shown in FIG. 28, to condition this valve for directing fluid pressure to the transfer bar actuator for effecting an advancement of the transfer bar 1505 of the transfer mechanism 55. As the transfer bar 1505 advances, the limit switch 1572 is released so that its contact 2134, line L235, is released thereby interrupting the circuit along the line L235 to the coil of the relay 8CR–48 to effect its deenergization. When the relay 8CR–48 is deenergized, it will operate to open its contact 2136, in line L220, to interrupt the circuit to the coil of the relay 2CR–48, to deenergize the relay 2CR–48 and to recondition the circuit to its initial condition. The deenergized relay 8CR–48 also operates to open its contact 2152, in line L236, thereby interrupting the circuit along line L236, to the relay 9CR–48. However, at this time the relay 9CR–48 is maintained energized through the line L237. At the end of the transfer stroke the limit switch 1559, shown in FIG. 28, will be actuated so that its contact 2169, on line L228, is closed. This contact 2169 in conjunction with the now closed contact 2170 of the release limit switch 1572, in line L28, operate to complete a circuit to the coil of the relay 4CR–48 to energize this relay.

With the relay 4CR–48 energized, a contact 2171, in line L229, will be closed thereby completing the circuit along the line L229 for energizing the coil of the relay 2CRL–48. The energized relay 2CRL–48, operates to open a normally closed contact 2185 in line L221 for maintaining the manual mode relay 1CRL–48 deenergized. Another contact 2172, in line L230 of the energized relay 4CR–48 will also be closed, so that a circuit is established along the line L230 through the closed contacts 2173, 2174 and 2172 of relays 1CRA–48, 2CR–48 and 4CR–48, respectively, thence through the normally closed contact 2175 of deenergized relay 9CR–48 to the coil of the relay 5CR–48, to energize this relay. With the relay 5CR–48 energized, its contact 2177, in line L281, will be closed so that a circuit is completed along the line L281 to energize the solenoid 1560 of the valve 1510.

As the relay 2CRL–48 is energized, as a result of the energization of the relay 4CR–48, the contact 2163 of the relay 2CRL–48, in line L227, will be opened interrupting the circuit to the relay 3CR–48. With the relay 3CR–48 deenergized, its contact 2168, in line L284, will open thereby interrupting the circuit along the line L284 to effect deenergization of the solenoid 1535 of the valve 1536, allowing the valve to be reconditioned to its central neutral blocking position, as shown in FIG. 28. Energization of the solenoid 1560 of the valve 1510 serves to condition the valve to direct fluid pressure to the actuator 1529 for effecting pivotal movement of the transfer arms members out of engagement with the car wheels.

As the arms members of the transfer mechanism 55 are retracted, the limit switch 1534 will be actuated so that its contact 2150, in line L232, is closed thereby reestablishing the circuit along line L232 to the coil of the latch relay 7CRL–48 as well as to the coil of the latch relay 6CRL–48, in line L233. With the latch relay 7CRL–48 energized, a contact 2178, in line L234, is closed so that with the relay 8CR–48 deenergized, and its associated normally closed contact 2179, in line L234, in its closed position, and with the automatic relay 1CRA–48 energized so that an associated contact 2180, in line L234, is in a closed position, a circuit along the line L234 is completed for energizing the coil of the relay 7CR–48. When the relay 7CR–48 is energized, it will operate to close a contact 2181, in line L288, to complete a circuit along the line for energizing the solenoid 1565 of the valve 1536 so as to condition the valve for directing fluid pressure to the transfer bar actuator of the transfer mechanism 55 for retracting the transfer bar 1505.

As the transfer bar 1505 retracts, the limit switch 1559 is released and its contact 2169, in line L228, will open, thereby deenergizing relay 4CR–48 which, in turn, effects deenergization of the relay 5CR–48. If the relay 5CR–48 is deenergized, solenoid 1560 of the valve 1536 would also be deenergized so that the arms of the transfer mechanism would not be positively retained in their retracted position. To maintain the relay 5CR–48 energized during retracting of the transfer mechanism, a holding circuit is established along the line L231, through a now closed contact 2155 of energized relay 7CR–48, the closed contact 2156 of energized relay 7CRL–48 to the line L230, thence through the normally closed contact 2175 of deenergized relay 9CR–48 to the relay 5CR–48.

As the transfer bar 1505 is being retracted the limit switch 1559 is released so that its contact 2135, in line L235, is closed and when the transfer bar is fully retracted the limit switch 1572 will be actuated to close its contact 2134, in line L235, to reestablish the circuit to energize the relay 8CR–48. The relay 8CR–48 operates to close its contacts 2136, in line L220, and its contact 2111, in line L267. With the contact 2111 closed the circuit to the relay 19CR–48 is again established because at this time the contacts 2112, 2113, and 2114 of latch relays 2CRL–48, 7CRL–48 and 3CRL–48 are closed. With both the relays 8CR–48 and 2CR–48 energized, their respective contacts 2152 and 2154, in line L236, are closed, and with the contact 2153 of the energized automatic relay 1CRA–48 closed, and the contact 2151 of the latch relay 7CRL–48 closed a circuit for energizing the relay 9CR–48 is established.

With the relay 8CR–48 energized its contact 2179, in line L234, is opened to effect deenergization of the relay 7CR–48, which, in turn, opens its contact 2155, in line L231, to thereby effect deenergization of the relay 5CR–48. The deenergized relay 5CR–48 now operates to open its contact 2177, in line L281, to deenergize the solenoid 1560 of the valve 1510 to condition the valve for subsequent operation. Also, the deenergized relay 7CR–48 operates to open its contact 2181, in line L288, to deenergize the solenoid 1565 of valve 1536 thereby effecting a conditioning of the valve to its neutral blocking position, as shown in FIG. 28.

As mentioned, when the transfer bar 1505 returns, the limit switch 1559, shown in FIG. 28, is released so that its contact 2169, in line L228 opened, interrupting the circuit to the relay 4CR–48 to effect its deenergization. With the relay 4CR–48 deenergized its contacts 2171 and 2172, in lines L229 and L230, respectively, are opened thereby deenergizing the latch relay 2CRL–48 in line L235, and the relay 5CR–48. With the relay 5CR–48 deenergized, its contact 2177 in line L281, is opened interrupting the circuit to the solenoid 1560 of the valve 1510 to condition the valve for subsequent operation.

With the transfer cycle complete, a car wheel will have been moved out of station 47 and into the chute 298 of the carriage at the unloading station 48. The carriage will then be advanced an increment for aligning the chute 299 with the guide rail 65. The incremental advancement of the carriage is effected when the relay 8CR–48 is energized and when the car wheel, advancing from station 47 into the carriage of station 48, actuates the limit switch 1585, shown in FIGS. 1b and 28. The relay 8CR–49 is not energized until the transfer of car wheels has been completed and the transfer bar 1505 retracted. This insures that the carriage 275 cannot be advanced until a car wheel is in a chute of the unloading carriage 275 and the transfer bar 1505 is in the clear.

Prior to the retraction of the transfer bar 1505 a car wheel will have been moved into a chute of the unloading carriage 275 and in the course of the transfer movement the limit switch 1585 will have been actuated to close its contact 2183, in line L241. At this time the transfer bar 1505 is in its advanced position so that the relay 8CR–48 is deenergized and its contact 2136, in line L220, is opened to deenergize the relay 2CR–48. With the relay 2CR–48 deenergized its contact 2182, in line L241, is closed therefore, a circuit along the line will be completed to energize the relay 10CR–48. With the relay 10CR–48 energized its contact 2184, in line L243, is closed to establish a holding circuit for maintaining the relay 10CR–48 energized after a car wheel has moved over the limit switch 1585 and has released it.

Now, as previously described, with the transfer bar 1505 in its retracted position the relay 8CR–48 will be energized which, in turn, would operate to effect energization of the relay 2CR–48. However at this time the contact 2114, in line L267, is open, because, the latch relay 3CRL–48, in line L246, is deenergized and unlatched at this time. Thus, the circuit to the initial condition relay 19CR–48 is interrupted to maintain the relay deenergized. With the relay 19CR–48 deenergized its contact 2138, in line L220, is opened so that the relay 2CR–48 is deenergized, at this time, and its contact 2182, in line L241, will remain in its normally closed position. With the relay 10CR–48 energized, a contact 2186, in line L244, is closed to complete a circuit along the line L244 to the coil of the relay 11CR–48. Such circuit along the line L244 is established through the normally closed contact 2187 of deenergized relay 12CR–48, the closed contact 2188 of energized relay 2CRA–48, the now closed contact 2189 of energized relay 8CR–48, the now closed contact 2186 of relay 10CR–48 the closed contact 2191 of the latch relay 2CRL–48 to the coil of the relay 11CR–48, and through the normally closed contact 2192 of deenergized relay 17CR–48, the normally closed contact 2193 of deenergized relay 3CRL–48 to the conductor 1711.

With the relay 11CR–48 energized, a contact 2195 in line L286, is closed thereby completing the circuit along the line L286 to energize the solenoid 1587 of the valve 1588, shown in FIG. 28. Energization of the solenoid 1587 conditions the valve 1588 to direct fluid pressure to the carriage actuator 327 for effecting its operation in a direction to produce an incremental advancement of the carriage. When the relay 11CR–48 is energized, the timer relay 1TR–48, in line L245, is also energized. However, as the timer relay 1TR–48 is energized, its contact 2196, in line L246, will remain open long enough to allow the carriage to release the limit switch 338 so that its contact 2197 in line L246 is opened. After the time delay interval has passed, the contact 2196 of the timer relay 1TR–48 closes, but at this time the contact 2197 of the limit switch 338 is open so that the circuit along the line L246, is interrupted so that the relay 3CRL–48, in line L246, is deenergized thereby holding its normally closed contact 2193, in line 243, closed for maintaining the relay 11CR–48 energized.

As the carriage reaches the next position wherein a chute 299 is aligned with the guide rail 65, the limit switch 338 will be actuated to close its contact 2197, in line L246, thereby completing the circuit along the line L246 to the coil of the relay 3CRL–48 to energize this relay.

Thereupon, the normally closed contact 2193 in line L244, of the relay 3CRL–48 will open to interrupt the circuit to the coil of the relay 11CR–48 to effect its deenergization. With the relay 11CR–48 deenergized it will operate to open its contact 2195, in line L286, to interrupt the circuit along the line to deenergize the solenoid 1587 of the valve 1588 and thereby recondition the valve to its central neutral blocking condition, as shown in FIG. 28.

With the latch relay 3CRL–48 energized its contact 2114, in line L267, is closed to reestablish the circuit for energizing the initial condition relay 19CR–48. Thus, the initial conditions are again established, that is, the transfer bar 1505 is in its retracted position, so that the limit switch 1572 is actuated and the limit switch 1559 is released. This results in the opening of the contacts 2169 and 2170, in line L228, to deenergize the relay 4CR–48, which, in turn, effects deenergization of the coil of the latch relay 2CRL–48; the transfer arm members are in the retracted position and the initial condition relay 19CR–48 is now energized.

With the initial condition relay 19CR–48 energized its contact 2138, in line L220, is closed to reestablish the circuit along the line to energize the cycle start relay 2CR–48. Since the transfer bar 1505 is in its retracted position, as previously described, the contacts 2134 and 2135, in line L235, of the limit switches 1572 and 1559 respectively, are closed to complete the circuit to energize the relay 8CR–48, so that its contact 2152, in line L226, is closed. At this time the contact 2153, in the line, of the automatic relay 1CRA–48 is closed, and the contact 2151 of the latch relay 7CRL–48 is closed so that upon the energization of the cycle start relay 2CR–48 its contact 2154, in line L226 is closed to energize the transfer arm member advance relay 9CR–48 for advancing the arm members. As the arm members advance the limit switch 1534 is released and its contact 2150, in line L232, opens to deenergize the coils of the latch relays 7CRL–48 and 6CRL–48. When the arm members are in an advanced position the limit switch 1564 will be actuated to close its contact 2158, in line L238, to energize the unlatching relays 7CRU–48 and 6CRU–48 which operate to release the contacts of the latch relays 7CRL–48 and 6CRL–48, so that they return to their normal positions. The cycle is again initiated to advance the car wheels along the guide rail 65 and thereafter to operate the carriage 275, after receiving a car wheel, another increment, as previously described.

(Prior to the start of the next transfer cycle the unlatching relay 3CRU–48, in line L249 will be energized by reason of the fact that when the relay 10CR–48 was energized to close its contact 2210, in line L249, and the relay 3CR–48 is also energized to close its contact 2211, in line L249 thereby completing the circuit along the line to the coil of the relay 3CRU–48. The energized unlatching relay 3CRU–48 operates to unlatch the contacts of the deenergized relay 3CRL–48 to allow the contacts thereof to return to their normal positions as shown. This, then, sets up the circuit for the next advancement of the carriage.)

When the carriage of the unloading station 48 has advanced for the fourth time, the limit switch 344 will be actuated so that a contact 2212, in line L252, will be closed thereby completing a circuit along the line L252 to energize the coil of the relay 12CR–48. Simultaneously therewith, a circuit along the line L251 will be completed to the coil of the relay 24CR–48 to energize this relay. The energized relays 12CR–48 and 24CR–48 serve to deenergize the carriage advance relay 11CR–48 and to energize the latch relay 3CRL–48, in the following manner. With the relay 12CR–48 energized its normally closed contact 2187, in line L244, is opened to interrupt the circuit along the line to deenergize the relay 11CR–48 and also to deenergize the time relay 1TR–48. This is necessary at this time because with the carriage 275 fully advanced the carriage intermediate position limit switch 338 will not be actuated and, as previously described, it was this switch in conjunction with the time to close contact 2196 of the time delay relay 1TR–48 which normally energized the latch relay 3CRL–48. Thus, the carriage advance relay 11CR–48 is deenergized but the latch relay 3CRL–48 is energized along the line L247 through the closed contact 2194 of the energized relay 24CR–48. Thus, the carriage intermediate position limit switch 338 is shunted.

With the carriage 275 fully advanced and loaded with car wheels, it is now necessary to unload the wheels from the carriage 275 into the storage rack 286 of the station 49. This operation is initiated automatically, but is dependent upon the storage rack 286 being empty as this dependency is provided as a safety measure so that if for any reason all finished car wheels have not been removed from the storage rack 286 the entire machine cycle cannot be continued, thereby preventing any mishap.

When the carriage 275 at the unloading station 48 is fully advanced and loaded with car wheels it is necessary to transfer the car wheels from the carriage into the storage rack of station 49. The car wheel removal operation, from the carriage 275 will be initiated automatically when car wheels in the storage rack 286 of station 49 have all been removed so that the storage rack 286 can receive a full complement of car wheels from the carriage 275. When the storage rack 286 is completely empty the limit switches 357, 358, 359, 360 and 361, shown in FIG. 11, are released so that their respective contacts 2213 to 2217 inclusive, in line L259 of FIG. 31, are opened interrupting the circuit along the line L259 to deenergize the coil of the relay 14CR–48. With the relay 14CR–48 deenergized, a contact 2221 in line L269, will be in its normally closed position so that a circuit along the line L269 is established to the coil of the relay 23CR–48. With the relay 23CR–48 energized, a contact 2222, in line L256, is closed to complete a circuit along the line L256 to the coil of the relay 13CR–48. This circuit is completed by reason of the fact that the normally open contact 2223, in line L256, of the relay 7CR–48 will be closed when the relay 7CR–48 is energized, which is effected through the return of the transfer arms of the transfer mechanism 55, as previously described. Also, the automatic relay 2CRA–48 is energized so that its contact 2224 in line L256, is closed. The relay 10CR–48 has been previously energized so that its contact 2226 in line L256, is also closed and relay 15CR–48 is deenergized so that its contact 2227 is in its normally closed position. Thus, energization of the relay 23CR–48 will operate to complete the circuit along the line L256 for energizing the relay 13CR–48. With the relay 13CR–48 energized, a contact 2228, in line L287, is closed completing the circuit along the line to energize the solenoid 1609 of the valve 1610 to condition this valve for directing fluid pressure to the gate or finger actuator 321. The finger actuator 321 will be operated in a direction to retract the gate fingers 315 to 319, inclusive, shown in FIGS. 11 and 12, so as to release the car wheels to permit them to roll into the individual storage chutes of the storage rack 286 of station 49.

With the gate fingers retracted, the limit switch 364 is actuated in a direction to close a contact 2229 in line L258, as shown in FIG. 31, to complete the circuit along the line to the coil of the relay 16CR–48. However, at this time the relay 5CRL–48 is in a latched condition holding its contact 2231 closed. The relay 16CR–48 when energized, operates to close its contact 2232, in line L261. With the relay 12CR–48 energized, its contact 2233, in line L253, is closed completing the circuit along the line to the coil of the latch relay 4CRL–48 to energize this relay, which operates to effect a closing of its contact 2234, in line L261. With the carriage advanced, the limit switch 366 will be released and its contact 2235, in line L262, will be opened thereby deenergizing the relay 18CR–48 so that its contact 2236, in line L261, is in its normally closed position. Since the contacts of the relay 5CRL–48 are latched in, the contact 2231, in line L261, is closed, and since the relay 2CRA–48 is energized its contact 2237 in line L261 is closed and with the contacts 2232 and 2234 of relays 16CR–48 and 4CRL–48 respectively, closed, the circuit along the line L261 is completed and the relay 17CR–48 will be energized. Also the energized relay 17CR–48 will operate to close its contact 2240, in line L248, to energize the relay 3CRL–48 to insure that the relay 11CR–48, in line L244, is maintained deenergized at this time, which keeps the solenoid 1587 of the valve 1588 deenergized.

The energized relay 17CR–48 also operates to close its contact 2238, in line L285, to complete a circuit for energizing the solenoid 1637 of the valve 1588, shown in FIG. 28, to effect the conditioning of this valve for distributing fluid pressure to the carriage actuator 327 for operating it in a direction to retract the carriage to align the chute 298 with the guide rail 65.

With car wheels in the individual chutes of the storage rack 286 of station 49, limit switches 357 to 361, inclusive, will all be actuated so that their contacts 2213 to 2217, inclusive, respectively, in line L259, are closed to complete a circuit along the line to the coil of the relay 14CR–48. This relay, when energized, operates to close its contact 2239, in line L260, to complete a circuit along the line through the closed contact 2242 of the energized automatic relay 2CRA–48 to the coil of the relay 15CR–48. With the relay 15CR–48 energized, its normally closed contact 2227, in line L256, is opened to deenergize relay 13CR–48 which opens its contact 2228, in line L287 causing the solenoid 1609 of valve 1610 to become deenergized. The energized relay 15CR–48, also, closes a contact 2240, in line L282, to effect energization of the solenoid 1624, the valve 1610 to condition it for directing fluid pressure to the actuator 321 for effecting a raising of the fingers 315 to 319, inclusive, into blocking position in the carriage chutes.

With the relay 14CR–48 energized, its normally closed contact 2221, in line L269, is opened, interrupting the circuit to the relay 23CR–48 to condition it for the next cycle of operation. As the gate actuator 321 operates to raise the fingers 315 to 319, inclusive, to blocking position, the limit switch 364 will be actuated in the opposite direction thereby opening its contact 2229 in line L258, to interrupt the circuit to the relay 16CR–48. Also, the contact 2230 of the switch 364, in line L257 will be closed so that a circuit along the line will be completed to energize the latch relay 5CRL–48 to condition it for the next cycle of operation.

With the carriage of the unloading station 48 in a retracted position, the limit switch 366 will be actuated so that its contact 2235, in line L262 is closed to complete the circuit along the line to energize the coil of the relay 18CR–48. With the relay 18CR–48 energized, its contact 2236, in line L261, is opened interrupting the circuit to the relay 17CR–48 thereby deenergizing the solenoid 1637 of the valve 1588 so that valve is conditioned to its central neutral blocking position, as shown in FIG. 28 for the next cycle of operation. Energization of the relay 18CR–48, also, closes its contact 2244, in line L263 to complete a circuit to the unlatching relay 4CRU–48 as well as, to the unlatching relay 5CRU–48, in line L264. These relays, when energized, operate to unlatch the contacts of the relays 4CRL–48 and 5CRL–48, respectively, so that the contacts return to their normal position.

A complete cycle of operation of the transfer mechanism 55 has been described to effect the placement of five car wheels in the carriage 275 of the unloading station 48.

As previously described, the machining cycle at the stations 36 and 43 takes approximately twice as long as the machining cycles at the rest of the stations. Because of this, the units associated with stations 23, 27, 31 and the unloading station 48 will have to be cycled twice while the operating units of stations 36 and 43 will cycle only once. The cycles are counted off the transfer bar of the transfer mechanism 55 associated with station 48.

For the purpose of describing the cycle counting circuit, only the operation of the transfer mechanism 54 associated with the relating slow machining station 43 and the transfer mechanism 55 will be described. It will be assumed that the transfer mechanisms 54 and 55 are conditioned so that both will operate during a first cycle to complete a transfer operation. Thus, when the tranfer bar 1505 of the transfer mechanism 55 has advanced, the limit switch 1559 will be actuated and the limit switch 1572 will be released so that their respective contacts 2169 and 2170, in line L228, are closed to complete the circuit along the line to energize the relay 4CR–48. With the relay 4CR–48 energized contacts 2246 and 2249, in lines L272 and L278, respectively, will be closed. When the contact 2246 closes, a circuit will be completed along the line through a normally closed contact 2251 of deenergized relay 22CR–48, the coil of the latching relay 8CRL–48 and the closed contact 2246 to the conductor 1711 to energize the latching relay 8CRL–48. With the relay 8CRL–48 energized a normally closed contact 1928, in line L130 of FIG. 30, will be opened so that the circuit to the transfer arm member advance relay 9CR–43 cannot be completed. This will prevent the advancement of the arm members of the transfer mechanism 54, so that the initial condition cannot be obtained for initiating the next transfer cycle. However, the arm members of the transfer mechanism 54 will have been retracted and the limit switch 153 will be actuated to close its contact 1970, in line L123 of FIG. 30, to complete the circuit to energize the latch relays 7CRL–43 and 6CRL–43. The energized relay 6CRL–43 closes its contact 2101, in line L128 of FIG. 30, which normally completes the circuit for energizing the arm member advance relay 9CR–43. However, as previously mentioned the latch relay 8CRL–48 is now energized, so that its contact 1928, in line L130, is opened so that the circuit for energizing the relay 9CR–43 is interrupted preventing energization of the relay. Therefore the initial condition for the station 43 transfer mechanism 54 is by passed so that the rest of the machine members may continue to function to complete the longer work operation.

With the relay 8CRL–48 energized its contacts 2247 and 2253, in lines L273 and L278, respectively, will be closed and latched. Now when the transfer bar 1505 of the transfer mechanism 55 is retracted, releasing limit switch 1559 and actuating limit switch 1572 so that their contacts 2135 and 2134, respectively, in line L235, are closed, the relay 8CR–48 in the line will be energized. With the relay 8CR–48 energized its contact 2248, in line L273, will be closed. Thus a circuit is completed from conductor 1710 via line L273 through the latched closed contact 2247 of relay 8CRL–48, to the coil of the latch relay 9CRL–48 thence through the closed contact 2248 of energized relay 8CR–48 to the conductor 1711. With the latch relay 9CRL–48 energized its contact in line L278, will be closed and latched. However at this time the contacts 2169 and 2170, in line L228, of limit switches 1572 and 1559 are opened to interrupt the circuit to the coil of the relay 4CR–48 so that the relay is deenergized. Thus, with the relay 4CR–48 deenergized its contact 2249, in line L278, is open and its contact 2246, in line L272, is also opened. This results interrupting the circuit to the coil of the latch relay 8CRL–48 deenergizing the relay, but its contacts 2247 and 2253, in lines L273 and L278, remain closed. However at this time the relay 22CR–48, shown in line L280, is not energized, since the contact 2249, in line L278, of deenergized relay 4CR–48, is opened to maintain the circuit to the relay 22CR–48 interrupted.

During the second cycle of operation, the transfer mechanism 54 will not operate, since the contacts 1928 and 1929, in line L130 of FIG. 30, are latched in their open position, because of the previously described energization of their relays 8CRL–48 and 9CRL–49, and they have not as yet been unlatched. Thus since the transfer mechanism 54 cannot be cycled, the transfer mechanism 55 will cycle by itself to advance car wheels in stations 45, 46 and 47, into stations 46, 47 and 48, respectively. This then leaves station 45 empty so that on the next cycle of operation, in which the transfer mechanism 54 as well as, the transfer mechanism 55 operate together, the station 45 can receive the car wheel from station 43, while the car wheel in station 44 will be moved into station 46. This is true because when the transfer mechanism 55 operates in conjunction with the transfer mechanism 54, it will move the car wheel in station 46 into station 47. Therefore, both stations 45 and 46 are vacated and the transfer mechanism 54 will, in advancing car wheels two stations, have the stations 45 and 46 available to receive the car wheels from stations 43 and 44.

When the transfer bar 1505 of the transfer mechanism 55, has advanced in the second cycle of operation the limit switch 1572 will be released and the limit switch 1559 will be actuated, so that their respective contacts 2170 and 2169, in line L228, are closed to again complete the circuit along the line to energize the relay 4CR–48. With the relay 4CR–48 again energized its contacts 2246 and 2249, in lines L272 and L278, will again be closed. With the contact 2246, in line L272, closed the coil of the latch relay 8CRL–48 will be energized. This of course has no effect on the counting circuit since the contacts 2247 and 2253, in lines L273 and L278, respectively, are already latched in their closed position from the previous energization of the relay. However, as the contact 2249, in line L278, of the energized relay 4CR–48, closes it will complete the circuit to the relay 22CR–48 to energize it. This circuit is established from the conductor 1710 along line L278 through the latched closed contacts 2253 and 2252 of relay 8CRL–48 and 9CRL–48, the closed contact 2249 of energized relay 4CR–48, the line L279, the coil of the relay 22CR–48 and thence along the line L280, to the conductor 1711.

With the relay 22CR–48 energized, its normally closed contact 2251, in line L272, is opened to interrupt the circuit to the coil of the relay 8CRL–48 to deenergize it. But at this time the contacts 2247 and 2253, in lines L273 and L278, are still latched in their closed positions. The energized relay 22CR–48, also, operates to close its contacts 2254 and 2255, in lines L275 and L277, respectively. With the contact 2254, in line L275, of the energized relay 22CR–48 closed, a circuit will be established from the energized line L279 via a branch conductor 2256 to the line L276 and hence through the closed contact 2254 to the coil of the unlatching relay 8CRU–48 and thence along the line L275 to the conductor 1711, to energize the unlatching relay. The unlatching relay 9CRU–48, in line L274, will be energized through a branch conductor 2257 connected to the line L275.

With the unlatching relays 8CRU–48 and 9CRU–48 energized they will operate to unlatch the contacts of the latch relay 8CRL–48 and 9CRL–48, respectively. Thus, the contact 1928, in line L130 of FIG. 30, will return to its normally closed position and the contacts 2247 and 2253, in lines L273 and L278 of FIG. 31, will return to their normally open positions. The contact 1929, in line L130 of FIG. 30, of relay 9CRL–48 will return to its normally closed position, and the contact 2252, in line L278 will open.

With the closing of the contacts 1928 and 1929, in line L130 of FIG. 30, to their normally closed positions, the circuit associated with the advance arm members relay 9CR–43, is partially conditioned for the subsequent operation of the transfer mechanism 54 for the next cycle of operation.

When the transfer bar 1505 is actuated in a retracting movement to return it to its initial position, the limit switch 1559 will be released and its contact 2169, in line L228, will open. When the contact 2169 is open the circuit to relay 4CR–48 is interrupted and the relay will be deenergized. When this occurs its contact 2249, in line L278, will open interrupting the circuit to the relay 22CR–48 which when deenergized will effect deenergization of the unlatching relays 8CRU–48 and 9CRU–48. To prevent the unlatching relays 8CRU–48 and 9CRU–48 from being deenergized during the interval of time it takes the transfer bar 1505 to retract and to insure that the contacts of the relays 8CRL–48 and 9CRL–48 are returned to their normal positions, a holding circuit is provided for maintaining the relay 22CR–48 energized. The holding circuit is established from the conductor 1710 via the line L277 through a closed contact 2255 of the energized relay 22CR–48 thence along the line L277 to the branch conductor 2256. From the branch conductor 2256 the current will be distributed to the line L279 and thence along the line to the coil of the relay 22CR–48 and thence along the line L280 to the conductor 1711. Also, current from the branch conductor 2256 will flow to and through the line L276, the closed contact 2254, in line L275, of the energized relay 22CR–48 to the coil of the unlatching relay 8CRU–48 and thence along the line to the conductor 1711. Current will also flow from the line L275 to the coil of the relay 9CRU–48 via the branch conductor 2257, and thence along the line L274 to the conductor 1711. In this manner the relay 22CR–48 is maintained energized and it, in turn, maintains the unlatching relays 8CRU–48 and 9CRU–48 energized until the transfer bar 1505 is retracted.

When the transfer bar is retracted the limit switch 1572 will be actuated and the limit switch 1559 will be released so that their respective contacts 2134 and 2135, in line L235, are closed to complete the circuit to energize the relay 8CR–48. With the relay 8CR–48 energzed its contact 2250, in line L277, is opened to interrupt the holding circuit to the relay 22CR–48 thereby effecting its deenergization, which, in turn, opens its contact 2254, in line L275, to effect deenergization of the unlatching relays 8CRU–48 and 9CRU–48. Also the contact 2251, in line L272, of the deenergized relay 22CR–48 is returned to its normally closed position and its contact 2255, in line L277, is opened so that the entire cycle counting circuit is not conditioned for a subsequent cycle of operation.

From the foregoing detailed description of the structure and operation of the illustrated embodiment of the present invention, it will be apparent that an improved transfer type machine tool has been provided which is especially adapted to automatically supply, load and position railroad car wheels at a plurality of work stations for performance of several machining operations on the wheels and which is operable to unload the car wheels and store them for subsequent disposition after the completion of work operations thereon without interrupting the operation of the machine tool organization.

Although the illustrative embodiments of the invention have been described in considerable detail for the purpose of making a full disclosure of a practical operative structure, it is to be understood that the various novel features of the invention may be incorporated in other structural forms without departing from the spirit and scope of the invention, as defined in the subjoined claims.

The principles of this invention having now been fully explained in connection with the foregoing description, we hereby claim as our invention;

1. In a machine tool:
   a longitudinally extending guideway comprising a plurality of longitudinally spaced apart stationary guide rails and a bodily movable guide rail operatively interconnected therewith to constitute a transfer pathway for constraining edge supported workpieces against lateral movement in either direction;
   a reversibly operative power drive connected to move said movable guide rail in one direction relative to said stationary guide rails for operating on a workpiece positioned adjacent said movable guide rail, said power drive being operable to move said movable guide rail in the opposite direction for returning it to transfer guiding position;
   a carriage movably carried in operative proximity at one end of said guideway and being provided with spaced guide rails operative to support a plurality of workpieces on edge in an upright position;
   a power drive connected to indexably position said carriage for aligning one of the workpieces carried thereby with said longitudinally extending guideways for subsequent positioning movement therealong;
   a power driven transfer mechanism operably connected to transfer an edge supported workpiece from said carriage into laterally supported guided engagement with said guideway and to advance workpieces therealong for positioning one edge supported workpiece adjacent said movable guide rail;
   means responsive to transfer movement of a workpiece from said carriage connected to activate said power drive for indexably moving said carriage; and,
   means responsive to return movement of said movable guide rail to transfer guiding position connected to actuate said power driven transfer mechanism for transferring and positioning edge supported workpieces along said guideway.

2. In a machine tool:
   a plurality of longitudinally extending guideways comprising a plurality of longitudinally spaced apart movable guide rails and stationary guide rails interconnected therewith to constitute a transfer pathway for constraining edge supported workpieces against lateral movement in either direction;
   reversibly operative power drives respectively connected to move said movable guide rails relative to said transfer pathway and being independently operable to return corresponding ones of said guide rails to transfer guiding positions;
   an indexable carriage provided with spaced guide rails operative to support a plurality of workpieces on edge in an upright position;
   a power drive connected to indexably advance said carriage for sequentially aligning one of the workpieces carried thereby with said longitudinally extending guideways for subsequent positioning movement therealong;
   a power driven transfer mechanism operably connected to transfer a workpiece from said indexable carriage into laterally supported guided engagement with said guideways and to advance edge supported workpieces therealong into spaced apart positions adjacent said movable guide rails; and
   control means responsive to return movement of said movable guide rails to normal workpiece transfer guiding positions and being operative thereupon to activate said power driven transfer mechanism for moving edge supported workpieces.

3. In a transfer line especially adapted to transfer edge supported workpieces requiring continuous support to preclude lateral tipping in either direction:
   a plurality of longitudinally spaced apart movable guide rails normally positioned in a transfer guiding position to constrain edge supported workpieces against lateral tipping in the direction of the associated guide rail;
   power operable means respectively connected to selectively move said rails independently of each other;
   means for selectively reversing said power operable means for returning and maintaining an associated one of said movable rails in transfer guiding position;
   longitudinally extending stationary guide rails including support means operatively interconnecting said movable guide rails for cooperating therewith to constitute a continuous transfer pathway for guidably supporting edge supported workpieces against lateral tipping in either direction;
   a power driven carriage selectively operable to sequentially move edge supported workpieces into alignment with one end of said transfer guide rails for movement therealong;
   a second carriage provided with a plurality of separate workpiece receiving chutes defined by guide rails adapted to receive and support a plurality of completed workpieces against lateral tipping in either direction;
   a plurality of switching means respectively associated with said chutes of said second carriage and respectively disposed to be actuated by movement of a completed workpiece into the corresponding chute;
   a storage rack provided with chutes respectively adapted to receive all of the completed workpieces from said second carriage;
   a plurality of switching means associated with said rack chutes adapted to be actuated by completed workpieces respectively moved into said rack chutes;
   means responsive to actuation of all of the switching means associated with said second carriage operable to transfer the edge supported workpieces therein to said storage rack;
   power drive means connected to index said second carriage for sequentially positioning the chutes in a position to receive a workpiece from said guide rails;
   a power driven transfer mechanism connected to advance a workpiece from said first carriage to said guide rails and to advance workpieces therealong to positions adjacent said movable guide rails, said transfer mechanism being operative to transfer a completed workpiece from said guide rails to an empty chute in said indexably positioned second carriage; and
   interlock control means responsive to actuation of all of said switching means associated with said second carriage and said storage rack connected to preclude operation of said power driven transfer mechanism.

4. In a transfer line for transferring workpieces along a path of travel:
   a workpiece supply and positioning mechanism comprising a plurality of longitudinally extending guideways adapted to support a workpiece on edge in an upright position for selective longitudinal positioning movement, said guideways comprising stationary guide rails and longitudinally spaced movable guide rails normally retained in alignment with said stationary rails for cooperating therewith to constitute a continuous transfer pathway for constraining a plurality of circular workpieces against lateral tipping in either direction;
   reversible power operable means respectively connected to urge said movable guide rails relative to said stationary guide rails to release a workpiece for lateral movement;
   an indexable carriage at one end of said guideways provided with a plurality of guide rails operative to maintain a plurality of car wheels in spaced upright positions;
   power drive means connected to indexably move said carriage for sequentially aligning said carriage guide rails with said longitudinally extending guideways;

a power driven transfer control mechanism operatively connected to advance a car wheel from said carriage into guidable engagement with said longitudinally extending guideways and to advance car wheels therealong into predetermined positions relative to said movable guide rails; and means responsive to return movement of said movable guide rails to circular work guiding positions connected to actuate said power driven transfer control mechanism for effecting positioning movement of car wheels from said carriage and along said longitudinally extending guideways;

whereby successive ones of said carriage guideways cooperate with said longitudinally extending guideways and said movable guide rails associated therewith to guideably constrain a plurality of car wheels against lateral tipping movement during longitudinal positioning movement therealong.

5. In a mechanism for handling a plurality of circular workpieces in an upright position:

a base;

a carriage having an entrance side and a discharge side supported on said base for incremental movement to a discharge position;

a plurality of chutes in said carriage disposed transversely of said carriage and operable to receive and support circular workpieces in an upright position therein;

a gate mechanism associated with said carriage at said discharge position normally disposed to retain a workpiece in the chute of said carriage at said discharge position and operable when actuated to an open condition to release a workpiece for discharge from a chute of said carriage positioned at said discharge position;

a first reversible power source connected to effect operation of said gate mechanism in a closing or opening action;

a second reversible power source carried by said base and connected to effect movement of said carriage in increments of advancement from an initial position and to retract said carriage;

means operable to urge the workpieces out of said chutes; and, control means operably connected to effect operation of said second reversible power source after the exit of a workpiece from a chute to effect a movement of said carriage to align a next adjacent chute with the discharge position.

6. In mechanism for handling a plurality of circular workpieces in an upright position from a transfer line:

a base disposed at the discharge end of said transfer line;

a carriage having an entrance side and an exit side supported on said base for movement transversely of the transfer line;

a plurality of chutes in said carriage operable to receive and support workpieces in an upright position therein;

retractible workpiece stops carried by said carriage and disposed on the exit side of said carriage to retain the workpieces in the chutes of said carriage;

a first reversible power source carried by said base and operably connected to effect movement of said carriage in increments to effect alignment of each of said chutes with the transfer line successively;

a second reversible power source carried by said carriage and operably connected to actuate said workpiece stops to a retracted position;

means for urging the workpieces from said chutes of said carriage upon retraction of said workpiece stops;

control means operably connected to effect operation of said first reversible power source for moving said carriage in increments; and, other control means for effecting operation of said second reversible power source to effect its operation to retract said workpiece stop when said carriage has a full complement of workpieces.

7. In a machine tool organization:

a guideway adapted to support the workpieces for advancement through the machine tool;

a loading station disposed at the start of said guideway and operable to support a plurality of workpieces for presentation individually to said guideway;

an unloading station disposed at the end of said guideway and operable to receive a plurality of finished workpieces individually from said guideway;

and transfer means operable to advance workpieces in increments out of said loading station and along said guideway as well as to move finished workpieces from said guideway into said unloading station.

8. In a transfer line for transferring wheels to and away from a particular location;

support means disposed to be engaged by the periphery of the wheels to support the wheels for rolling movement toward and away from the particular location;

a stationary guide rail carried in spaced relationship to said support means for retaining the wheels in an upright position on said support means;

a movable guide rail section interrupting said stationary guide rail adjacent the particular and retaining the wheels in an upright position at the location;

power means connected to selectively actuate said movable guide rail to release a wheel for lateral movement away from and return to said support means at the location;

a first carriage adapted to carry a plurality of wheels, said carriage being mounted at the beginning of said support means and being movable to individually present each of the wheels carried therein to said support means;

a second carriage having a plurality of chutes with each chute being adapted to receive a wheel, said carriage being mounted at the end of said support means and being movable to successively align the chutes with said support means for receiving the wheels therefrom; and, transfer means for moving each of the wheels presented by said first carriage onto and along said support means and to successively move the wheels off of said support means into the chutes of said second carriage as the chutes are aligned with said support means.

9. In a transfer line for transferring wheels to and away from a particular location;

a support rail disposed to be engaged by the periphery of the wheels to support the wheels for rolling movement toward and away from the particular location;

a stationary guide rail carried in spaced relationship to said support rail for retaining the wheels in an upright position on said support rail;

a movable guide rail section interrupting said stationary guide rail adjacent the particular location and retaining the wheels in an upright position at the location;

power means connected to selectively actuate said movable guide rail to release a wheel for lateral movement away from and toward said support rail at the particular location;

a workpiece loading station at the beginning of said support rail for presenting workpieces to said support rail;

a workpiece unloading station at the end of said support means for receiving the workpieces from said support rail; and, workpiece advancing means operable between said loading station and said unloading station to advance the presented workpieces onto said support means, to and away from the particular location and thence into said unloading station.

10. In a transfer line for transferring wheels to and away from a particular location;
a support rail disposed to be engaged by the peripheries of the wheels to support the wheels for rolling movement toward and away from the particular location;
a stationary guide rail carried in spaced relationship to said support rail for retaining the wheels in an upright position on said support rail;
a movable guide rail section interrupting said stationary guide rail adjacent the particular location and constituting a continuation thereof for retaining the wheels in an upright position at the particular location,
means for moving said movable guide rail section to release a wheel for lateral movement away from and return to said support means at the particular location;
a carriage adapted to carry a plurality of wheels and mounted for indexable movement in a path transverse to the path of said support rail with each indexing movement serving to align one of the wheels with said support rail; and
power driven transfer means connected to effect a rolling movement of the aligned wheel out of said carriage onto said support rail and to the particular location.

11. In a transfer line for transferring wheels to and away from a work station;
a support rail disposed to be engaged by the periphery of the wheels to support the wheels for rolling movement toward and away from the work station;
a stationary guide rail carried in spaced relationship to said support rail for retaining the wheels in an upright position on said support rail;
a movable guide rail section interrupting said stationary guide rail adjacent the work station and retaining the wheels in an upright position at the work station;
and power means connected to actuate said movable guide rail to release a wheel for lateral movement away from and toward said support rail at the work station.

12. In a transfer line for transferring wheels;
a support rail supporting the wheels in an upright position for rolling movement in a path of travel;
guide means spaced from said support rail for retaining the wheels in the upright position for rolling movement along said support rail;
a workpiece loading station at the beginning of the transfer line having indexable means operable to individually present workpieces to said support rail;
a workpiece supply station disposed adjacent to said loading station and operably connected to supply a plurality of workpieces to said indexable means of said loading station;
an unloading station disposed at the end of said support rail and having indexable means operable to receive workpieces from said support rail and to support the workpieces received from said support rail;
a storage station associated with said unloading station in position to receive a plurality of workpieces from said indexable means of said unloading station;
means associated with said indexable means of said unloading station normally acting to maintain workpieces received in said indexable means therein and operable when actuated to effect a release of the workpieces from movement into said storage station; and,
workpiece advancing means operable between said supply station and said storage station to advance workpieces along the transfer line in increments.

13. In a transfer line for transferring wheels to and away from a work station;
a support rail disposed to be engaged by the peripheries of the wheels to support the wheels for rolling movement toward and away from the work station in a predetermined path of travel;
a first carriage mounted at the beginning of said support rail for movement in a direction transverse to said support rail and adapted to carry a plurality of wheels;
means for moving said carriage in increments with each movement serving to present one of the wheels in the carriage to said support rail;
a second carriage movably mounted at the end of said support rail and having a plurality of chutes with each chute being adapted to receive a wheel;
means for moving said second carriage in increments so that the several chutes are successively aligned with said support rail for receiving the wheels therefrom; and
transfer means operable to move each of the wheels presented by said first carriage into and along said support rail in increments and to successively move the wheels off of said support rail into the chutes of said second carriage as the chutes are successively aligned with said support rail.

14. In a line for transferring edge supported workpieces;
support means supporting the workpieces in an upright position for movement in a predetermined path of travel;
a carriage adapted to carry a plurality of workpieces, said carriage being mounted at the beginning of said support means and being movable to individually present each of the workpieces carried therein to said support means; and,
transfer means for moving each of the presented workpieces from said carriage onto said support means and to move the workpieces in increments along said support means.

15. In a transfer line for transferring edge supported workpieces;
support means supporting the workpieces on edge in an upright position for movement in a predetermined path of travel;
a first carriage adapted to carry a plurality of workpieces, said carriage being mounted at the beginning of said support means and being movable to individually present each of the workpieces carried therein to said support means;
a second carriage having a plurality of chutes with each chute being adapted to receive a workpiece, said carriage being mounted at the end of said support means and being movable to successively align the chutes with said support means for receiving the workpieces therefrom; and,
transfer means for moving each of the workpieces presented by said first carriage onto and along said support means and to successively move the workpieces off of said support means into the chutes of said second carriage as the chutes are aligned with said support means.

16. In a transfer line for transferring wheels;
support means for supporting the wheels in an upright position for rolling movement in a predetermined path of travel;
a workpiece loading station at the beginning of said support means for presenting wheels to said support means;
a workpiece unloading station at the end of said support means for receiving the wheels from said support rail; and,
workpiece advancing means operable between said loading station and said unloading station to advance the presented wheels onto and along said support means in increments and thence into said unloading station.

(References on following page)

References Cited by the Examiner

UNITED STATES PATENTS

| | | | |
|---|---|---|---|
| 2,139,403 | 12/38 | Cole | 29—33.12 |
| 2,224,975 | 12/40 | McNamara | 214—1 |
| 2,238,921 | 4/41 | Waldsmith | 29—33.12 |
| 2,359,167 | 9/44 | Somes | 214—1 |
| 2,392,169 | 1/46 | Mansfield | 29—33.12 |
| 2,714,324 | 8/55 | Dinsmore | 82—2.7 |
| 2,939,352 | 6/60 | Swanson | 82—2.7 |
| 3,118,332 | 1/64 | Fotsch et al. | 82—2.7 |

RICHARD H. EANES, JR., *Primary Examiner.*